US012543909B2

(12) United States Patent
Lee et al.

(10) Patent No.: US 12,543,909 B2
(45) Date of Patent: Feb. 10, 2026

(54) STATION DEVICE ON WHICH CLEANER IS DOCKED AND OPERATING METHOD OF STATION DEVICE

(71) Applicant: SAMSUNG ELECTRONICS CO., LTD., Suwon-si (KR)

(72) Inventors: Seongu Lee, Suwon-si (KR); Soohoon Kim, Suwon-si (KR); Juhan Seon, Suwon-si (KR); Ahyoung Lee, Suwon-si (KR); Yeongju Lee, Suwon-si (KR); Jaeshik Jeong, Suwon-si (KR); Yoonkyung Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/778,557

(22) Filed: Jul. 19, 2024

(65) Prior Publication Data
US 2025/0025008 A1 Jan. 23, 2025

Related U.S. Application Data

(63) Continuation of application No. PCT/KR2024/095844, filed on May 22, 2024.

(30) Foreign Application Priority Data

Jul. 20, 2023 (KR) .................. 10-2023-0094653
Nov. 1, 2023 (KR) .................. 10-2023-0149275

(51) Int. Cl.
A47L 9/28 (2006.01)
A47L 9/00 (2006.01)
(Continued)

(52) U.S. Cl.
CPC ........... A47L 9/2889 (2013.01); A47L 9/0063 (2013.01); A47L 9/149 (2013.01); A47L 9/2805 (2013.01);
(Continued)

(58) Field of Classification Search
None
See application file for complete search history.

(56) References Cited

U.S. PATENT DOCUMENTS 7,237,298 B2 * 7/2007 Reindle ................ A47L 9/2842
15/340.1
7,442,945 B2 10/2008 Hwang et al.
(Continued)

FOREIGN PATENT DOCUMENTS

CN 110707925 A 1/2020
CN 112886872 A 6/2021
(Continued)

OTHER PUBLICATIONS

International Search Report and Written Opinion for International Application No. PCT/KR2024/095844; International Filing Date May 22, 2024; International Search Report Mail Date Aug. 27, 2024; 9 Pages, not in English.

Primary Examiner — Eric W Golightly
(74) Attorney, Agent, or Firm — CANTOR COLBURN LLP

(57) ABSTRACT

Provided is a station device configured to detect a first zero crossing point (ZCP) and a second ZCP with respect to an alternating current (AC) input voltage, by using a ZCP circuit configured to detect a ZCP of the AC input voltage applied to the station device, obtain information about a pulse width from the first ZCP to the second ZCP, identify whether the AC input voltage is in an overvoltage state, based on the information about the pulse width from the first ZCP to the second ZCP, and deactivate an operation of the suction motor, when the AC input voltage is in the overvoltage state. Where detecting the first ZCP and the second ZCP includes detecting voltage points which are offset from 0 V by a preset value in the AC input voltage.

20 Claims, 29 Drawing Sheets

(51) Int. Cl.
*A47L 9/14* (2006.01)
*H03K 5/1536* (2006.01)

(52) U.S. Cl.
CPC .......... *A47L 9/2842* (2013.01); *A47L 9/2857* (2013.01); *A47L 9/2873* (2013.01); *A47L 9/2894* (2013.01); *A47L 2201/022* (2013.01); *A47L 2201/024* (2013.01); *H03K 5/1536* (2013.01)

(56) References Cited

U.S. PATENT DOCUMENTS

| | | |
|---|---|---|
| 2015/0123583 A1 | 5/2015 | Ko |
| 2022/0095862 A1 | 3/2022 | Kim et al. |
| 2022/0313040 A1 | 10/2022 | Choi et al. |

FOREIGN PATENT DOCUMENTS

| | | | |
|---|---|---|---|
| JP | 2020188579 | A | 11/2020 |
| KR | 19990053418 | A | 7/1999 |
| KR | 100240222 | B1 | 1/2000 |
| KR | 100615587 | B1 | 8/2006 |
| KR | 100790521 | B1 | 1/2008 |
| KR | 100979636 | B1 | 9/2010 |
| KR | 101096243 | B1 | 12/2011 |
| KR | 20150031356 | A | 3/2015 |
| KR | 20150051039 | A | 5/2015 |
| KR | 101539850 | B1 | 7/2015 |
| KR | 20220136092 | A | 10/2022 |

\* cited by examiner

| No | AC INPUT (V) | PULSE WIDTH MEASUREMENT VALUE (ms) | TIMER CALCULATION (100μs) |
|---|---|---|---|
| 1 | 108 | 9.88 | 98 |
| 2 | 127 | 9.68 | 96 |
| 3 | 150 | 9.44 | 94 |
| 4 | 160 | 9.40 | 94 |
| 5 | 170 | 9.34 | 93 |
| 6 | 180 | 9.28 | 92 |
| 7 | 190 | 9.22 | 92 |
| 8 | 200 | 9.18 | 91 |
| 9 | 220 | 9.10 | 91 |
| 10 | 275 | 8.92 | 89 |

FIG. 19A

☐ FLAG CLASSIFICATION A TO D (4 GROUPS) ACCORDING
  TO AC INPUT VOLTAGE LEVELS

| No | Group | Timer Counter (100μs) | REMARK |
|---|---|---|---|
| 1 | A | 87 ↓ | ABNORMAL OVERVOLTAGE |
| 2 | B | 88~91 | AC 220V |
| 3 | C | 92~98 | AC 127V + MARGIN |
| 4 | D | 99 ↑ | ABNORMAL LOW VOLTAGE |

FIG. 19B

☐ SIMULATION ESTIMATION (50 Cycles Timer Count)

| No | Group | SIMULATION (ESTIMATION) | | | |
|---|---|---|---|---|---|
| | | NORMAL | OVERVOLTAGE VOLTAGE | LOW VOLTAGE | POWER DISTORTION (INSTANT DIP) |
| 1 | A | 0 | 5 | 0 | 20 |
| 2 | B | 0 | 40 | 0 | 5 |
| 3 | C | 50 | 5 | 10 | 5 |
| 4 | D | 0 | 0 | 40 | 20 |
| PROCESSING | | NORMAL OPERATION | RED LED BLINK AND STOP | NORMAL OPERATION | RED LED BLINK AND STOP |

$C \geq (A+B+D)$: ORMAL
$B \geq (A+C+D)$: OVERVOLTAGE VOLTAGE
$A+D \geq (B+C)$ & $D < (A+B+C)$: POWER DISTORTION
$A+D \geq (B+C)$ & $D \geq (A+B+C)$: LOW VOLTAGE

- ZERO CROSSING DETECTION POINT LEVEL CALCULATION
- DESIGN TR WITH SWITCHING FUNCTION

| AC INPUT VOLTAGE STATE | Rising (↑) | Falling (↓) |
|---|---|---|
| TR State | Cut-OFF → Saturation | Saturation → Cut-OFF |
| MICOM INPUT | 5V(High) → 0.2V(Low) | 0.2V(Low) → 5V(High) |
| AC INPUT VOLTAGE LEVEL | $TR\_V_{BE} = V_{R5} \geq 0.7V$<br>$AC\_input \geq 2.1V$ | $TR\_V_{BE} = V_{R5} < 0.7V$<br>$AC\_input < 2.1V$ |

STATION DEVICE ON WHICH CLEANER IS DOCKED AND OPERATING METHOD OF STATION DEVICE

CROSS-REFERENCE TO RELATED APPLICATIONS

This application is a continuation application, claiming priority under § 365(c), of International Application No. PCT/KR2024/095844, filed on May 22, 2024, which is based on and claims the benefit of Korean patent application number 10-2023-0149275 filed on Nov. 1, 2023, in the Korean Intellectual Property Office and of Korean patent application number 10-2023-0094653 filed on Jul. 20, 2023, in the Korean Intellectual Property Office, the disclosures of which are incorporated by reference herein in their entireties.

BACKGROUND

An embodiment of the disclosure relates to a station device configured to detect an overvoltage, and an operating method of the station device.

A cordless vacuum cleaner is a type of cleaner which uses a chargeable battery embedded in the cleaner and does not need to connect to an outlet. The cordless vacuum cleaner may include a suction motor to generate a suction force, thereby collecting dust by sucking up air with foreign substances such as dust from a cleaner head (brush) due to the suction force generated by the suction motor, and separating the sucked-up foreign substances from the air.

As the size of the dustbin of the cordless vacuum cleaner is limited, the cordless vacuum cleaner itself is unable to collect a lot of dust. Also, when the cordless vacuum cleaner is continuously operated while the dustbin is completely filled with dust, a flow path within the cordless vacuum cleaner may be blocked and thus cleaning performance may largely decrease. In this case, the cleaning performance may not be recovered only by emptying the dust in the dustbin, and the dustbin may need to be disassembled and the inside of the dustbin may need to be cleaned. Accordingly, it is necessary to empty the dust in the dustbin of the cordless vacuum cleaner at an appropriate time.

Recently, not only the cordless vacuum cleaner but also a function of a station device to store the cordless vacuum cleaner has been updated. The station device serves to store the cordless vacuum cleaner and charge the battery of the cordless vacuum cleaner and further provides a function of manually or automatically discharging collected dust in a dustbin of the cordless vacuum cleaner. The station device includes an alternating current (AC) suction motor configured to use an AC power for discharging dust. Therefore, when an AC overvoltage equal to or greater than an AC rated voltage is applied to the station device, the AC suction motor may be damaged or fire may occur, such that there is a need to prevent fire or damage due to a mis-input of the AC power.

SUMMARY

According to an embodiment of the disclosure, a station device includes a suction motor configured to generate a suction force to suck up dusts from a dustbin included in a cleaner, a zero crossing point (ZCP) circuit configured to detect a ZCP of an alternating current (AC) input voltage applied to the station device, and at least one processor configured to control supply of the AC input voltage to the suction motor. The at least one processor may be configured to detect a first ZCP and a second ZCP with respect to the AC input voltage, by using the ZCP circuit. The at least one processor may be configured to obtain information about a pulse width from the first ZCP to the second ZCP. The at least one processor may be configured to identify whether the AC input voltage is in an overvoltage state, based on the information about the pulse width from the first ZCP to the second ZCP. The at least one processor may be configured to deactivate an operation of the suction motor, based on the AC input voltage being in the overvoltage state.

According to an embodiment of the disclosure, an operating method of a station device includes detecting a first ZCP and a second ZCP with respect to an AC input voltage, by using a ZCP circuit configured to detect a ZCP of the AC input voltage applied to the station device, obtaining information about a pulse width from the first ZCP to the second ZCP, identifying whether the AC input voltage is in an overvoltage state, based on the information about the pulse width from the first ZCP to the second ZCP, and deactivating an operation of the suction motor, based on the AC input voltage being in the overvoltage state.

BRIEF DESCRIPTION OF THE DRAWINGS

FIG. 19A is a diagram illustrating a plurality of groups corresponding to states of an AC input voltage, according to an embodiment of the disclosure.

FIG. 19B is a diagram illustrating an operation of identifying a final state of an AC input voltage, based on classification results with respect to a state of the AC input voltage during preset cycles, according to an embodiment of the disclosure.

DETAILED DESCRIPTION

Figure 1A:
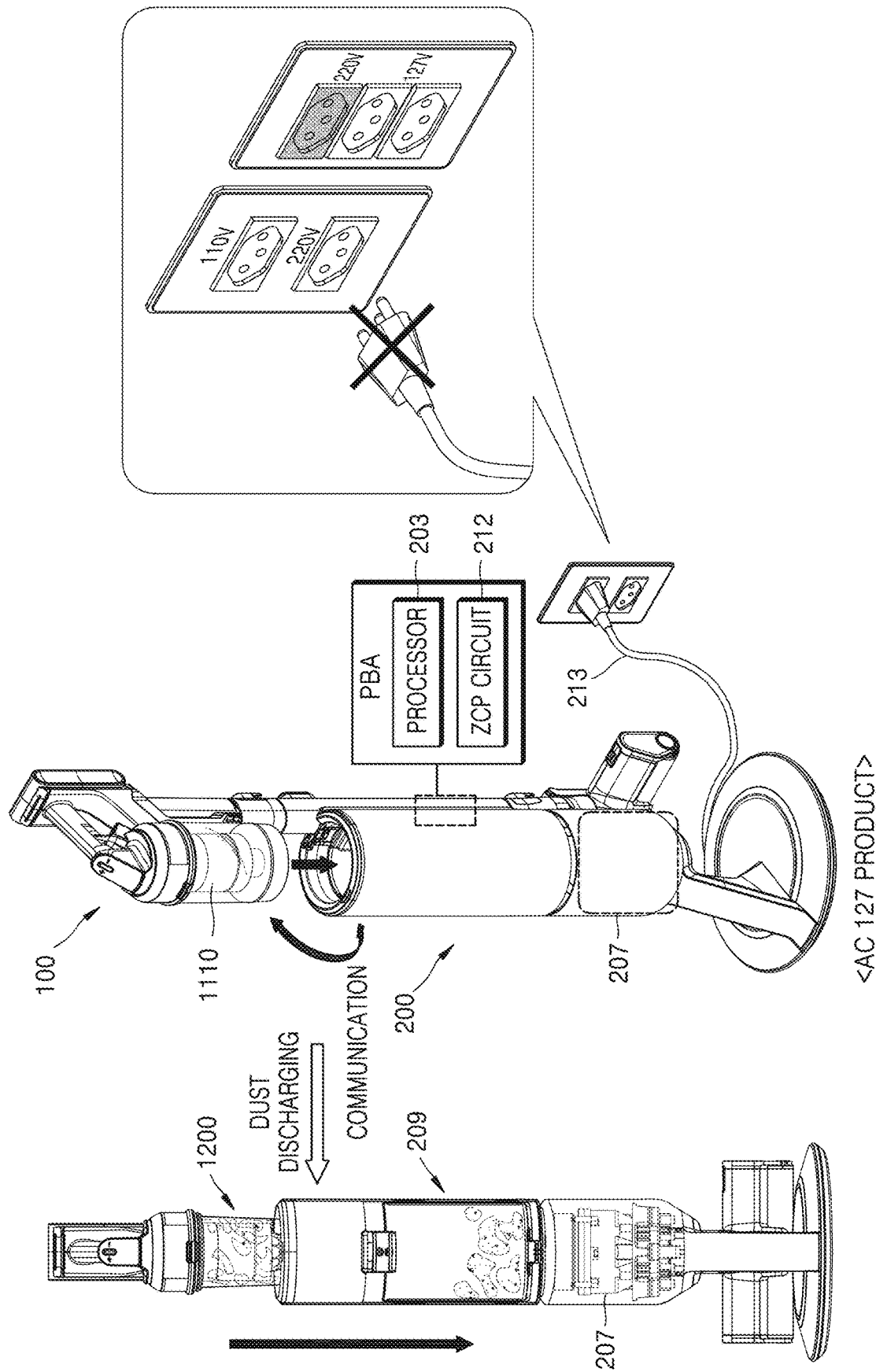
FIG. 1A is a diagram illustrating a vacuum cleaner system for detecting an overvoltage, according to an embodiment of the disclosure.

The terms used in the disclosure will be briefly defined, and an embodiment of the disclosure will be described in detail.

All terms including descriptive or technical terms which are used in the disclosure should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

Throughout the disclosure, the expression "at least one of a, b or c" indicates only a, only b, only c, both a and b, both a and c, both b and c, all of a, b, and c, or variations thereof.

Throughout the disclosure, when a part "includes" or "comprises" an element, unless there is a particular description contrary thereto, the part may further include other elements, not excluding the other elements. As used in the disclosure, the term "unit" or "module" denotes an entity for performing at least one function or operation, and may be implemented as hardware, software, or a combination of hardware and software.

Hereinafter, the disclosure will now be described more fully with reference to the accompanying drawings for one of ordinary skill in the art to be able to perform an embodiment of the disclosure without difficulty. The disclosure may, however, be embodied in many different forms and should not be construed as being limited to an embodiment of the disclosure set forth herein. In the drawings, parts not related to an embodiment of the disclosure are not illustrated for clarity of explanation, and like reference numerals denote like elements throughout the disclosure.

Figure 1B:
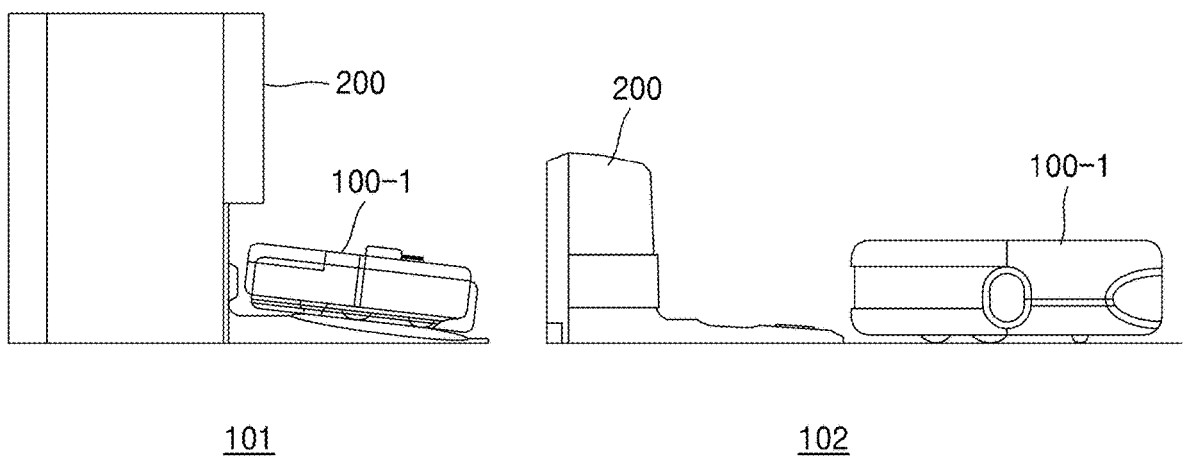
FIG. 1B is a diagram illustrating a robot cleaner system according to an embodiment of the disclosure.

FIG. 1A is a diagram illustrating a vacuum cleaner system for detecting an overvoltage, according to an embodiment of the disclosure. FIG. 1B is a diagram illustrating a robot cleaner system according to an embodiment of the disclosure.

Referring to FIG. 1A, the vacuum cleaner system according to an embodiment of the disclosure may include a cleaner and a station device 200. However, not all elements shown in FIG. 1A are necessary elements. The vacuum cleaner system may be embodied with more elements than the elements shown in FIG. 1A or may be embodied with fewer elements than the shown elements. For example, the vacuum cleaner system may further include a server device (not shown) and a user terminal (not shown). The vacuum cleaner system further including the server device and the user terminal will be described in detail with reference to FIG. 25 below.

FIG. 1A is described with reference to a cordless vacuum cleaner 100, but the disclosure is not limited thereto. For example, as illustrated in FIG. 1B, an embodiment of the disclosure may be applied to a robot cleaner 100-1. The robot cleaner 100-1 according to an embodiment of the disclosure is a robotic device capable of moving by itself using wheels, etc., and may perform a cleaning operation while moving in a cleaning space. The cleaning space may be, for example, a space requiring cleaning, such as a house or an office. The robot cleaner 100-1 may survey an indoor space by using at least one sensor (e.g., a camera sensor, a three-dimensional (3D) sensor, a light detection and ranging (LiDAR) sensor, etc.) and may generate an indoor space map. For example, the indoor space map may include data regarding at least one of, for example, a navigation map used for driving during cleaning, a simultaneous localization and mapping (SLAM) map used for position recognition, or an obstacle recognition map on which information about a recognized obstacle is recorded.

The cordless vacuum cleaner 100 may have a chargeable battery embedded therein, and may refer to a vacuum cleaner that does not need to connect a power cord to an outlet for cleaning. A user may utilize a brush device (cleaner head) suck up dust or foreign substances (e.g., dust, hair, or garbage) from a cleaning-target surface, by moving back and forth the cordless vacuum cleaner 100 by using a handle mounted at a cleaner body. The foreign substances sucked up from the cleaning-target surface via the brush device may be collected in a dustbin 1200 (also referred to as the dust collector bin) of the cleaner body. The cordless vacuum cleaner 100 may include a suction motor 1110 to make a space inside the cordless vacuum cleaner 100. Hereinafter, for convenience of descriptions, the suction motor 1110 of the cordless vacuum cleaner 100 may be expressed as the first suction motor 1110. The cordless vacuum cleaner 100 may include a communication interface for communication with the station device 200. For example, the cordless vacuum cleaner 100 may exchange data with the station device 200 via a wireless personal area network (WPAN). A configuration of the cordless vacuum cleaner 100 will be described in detail with reference to FIGS. 4 to 7 below.

Referring to FIG. 1A, the station device 200 may be a device for dust discharging (dust ejection), charging a battery, or storage of the cordless vacuum cleaner 100. The station device 200 may provide only a battery charging function for the cordless vacuum cleaner 100 or may provide both a battery charging function and a dust discharging function. The station device 200 may be referred to herein as a clean station or a charging station.

Referring to FIG. 1B, the station device 200 may be a device for dust discharging, battery charging, or storage of the robot cleaner 100-1. For example, the station device 200 may provide a dust discharging function and a battery charging function for the robot cleaner 100-1 (see 101 of FIG. 1B), or may provide only the battery charging function for the robot cleaner 100-1 (see 102 of FIG. 1B).

According to an embodiment of the disclosure, the station device 200 may perform communication with the cordless vacuum cleaner 100, the robot cleaner 100-1, or a server device (not shown) via a network. For example, the station device 200 may exchange data with the cordless vacuum cleaner 100 via a WPAN without accessing an access point (AP). The station device 200 may exchange data with the server device via an AP that connects a local area network (LAN) to a wide area network (WAN), wherein the station device 200 is connected to the LAN and the server device is connected to the WAN. For example, the station device 200 may be connected to the cordless vacuum cleaner 100 via Bluetooth Low Energy (BLE) communication and may be connected to the server device via Wi-Fi™ (IEEE 802.11) communication, but the disclosure is not limited thereto.

According to an embodiment of the disclosure, the station device 200 may include at least one processor 203, a suction motor 207 (hereinafter, also referred to as the second suction motor 207), and a zero crossing point (ZCP) circuit 212, but the disclosure is not limited thereto.

The second suction motor 207 may be configured to generate a suction force for discharging foreign substances collected in the dustbin 1200 from the cordless vacuum cleaner 100. For example, the second suction motor 207 may generate a pressure difference in the dustbin 1200. The second suction motor 207 may be located lower than a collector 209 while the station device 200 is at its upright position. The second suction motor 207 is a motor configured to use an alternating current (AC) power and may also be referred to as the AC suction motor.

The ZCP circuit 212 is a circuit configured to detect a ZCP of an AC input voltage applied to the station device 200.

Figure 2:
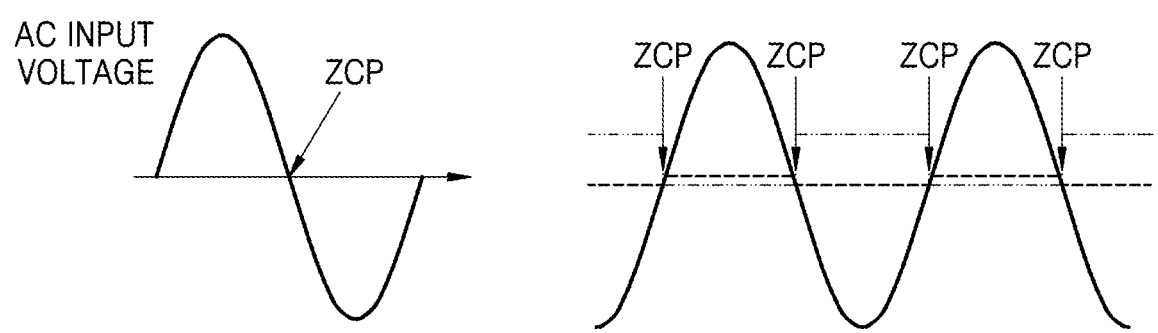
FIG. 2 is a diagram illustrating a zero crossing point (ZCP) of an alternating current (AC) input voltage.

Referring to FIG. 2, the ZCP may indicate a point at which the AC input voltage (sine wave) is 0 voltage (V). The ZCP may include a rising zero crossing point (rising ZCP) at which the AC input voltage (sine wave) rises from a negative value to a positive value, and a falling zero crossing point (falling ZCP) at which the AC input voltage (sine wave) falls from a positive value to a negative value.

Referring back to FIG. 1A, after a user uses the cordless vacuum cleaner 100, the user may dock the cordless vacuum cleaner 100 on the station device 200. As a distance between the cordless vacuum cleaner 100 and the station device 200 is closer, the cordless vacuum cleaner 100 and the station device 200 may establish a short-range wireless communication channel and may exchange data. According to an embodiment of the disclosure, the station device 200 may perform a manual or automatic dust discharging operation when the cordless vacuum cleaner 100 is docked on the station device 200. In one embodiment, the dust discharging operation may indicate that the second suction motor 207 of the station device 200 is operated to discharge dust in the dustbin 1200 of the cordless vacuum cleaner 100 to the collector 209 of the station device 200.

According to an embodiment of the disclosure, the station device 200 may use an AC power. For example, when a power line 213 of the station device 200 is connected to an outlet, the station device 200 is provided an AC power, and when the cordless vacuum cleaner 100 is docked on the station device 200, the station device 200 may operate the AC suction motor 207 to perform the dust discharging operation.

However, when a user connects the power line 213 of the station device 200 to an incorrect outlet, and thus, an AC overvoltage equal to or greater than an AC rated voltage is applied to the station device 200, malfunction of parts, damage, fire, etc. may occur in the station device 200. For example, when the power line 213 of the station device 200 is incorrectly connected to an outlet having AC 220 V to 240 V whereas a rated voltage of the station device 200 is AC 110 V to 127 V, damage to parts, fire, etc. may occur. In particular, in Brazil, commercial AC power for home varies depending on areas, and both AC 127 V and AC 220 V are supplied to one house, and thus, there is a possibility that a user incorrectly apply a power to the station device 200. Also, in Brazil, AC plugs corresponding to AC 127 V and AC 220 V are equal, and shapes of outlets corresponding to the AC 127 V and AC 220 V are the same, and thus, there is a possibility that a user may mis-use a power. Therefore, there is a need to prevent malfunction, damage, fire, etc. of the station device 200 by detecting an overvoltage being applied to the station device 200.

However, it is not easy to detect an overvoltage in a case of an AC power. Measurement times for +/− peak levels of the AC power are short, a separate circuit is requested to detect − peak level, and it is difficult to use AC GND, and thus, it is difficult to directly detect an AC voltage level. Also, a range of an analog-to-digital converter (ADC, which is a chip (I/C) configured to convert consecutive analog signals into digital signals configured of 0 and 1) is 0 V to 5 V or 0 V to 3.3 V, whereas a range of the AC voltage (e.g., from rated voltage of AC 127 V to AC 220 V) is great, such that it is difficult for the processor 203 to directly detect an abnormal overvoltage.

In order to configure the separate circuit to detect AC overvoltage, multiple parts including a photo-coupler, an OP-AMP comparer, a transistor, etc., so that material costs increase, and product competitiveness may decrease due to an increase in a printed circuit board (PCB). In order to change an overvoltage detection condition (e.g., level upgrade or degrade, adjustment of detection time, etc.), it is requested to change time constant values of an AC overvoltage detection circuit, and thus, it is not easy to rapidly correspond thereto.

Therefore, according to an embodiment of the disclosure, the station device 200 may not configure a separate circuit to detect an AC overvoltage but may realize detection of an AC overvoltage by using the ZCP circuit 212. A circuit that controls an AC load may generally include the ZCP circuit 212. It is because a control of the AC load basically requires a phase control (soft start), and a default circuit for the phase control is the ZCP circuit 212. The phase control refers to a scheme of controlling a phase of an AC power, according to a control input signal. The phase control scheme is a scheme of outputting a power by proportionally dividing each ½ cycles of the AC power between 0 degrees to 180 degrees, according to an input control signal.

According to an embodiment of the disclosure, the station device 200 may detect an AC overvoltage by using a pulse width between ZCPs detected by the processor 203 via the ZCP circuit 212. The pulse width between the ZCPs may include a time from a first ZCP to a second ZCP.

Figure 3:
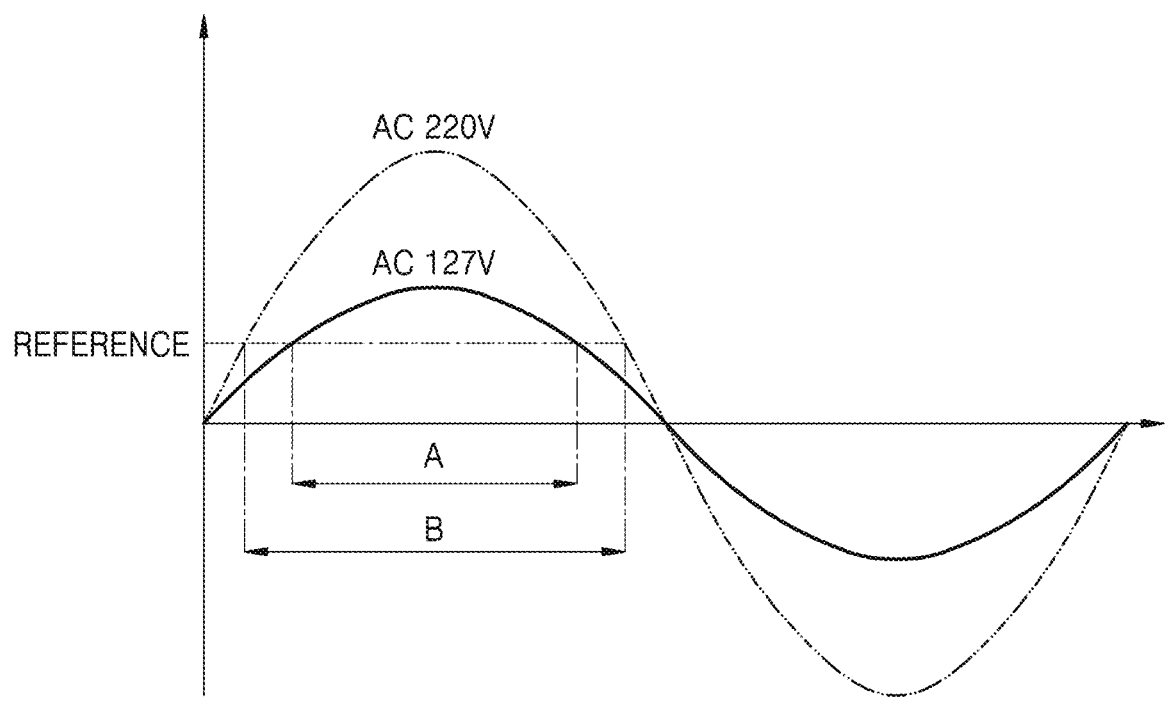
FIG. 3 is a diagram illustrating a pulse width between ZCPs of an AC input voltage.

Referring to FIG. 3, when a frequency is equal (e.g., 60 Hz or 50 Hz), pulse widths of a + waveform of AC 127 V and a + waveform of AC 220 V are equal. For example, when a frequency is 60 Hz, both a half cycle (a pulse width of + waveform) of AC 127 V and a half cycle (a pulse width of + waveform) of AC 220 V are each $\frac{1}{120}$ sec. However, according to a particular voltage level, a width A of + waveform of AC 127 V is different from a width B of + waveform of AC 220 V. That is, when a ZCP is detected not based on 0 V but based on a particular voltage value, a pulse width between ZCPs varies according to levels of an AC input voltage.

According to an embodiment of the disclosure, the processor 203 of the station device 200 detects, via the ZCP circuit 212, a ZCP, based on a voltage point higher than 0 V by a certain value, the station device 200 may detect an AC overvoltage, based on a pulse width between ZCPs. An operation in which the station device 200 detects an AC overvoltage, based on a pulse width between ZCPs will be described in detail with reference to FIG. 8 below.

According to an embodiment of the disclosure, when the station device 200 detects an AC overvoltage, the station device 200 may deactivate an operation of the suction motor 207 and may provide a user with a notification indicating detection of an overvoltage, thereby preventing a malfunction, damage, fire, etc. of a product. According to an embodiment of the disclosure, a user or a manufacturer may connect the station device 200 to a network (wired/wireless), thereby varying an AC overvoltage detection condition (e.g., a level, a time, etc.). For example, for an area where a power is unstable, the user or the manufacturer may adjust a sensitivity, with which the station device 200 detects an overvoltage, to be low. An operation in which the station device 200 adjusts an AC overvoltage detection condition (e.g., a level, a time, etc.), according to an external input or an external signal will be described in detail with reference to FIG. 26 below.

Hereinafter, with reference to FIG. 4, the station device 200 and the cordless vacuum cleaner 100 will now be described in detail.

Figure 4:
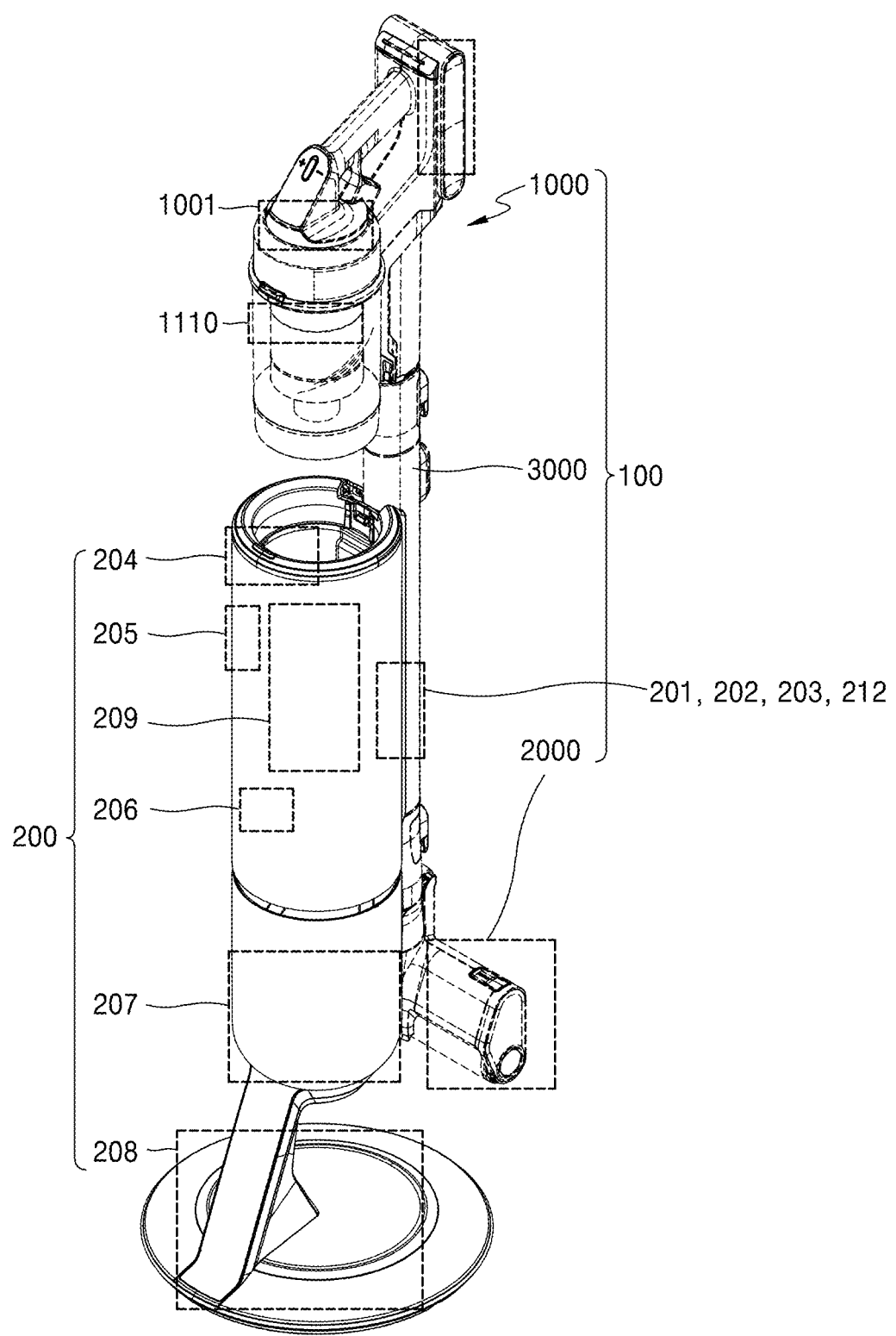
FIG. 4 is a diagram illustrating a station device and a cordless vacuum cleaner according to an embodiment of the disclosure.

FIG. 4 is a diagram illustrating the station device 200 and the cordless vacuum cleaner 100 according to an embodiment of the disclosure.

The cordless vacuum cleaner 100 according to an embodiment of the disclosure may be a stick-type cleaner including the cleaner body 1000, a brush device 2000, and an extension tube 3000. However, not all elements shown in FIG. 4 are necessary elements. The cordless vacuum cleaner 100 may be embodied with more elements than the elements shown in FIG. 4 or may be embodied with fewer elements than the shown elements. For example, the cordless vacuum cleaner 100 may be implemented with the cleaner body 1000 and the brush device 2000, without the extension tube 3000.

The cleaner body 1000 is a part that a user can hold and move during cleaning, and may include the suction motor 1110 (hereinafter, also referred to as the first suction motor 1110) that creates vacuum in the cordless vacuum cleaner 100. The suction motor 1110 may be provided in the dustbin 1200 in which foreign substances sucked up from a cleaning-target surface (e.g.: a floor, bedding, sofa, etc.) are contained. The cleaner body 1000 may further include at least one processor 1001, a battery (not shown), a memory (not shown) for storing software associated with control of the cordless vacuum cleaner 100, a motion sensor (not shown), or the like, in addition to the suction motor 1110, but the disclosure is not limited thereto. The cleaner body 1000 will be described in detail with reference to FIG. 6 below.

The brush device 2000 is a device that tightly contacts the cleaning-target surface so as to suck up air and foreign substances of the cleaning-target surface. The brush device 2000 may also be referred to as the cleaner head. The brush device 2000 may be rotatably coupled to the extension tube 3000. The brush device 2000 may include a motor, a drum having a rotary brush attached thereto, or the like, but the disclosure is not limited thereto. According to an embodiment of the disclosure, the brush device 2000 may further include at least one processor for controlling communication with the cleaner body 1000. A type of the brush device 2000 may vary.

The extension tube 3000 may be formed as a hollow pipe. In an embodiment of the disclosure, the extension tube 3000 may have certain hardness. In an embodiment of the disclosure, the extension tube 3000 may be formed as a flexible hose. The extension tube 3000 may transfer a suction force generated by the suction motor 1110 of the cleaner body 1000 to the brush device 2000, and may move air and foreign substances sucked up by the brush device 2000 to the cleaner body 1000. The extension tube 3000 may be detachably connected to the brush device 2000. The extension tube 3000 may be provided in steps between the cleaner body 1000 and the brush device 2000. At least two extension tubes 3000 may be provided.

According to an embodiment of the disclosure, each of the cleaner body 1000, the brush device 2000, and the extension tube 3000 included in the cordless vacuum cleaner 100 may include power lines (e.g., + (positive) line, − (negative) line) and a signal line.

The power lines may be provided to deliver power supplied from a battery to the cleaner body 1000 and the brush device 2000 connected to the cleaner body 1000. The signal line is different from the power lines and may be provided to transmit a signal between the cleaner body 1000 and the brush device 2000. The signal line may be implemented to be connected to the power lines in the brush device 2000.

According to an embodiment of the disclosure, each of at least one processor 1001 of the cleaner body 1000 and a processor of the brush device 2000 controls an operation of a switching device connected to the signal lane, thereby performing bi-direction communication between the cleaner body 1000 and the brush device 2000. Hereinafter, when the cleaner body 1000 and the brush device 2000 communicate with each other via the signal line, communication between the cleaner body 1000 and the brush device 2000 may be defined as 'signal line communication'. The cleaner body 1000 and the brush device 2000 may communicate with each other using I2C or universal asynchronous receiver/transmitter (UART).

According to an embodiment of the disclosure, the cleaner body 1000 may not only detect attachment or detachment of the brush device 2000 but may also identify a type of the brush device 2000, and may adaptively control an operation (e.g.: a drum revolution per minute (RPM)) of the brush device 2000, based on a usage environment state (e.g.: a hard floor, a carpet, a mat, a corner, a state being lifted from the cleaning-target surface, etc.) of the brush device 2000. For example, the cleaner body 1000 may periodically communicate with the brush device 2000, thereby transmitting a signal for controlling an operation of the brush device 2000 to the brush device 2000.

The station device 200 according to an embodiment of the disclosure may include the suction motor 207 (hereinafter, also referred to as the second suction motor 207), at least one processor 203, and the ZCP circuit 212. Also, the station device 200 may further include a communication interface 201, a memory 202, a user interface 204, a wire connector 205, a pressure sensor 206 (hereinafter, also referred to as the second pressure sensor 206), a power supply unit 208, a dust collector bin coupling portion (not shown), the collector 209, a filter unit (not shown), or the like. However, not all elements shown in FIG. 4 are necessary elements. The station device 200 may be embodied with more elements than the elements shown in FIG. 4 or may be embodied with fewer elements than the shown elements. Hereinafter, each configuration will now be described.

The station device 200 may utilize the communication interface 201 to perform communication with an external device. For example, the station device 200 may perform communication with a cleaner body 1000 of the cordless vacuum cleaner 100 or a server device (not shown) via the communication interface 201. Here, the communication interface 201 may communicate with the server device via a first communication scheme (e.g.: a Wi-Fi communication scheme), and may communicate with the cordless vacuum cleaner 100 via a second communication scheme (e.g.: a BLE communication scheme).

The communication interface 201 may include a short-range wireless communication interface, a long-range wireless communication interface, or the like. The short-range wireless communication interface may include a Bluetooth communication interface, a BLE communication interface, a near field communication (NFC) interface, a wireless local area network (WLAN) (or Wi-Fi) communication interface, a ZigBee communication interface, an Infrared Data Association (IrDA) communication interface, a Wi-Fi Direct (WFD) communication interface, an ultra-wideband (UWB) communication interface, or an Ant+ communication interface, but the disclosure is not limited thereto. The long-range wireless communication interface may be used for the station device 200 to remotely communicate with the server device. The long-range wireless communication interface may include Internet, a computer network (e.g.: LAN or WAN), a mobile communication interface, and the like. The mobile communication interface may include, but is not limited to, a 3rd generation (3G) module, a 4th generation (4G) module, a 5th generation (5G) module, a long term evolution (LTE) module, a narrowband Internet of Things (NB-IoT) module, and an LTE-M module.

The communication interface 201 may transmit data to the processor 203 via UART but the disclosure is not limited thereto.

The memory 202 of the station device 200 may store a program (e.g.: one or more instructions) for processing and control by the processor 203, and may store a plurality of pieces of input/output data. For example, the memory 202 of the station device 200 may include, but is not limited to, software related to control of the station device 200, state data of the suction motor 207, a measurement value of the pressure sensor 206, error occurrence data (error history data), information about an operation mode for dust discharging (e.g., an operation time of the suction motor 207 for each operation mode, a suction force generation pattern for each operation mode), a preset critical drop amount for a smart discharge mode, a discharge timing condition, or the like. The memory 202 of the station device 200 may store data received from the cleaner body 1000. For example, the station device 200 may store product information (e.g., identification information, model information, etc.) of the cordless vacuum cleaner docked on the station device 200, version information of software installed in the cordless vacuum cleaner 100, error occurrence data (error history data) of the cordless vacuum cleaner 100, information about a main-use cleaning mode, information about a suction power drop amount calculated when the brush device 2000 is lifted, information about an accumulated cleaning time after discharging of dust, information about an accumulated cleaning count after discharging of dust, etc.

The memory 202 may include at least one type of storage medium from among flash memory, a hard disk, a multimedia card micro, a memory card (e.g., a secure digital (SD) or extreme digital (XD) memory card), random access memory (RAM), static random access memory (SRAM), read-only memory (ROM), electrically erasable programmable read-only memory (EEPROM), programmable read-only memory (PROM), magnetic memory, a magnetic disk, and an optical disc. The programs stored in the memory 202 may be classified into a plurality of modules depending on functions thereof.

The station device 200 may include at least one processor 203. The station device 200 may include one processor or may include a plurality of processors. The processors 203 may include at least one of a central processing unit (CPU), a graphics processing unit (GPU), an accelerated processing unit (APU), a many integrated core (MIC), a digital signal processor (DSP), or a neural processing unit (NPU). At least one of the processors 203 may be implemented in the form of system on chip (SoC) in which one or more electronic parts are integrated. Each of the at least one processor 203 may be implemented as separate hardware (H/W). At least one of the processors 203 may be referred to as a microcomputer/microprocessor computer/microprocessor controller (Micom), a micro-processor unit (MPU), a micro-controller Unit).

The processor 203 according to an embodiment of the disclosure may be implemented as a single core processor or a multicore processor.

The user interface 204 of the station device 200 may include an input interface and an output interface. The input interface may include a discharge start button, a discharge end button, a mode selection button, or the like. The output interface may include, but is not limited to, a light-emitting diode (LED), a liquid crystal display (LCD), a touch screen, an audio output module for audio guidance, etc. The output interface may display a charge capacity and software update progress information of the cleaner body 1000, but the disclosure is not limited thereto.

The station device 200 may include a wire connector 205. The wire connector 205 may include a terminal to which a computing device of a system manager (e.g., service staff) is connected. The system manager may connect the computing device storing new version software to the wire connector 205, and may transfer the new version software to the memory 202 of the station device 200. Here, when the new version software is associated with control of the station device 200, pre-installed software in the station device 200 may be updated. On the other hand, when the new version software is associated with control of the cordless vacuum cleaner 100, the station device 200 may transfer the new version software to the cordless vacuum cleaner 100, according to whether a preset condition is satisfied. For example, in a case where the cordless vacuum cleaner 100 is docked on the station device 200 and BLE communication with the cordless vacuum cleaner 100 is available, the station device 200 may transfer the new version software to the cordless vacuum cleaner 100. Here, the cordless vacuum cleaner 100 may update pre-installed software.

According to an embodiment of the disclosure, the station device 200 may receive, via the wire connector 205, a signal to adjust a reference range for detecting an overvoltage. For example, the system manager may connect an external device to the station device 200 via the wire connector 205, the external device including information related to adjustment of a reference range for detecting an overvoltage.

The pressure sensor 206 (also referred to as the second pressure sensor 206) of the station device 200 may be a sensor to measure pressure in the station device 200. The pressure sensor 206 may measure a pressure value before dust discharging, may measure a pressure value during dust discharging, or may measure a pressure value after dust discharging. The pressure sensor 206 may transfer a measured pressure value to the at least one processor 203 via inter integrated circuit (I2C) communication or UART communication. The pressure sensor 206 may be provided between the collector 209 and the suction motor 207, but the disclosure is not limited thereto. When the pressure sensor 206 is provided between the collector 209 and the suction motor 207, the pressure sensor 206 may be implemented as a negative pressure sensor as the pressure sensor 206 is located at the front end of the suction motor 207.

The suction motor 207 (that is the second suction motor 207) may be configured to generate a suction force for discharging, from the cleaner body 1000, foreign substances collected in the dustbin 1200 of the cleaner body 1000. The suction motor 207 may rotate a suction fan for moving air. The suction fan may include an impeller.

The power supply unit 208 may include a switching mode power supply (SMPS) for converting alternating current to direct current, the alternating current being supplied from a power source. When the cordless vacuum cleaner 100 is docked on the station device 200, the direct current converted by the power supply unit 208 is supplied to a battery of the cleaner body 1000 via a charge terminal, such that the battery may be charged.

The dust collector bin coupling portion may be provided to allow the dust collector bin (also referred to herein as dustbin) 1200 of the cleaner body 1000 to be docked therein.

When the dustbin 1200 is placed in the dust collector bin coupling portion, docking of the cleaner body 1000 on the station device 200 may be completed. The dust collector bin coupling portion may include a docking detection sensor for detecting docking of the cleaner body 1000. The docking detection sensor may be a tunnel magneto-resistance (TMR) sensor, but the disclosure is not limited thereto. The TMR sensor may detect a magnetic substance attached to the dustbin 1200, thereby sensing docking of the cleaner body 1000. The station device 200 may include a step motor (also referred to as the first step motor) to press one side of the cover 10 of the dustbin 1200 so as to open the cover 10 (also referred to as the door of the dustbin 1200) when the dustbin 1200 is docked in the station device 200. The station device 200 may further include a step motor (also referred to as the second step motor) to press one side of the cover 10 of the dustbin 1200 so as to close the cover 10 after dust discharging is completed.

The collector 209 refers to a space in which foreign substances discharged from the dustbin 1200 of the cleaner body 1000 may be collected. The collector 209 may include a dust bag in which foreign substances discharged from the dustbin 1200 are collected. The dust bag may include a material that allows air to pass through while preventing foreign substances from passing through, so that foreign substances introduced from the dustbin 1200 to the collector 209 may be collected therein. The dust bag may be detachable from the collector 209. The station device 200 may include an ultraviolet (UV) emitter to emit UV rays to the collector 209. The UV emitter may include a plurality of UV ramps. The UV emitter may suppress proliferation of germs in the collector 209 including the dust bag. For example, the UV emitter may suppress proliferation of germs from dust in the dust bag.

The filter unit may filter out ultrafine particles that are not collected by the collector 209. The filter unit may include a discharge port to allow air passing through a filter to be discharged from the station device 200. The filter unit may include a motor filter, a high-efficiency particulate air (HEPA) filter, etc., but the disclosure is not limited thereto.

The ZCP circuit 212 is a circuit to detect a ZCP of an AC input voltage applied to the station device 200. The ZCP circuit 212 may include an isolation half-wave ZCP circuit or a non-isolation half-wave ZCP circuit, but the disclosure is not limited thereto. The isolation half-wave ZCP circuit may include a photo coupler and a diode. The non-isolation half-wave ZCP circuit may include a transistor operating as a switching device, and a diode. The at least one processor 203 may detect a ZCP of an AC input voltage, based on a stage change (e.g., High↔Low) in an input port connected to the ZCP circuit 212. The ZCP circuit 212 will be described in detail with reference to FIGS. 9 and 20 below.

Figure 5:
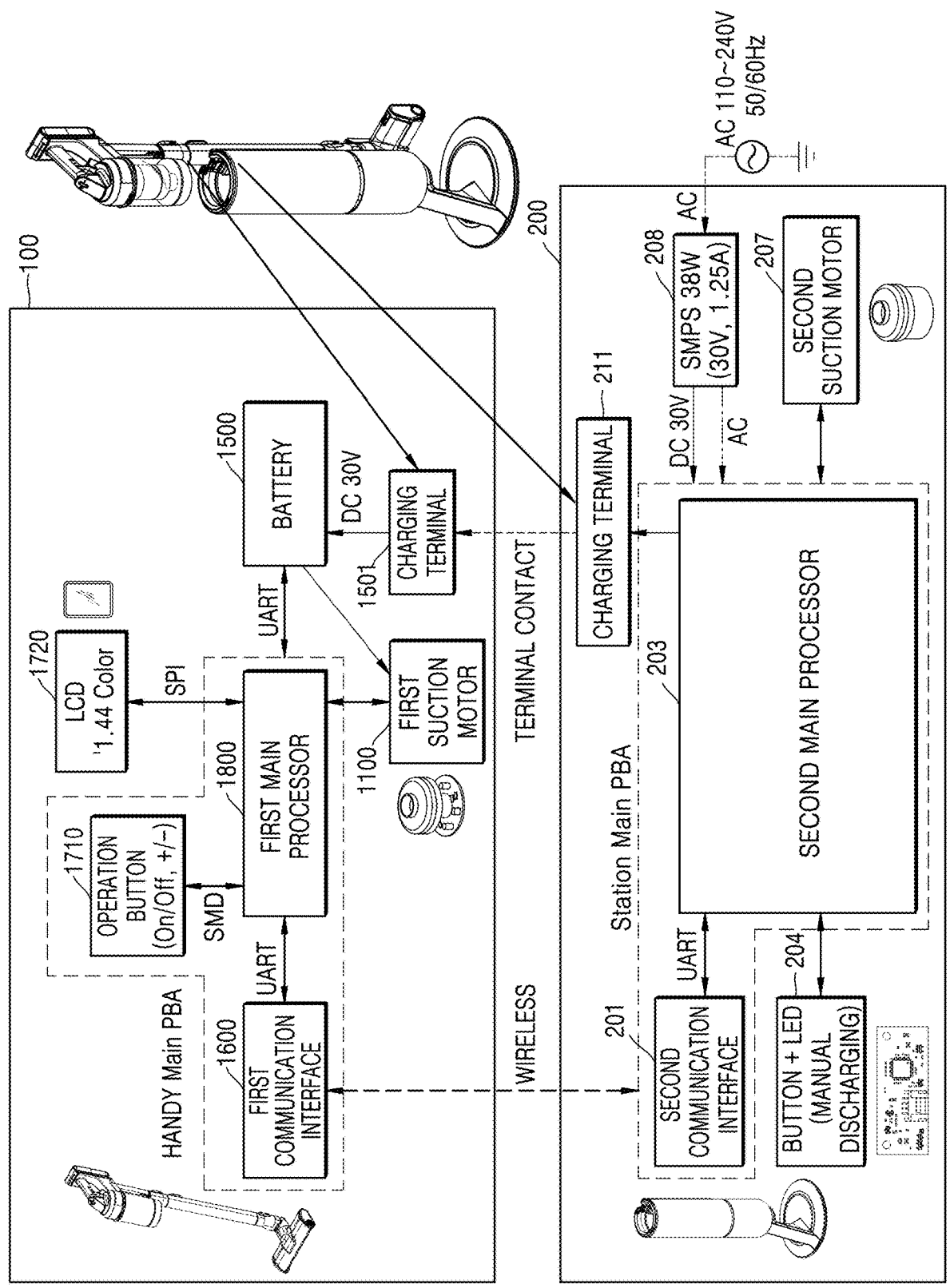
FIG. 5 is a block diagram illustrating functions of a station device and functions of a cordless vacuum cleaner, according to an embodiment of the disclosure.

FIG. 5 is a block diagram illustrating functions of the station device 200 and functions of the cordless vacuum cleaner 100, according to an embodiment of the disclosure.

According to an embodiment of the disclosure, the cordless vacuum cleaner 100 may include a suction motor 1110 (hereinafter, referred to as the first suction motor 1110), a battery 1500 (also, referred to as the battery module 1500), a charging terminal 1501, a communication interface 1600 (hereinafter, referred to as the first communication interface 1600), an input interface 1710, an output interface 1720, and a main processor 1800 (hereinafter, referred to as the first main processor 1800), but the disclosure is not limited thereto. According to an embodiment of the disclosure, the first communication interface 1600, the input interface 1710, and the main processor 1800 may be included in a main printed board assembly (PBA) or a printed circuit board assembly of the cleaner body 1000. A configuration of the cordless vacuum cleaner 100 will be described in detail with reference to FIG. 6 below.

According to an embodiment of the disclosure, the station device 200 may include a communication interface 201 (hereinafter, referred to as the second communication interface 201), the main processor 203 (hereinafter, the second main processor 203), a user interface 204, the suction motor 207 (hereinafter, referred to as the second suction motor 207), a power supply unit 208, and a charging terminal 211, but the disclosure is not limited thereto. The second communication interface 201 and the second main processor 203 may be included in a main PBA of the station device 200. As a configuration of the station device 200 is described in detail with reference to FIG. 4, redundant descriptions are not provided here.

According to an embodiment of the disclosure, the station device 200 may be configured to charge the battery 1500 included in the cordless vacuum cleaner 100. Therefore, when the cordless vacuum cleaner 100 is docked on the station device 200, the charging terminal 1501 of the cordless vacuum cleaner 100 may contact the charging terminal 211 of the station device 200 connected to the power supply unit 208 (e.g., SMPS), and the battery 1500 of the cordless vacuum cleaner 100 may be provided a direct current (DC) power from the power supply unit 208 of the station device 200.

Figure 6:
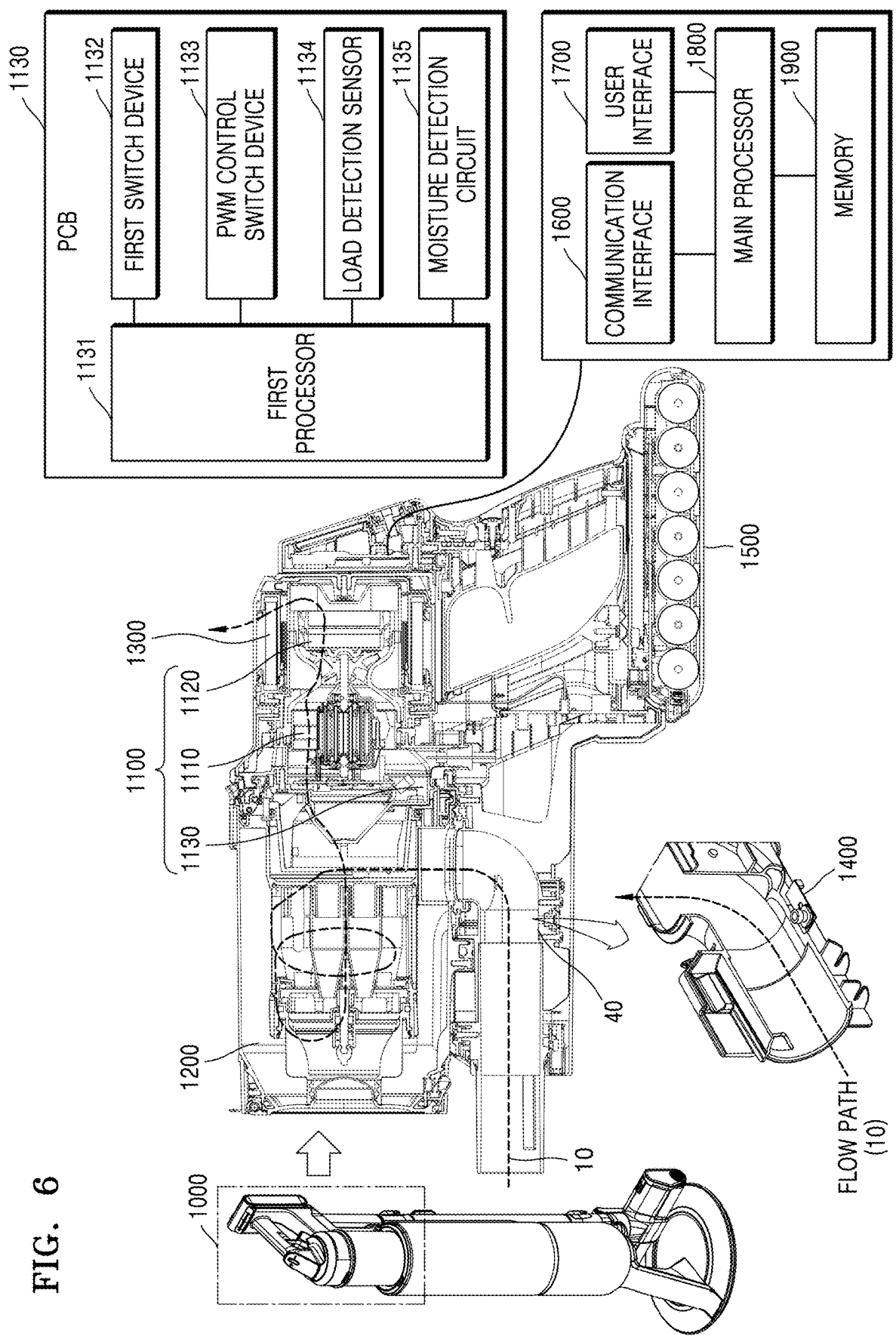
FIG. 6 is a diagram illustrating a cleaner body according to an embodiment of the disclosure.

According to an embodiment of the disclosure, when the cordless vacuum cleaner 100 is docked on the station device 200, the first communication interface 1600 of the cordless vacuum cleaner 100 and the second communication interface 201 of the station device 200 may establish a short-range wireless communication channel. For example, the first communication interface 1600 of the cordless vacuum cleaner 100 and the second communication interface 201 of the station device 200 may perform BLE communication, but the disclosure is not limited thereto. With reference to FIG. 6, a configuration of the cordless vacuum cleaner 100 will now be described in detail.

FIG. 6 is a diagram illustrating a cleaner body according to an embodiment of the disclosure.

Referring to FIG. 6, the cleaner body 1000 may include a suction force generator (hereinafter, also referred to as the motor assembly 1100) to generate a suction force requested to suck up foreign substances on a cleaning-target surface, the dust collector bin 1200 (also referred to as the dustbin 1200) in which foreign substances sucked up from a cleaning-target surface are contained, a filter unit 1300, a pressure sensor 1400, the battery module 1500 to supply power to the motor assembly 1100, the communication interface 1600, a user interface 1700, the main processor 1800, and a memory 1900. However, not all elements shown in FIG. 6 are necessary elements. The cleaner body 1000 may be embodied with more elements than the elements shown in FIG. 6 or may be embodied with fewer elements than the shown elements. For example, the cleaner body 1000 may further include a motion sensor (not shown).

Hereinafter, each configuration will now be described.

The motor assembly 1100 may include the suction motor 1110 for converting an electric force to mechanical rotary power, an impeller 1120 rotatably connected to the suction motor 1110, and a printed circuit board (PCB) 1130 connected to the suction motor 1110. The suction motor 1110 and the impeller 1120 rotatably connected to the suction motor 1110 may create vacuum in the cordless vacuum cleaner 100. Here, vacuum indicates a state lower than a barometric pressure. The suction motor 1110 may include a brushless direct current (BLDC), but the disclosure is not limited thereto.

The PCB 1130 may include, but is not limited to, a processor (hereinafter, also referred to as a first processor 1131) to control the suction motor 1110 and control communication with the brush device 2000, a first switch device 1132 connected to a signal line, a switch device 1133 (hereinafter, also referred to as the pulse width modulation (PWM) control switch device 1133) used to supply power to the brush device 2000, a load detection sensor 1134 configured to detect a load of the brush device 2000, and a moisture detection circuit 1135 configured to detect moisture introduced into the cleaner body 1000 through a flow path, but the disclosure is not limited thereto. The PWM control switch device 1133 may include a field effect transistor (FET), a bipolar junction transistor (BJT), an insulated gate bipolar transistor (IGBT), etc. The load detection sensor 1134 may include a shunt resistor, shunt resistor and amplifier circuit (operational amplifier (OP-AMP)), a current detection sensor, a magnetic field sensor (non-invasive scheme), etc. Hereinafter, for convenience of descriptions, the FET will now be described as an example of the PWM control switch device 1133, and the shunt resistor will now be described as an example of the load detection sensor 1134. The moisture detection circuit 1135 may include a part that is open when a liquid is not introduced and then forms resistance upon instruction of the liquid. The moisture detection circuit 1135 may include a voltage distribution circuit. The moisture detection circuit 1135 may be positioned between a + terminal and a − terminal which electrically connect the motor assembly 1100 and the battery module 1500. The moisture detection circuit 1135 may be connected to a + power line receiving a power from an input port of the first processor 1131 and the battery module 1500, but the disclosure is not limited thereto.

The motor assembly 1100 may have a reversed motor structure in which positions of the impeller 1120 and the PCB 1130 are reversed. In the reversed motor structure, the PCB 1130 is positioned below the suction motor 1110, and the impeller 1120 is positioned above the suction motor 1110, based on an air flow direction. Therefore, the impeller 1120 may be closer to the filter unit 1300, compared to the PCB 1130.

The first processor 1131 may obtain data related to a state (hereinafter, the state data) of the suction motor 1110, and data about moisture introduction, and may transmit the data about moisture introduction to the main processor 1800. Also, the first processor 1131 may control (e.g., turn on or turn off) an operation of the first switch device 1132 connected to a signal line, thereby transmitting a signal (hereinafter, also referred to as the first signal) to the brush device 2000 via the signal line. The first switch device 1132 is a device capable of switching a state of the signal line to Low. For example, the first switch device 1132 is a device capable of switching a voltage of the signal line to 0 V. The first signal may include data indicating at least one of a target rotation count per minute (hereinafter, also referred to as the target drum RPM) of the rotary brush of the brush device 2000, a target trip level of the brush device 2000, or power consumption of the suction motor 1110, but the disclosure is not limited thereto. For example, the first signal may include data for controlling a lighting device included in the brush device 2000. The first signal may be implemented as a preset number of bits. For example, the first signal may be implemented as 5 bits or 8 bits, and may have a transmission period of 10 ms per 1 bit, but the disclosure is not limited thereto.

The first processor 1131 may detect a signal (hereinafter, also referred to as the second signal) transmitted from the brush device 2000 via the signal line. The second signal may include data indicating a current state of the brush device 2000, but the disclosure is not limited thereto. For example, the second signal may include data (e.g., a current drum RPM, a current trip level, a current lighting device setting value, etc.) about a current operation condition. Also, the second signal may further include data indicating a type of the brush device 2000. The first processor 1131 may transfer, to the main processor 1800, the data indicating the current state of the brush device 2000 or the data indicating the type of the brush device 2000.

The motor assembly 1100 may be provided in the dust collector bin (the dustbin 1200). The dust collector bin 1200 may be configured such that dust in the air or garbage drawn via the brush device 2000 are sorted out and collected. The dust collector bin 1200 may be detachably affixed to the cleaner body 1000.

The dust collector bin 1200 may collect foreign substances by using a cyclone scheme to separate foreign substances by using a centrifugal force. Air from which foreign substances are removed according to the cyclone scheme may be discharged from the cleaner body 1000, and the foreign substances may be stored in the dust collector bin 1200. A multi-cyclone structure may be provided in the dust collector bin 1200. The dust collector bin 1200 may be provided such that foreign substances are collected at the lower side of the multi-cyclone structure. The dust collector bin 1200 may include a dust collector bin door (also referred to as the cover 10 of the dustbin 1200) provided to be open when the station device 200 is connected. The dust collector bin 1200 may include a first dust collector in which relatively large foreign substances are firstly collected, and a second dust collector in which relatively small foreign substances are secondly collected. Both the first dust collector and the second dust collector may be provided to be open to the outside when the dust collector bin door is open.

The filter unit 1300 may filter out ultrafine particles that are not filtered out by the dust collector bin 1200. The filter unit 1300 may include a discharge port to allow air passing through a filter to be discharged from the cleaner. The filter unit 1300 may include a motor filter, a HEPA filter, etc., but the disclosure is not limited thereto.

The pressure sensor 1400 may measure a pressure (hereinafter, also referred to as a flow path pressure) in a flow path. When the pressure sensor 1400 is provided at the suction end (e.g.: a suction duct 40), the pressure sensor 1400 may measure a change in a flow speed at its location by measuring a static pressure. The pressure sensor 1400 may be an absolute pressure sensor or a relative pressure sensor. When the pressure sensor 1400 is the absolute pressure sensor, the main processor 1800 may sense, by using the pressure sensor 1400, a first pressure value before the suction motor 1110 is operated. Then, the main processor 1800 may sense a second pressure value after the suction motor 1110 is operated at a target RPM, and may use a difference between the first pressure value and the second pressure value, as a pressure value in the flow path. Here, the first pressure value may be a pressure value due to inside/outside affects such as weather, altitude, a state of the cleaner, an amount of sucked up dust, etc., the second pressure value may be a pressure value due to inside/outside affects such as altitude, a state of the cleaner, an amount of sucked up dust, etc., and a pressure value due to operation of the suction motor 1110, and a difference between the first pressure value and the second pressure value may be a pressure value due to operation of the suction motor 1110. Therefore, when the difference between the first pressure value and the second pressure value is used as a pressure value in the flow path, inside/outside affects other than the suction motor 1110 may be minimized.

A flow path pressure measured by the pressure sensor 1400 may be used to identify a current usage environment state (e.g.: a state (hard floor, carpet, mat, corner, etc.) of a cleaning-target surface, a state being lifted from the cleaning-target surface, etc.) of the brush device 2000, or may be used to measure a suction force that changes due to a contamination level or an amount of collected dust.

The pressure sensor 1400 may be provided at the suction end (e.g.: the suction duct 40). The suction duct 40 may be a structure via which the dust collector bin 1200 and the extension tube 3000 or the dust collector bin 1200 and the brush device 2000 are connected to allow a flow including foreign substances to be moved to the dust collector bin 1200. The pressure sensor 1400 may be located at the end of a straight portion (or a knee point between the straight portion and a curve portion) of the suction duct 40, in consideration of contamination of foreign substances/dust, but the disclosure is not limited thereto. The pressure sensor 1400 may be provided at the middle of the straight portion of the suction duct 40. When the pressure sensor 1400 is located at the suction duct 40, as the pressure sensor 1400 is located at the front end of the suction motor 1110 which generates a suction force, the pressure sensor 1400 may be implemented as a negative pressure sensor.

In the disclosure, a case where the pressure sensor 1400 is located in suction duct 40 is described, but the disclosure is not limited thereto. The pressure sensor 1400 may be located at a discharge end (e.g.: in the motor assembly 1100). When the pressure sensor 1400 is located at the discharge end, as the pressure sensor 1400 is located at the rear end of the suction motor 1110, the pressure sensor 1400 may be implemented as a positive pressure sensor. Also, the pressure sensor 1400 may be provided in a multiple number in the cleaner.

The battery module 1500 may be detachably mounted at the cleaner body 1000. The battery module 1500 may be electrically connected to a charge terminal provided at the station device 200. The battery module 1500 may be charged by receiving power from the charge terminal. According to an embodiment of the disclosure, the battery module 1500 may include a processor (e.g., a Micom, a microprocessor computer, or a microprocessor controller) to control a voltage supplied to the cleaner body 1000 and communicate with the main processor 1800. The battery module 1500 may perform data communication with the main processor 1800. The battery module 1500 may periodically transmit information about a battery charging state, an output voltage, or the like to the main processor 1800.

The battery module 1500 may include a LED display to indicate charging, discharging, or a state of a battery. For example, the LED display may display a red color, an orange color, or a yellow color according to a charging percentage, and may display a green color upon completion of charging.

The communication interface 1600 may include a module to perform communication with an external device. For example, the cleaner body 1000 may perform communication with the station device 200 or the server device via the communication interface 1600. The communication interface 1600 may include a short-range wireless communication interface, a long-range wireless communication interface, or the like. The short-range wireless communication interface may include a Bluetooth communication interface, a BLE communication interface, a NFC interface, a WLAN (or Wi-Fi) communication interface, a ZigBee communication interface, an IrDA communication interface, a WFD communication interface, an UWB communication interface, or an Ant+ communication interface, but the disclosure is not limited thereto. The long-range wireless communication interface may be used for the cleaner body 1000 to remotely communicate with the server device. The long-range wireless communication interface may include Internet, a computer network (e.g., LAN or WAN), a mobile communication interface, and the like. The mobile communication interface may include a 3G module, a 4G module, a 5G module, a LTE module, a NB-IoT module, and an LTE-M module, but the disclosure is not limited thereto.

The user interface 1700 may be provided at a handle. The user interface 1700 may include an input interface and an output interface. The cleaner body 1000 may receive a user input associated with an operation of the cleaner via the user interface 1700, and may output information associated with the operation of the cleaner. The cleaner body 1000 may output, via the user interface 1700, information about an operation state, information about a battery remaining quantity, information about a docking state, information about a state of the dustbin 1200, information about a state of a dust bag, information about moisture introduction, or the like.

The input interface may include at least one of a motion input unit, a voice input unit (e.g., a microphone), or a manipulation input unit (a power button, a suction force level adjustment button), but the disclosure is not limited thereto. The output interface may include an LED display, an LCD, a touch screen, a speaker, etc., but the disclosure is not limited thereto.

The cleaner body 1000 may include at least one processor 1001. The cleaner body 1000 may include one processor or may include a plurality of processors. For example, the cleaner body 1000 may include the main processor 1800 connected to the user interface 1700, and the first processor 1131 connected to the suction motor 1110. The at least one processor 1001 may control all operations of the cleaner. For example, the at least one processor 1001 may determine power consumption (suction force level) of the suction motor 1110, a drum RPM of the brush device 2000, a trip level of the brush device 2000, or the like.

The at least one processor 1001 according to the disclosure may include at least one of a CPU, a GPU, an APU, a MIC, a DSP, or a NPU. The at least one processor 1001 may be implemented in the form of SoC in which one or more electronic parts are integrated. Each of the at least one processor 1001 may be implemented as separate hardware (H/W). The at least one processor 1001 may be referred to as a micro-computer/microprocessor computer/microprocessor controller (Micom), a micro-processor unit (MPU), a micro-controller Unit).

The at least one processor 1001 according to an embodiment of the disclosure may be implemented as a single core processor or a multicore processor.

The memory 1900 may store a program for processing and control by the main processor 1800 and/or the first processor 1131, and may store a plurality of pieces of input/output data. For example, the memory 1900 may store a pre-trained artificial intelligence (AI) model (e.g.: a support vector machine (SVM) algorithm, etc.), state data of the suction motor 1110, a measurement value of the pressure sensor 1400, state data of the battery module 1500, state data of the brush device 2000, error occurrence data (error history data), power consumption of the suction motor 1110 corresponding to an operation condition, an RPM of a drum having a rotary brush attached thereto, a trip level, an operation sequence of the suction motor 1110 corresponding to a suction force generation pattern, a type of the brush device 2000 corresponding to a voltage value input via a signal line, a PWM frequency for each type of the brush device 2000, an average input voltage for each type of the brush device 2000, and a high-load reference value (or a low-load reference value) for each type of the brush device 2000, information about predefined motion patterns (e.g., user gestures) corresponding to a plurality of control commands, information about moisture introduction into the cleaner body 1000, or the like.

The memory 1900 may include an external memory and an internal memory. For example, the memory 1900 may include at least one type of storage medium from among flash memory, a hard disk, a multimedia card micro, a memory card (e.g., a SD or XD memory card), RAM, SRAM, ROM, EEPROM, PROM, magnetic memory, a magnetic disk, and an optical disc. The programs stored in the memory 1900 may be classified into a plurality of modules depending on functions thereof.

Hereinafter, with reference to FIG. 7, operations of processors of the cleaner will now be described in detail.

Figure 7:
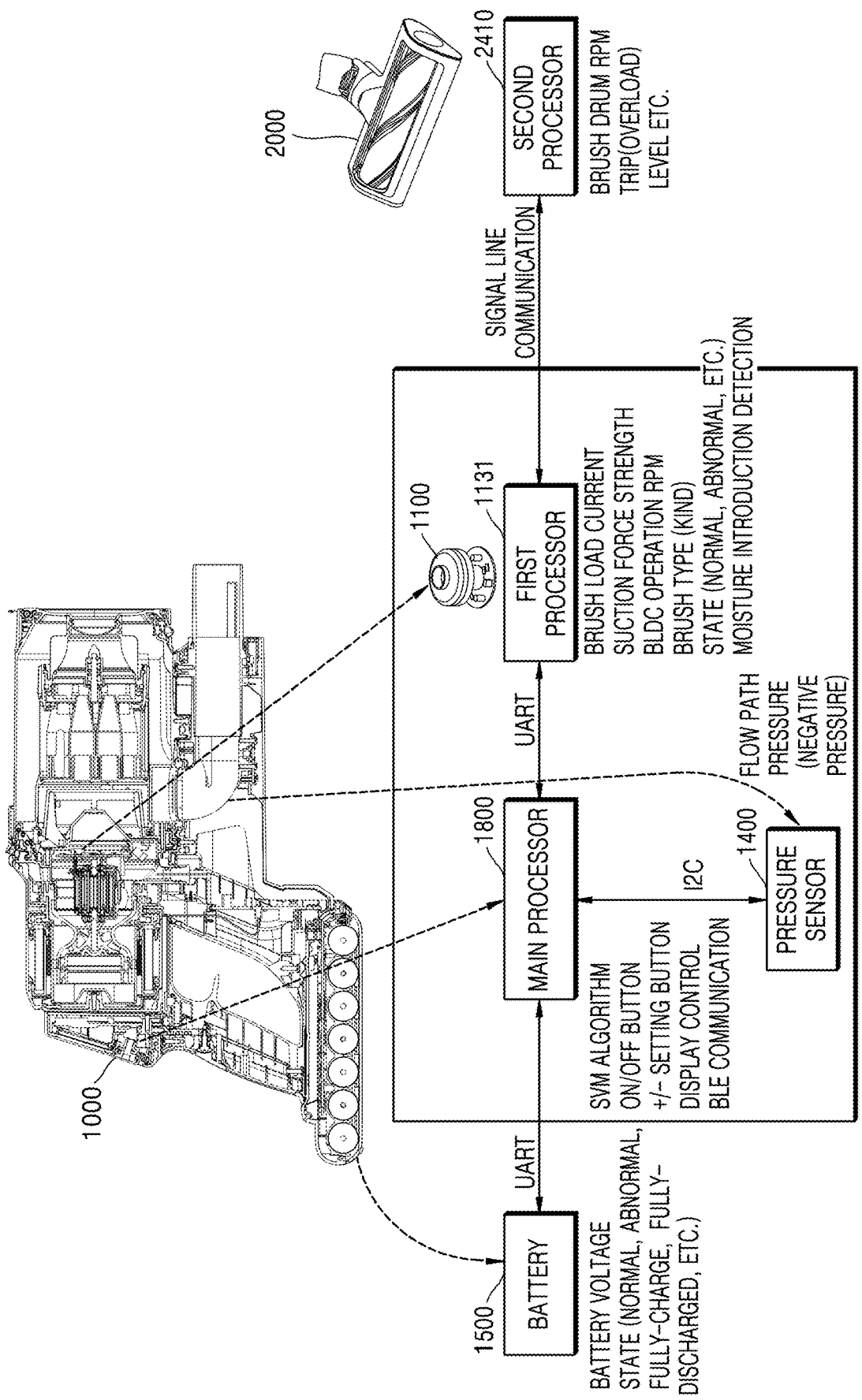
FIG. 7 is a diagram illustrating the operations of processors of a cordless vacuum cleaner according to an embodiment of the disclosure.

FIG. 7 illustrates operations of processors of the cleaner according to an embodiment of the disclosure.

Referring to FIG. 7, the main processor 1800 may check a state of parts in the cleaner by communicating with the battery module 1500, the pressure sensor 1400, a motion sensor (not shown) (e.g., a gyro sensor, an acceleration sensor), and the first processor 1131 in the motor assembly 1100. Here, the main processor 1800 may periodically communicate with each of the parts by using UART communication or I2C communication, but the disclosure is not limited thereto. For example, the main processor 1800 may obtain data about a voltage state (e.g., normal, abnormal, fully-charged, fully-discharged, etc.) of the battery from the battery module 1500 by using the UART. The main processor 1800 may obtain, from the pressure sensor 1400, data about a flow path pressure by using the I2C communication. The main processor 1800 may obtain angular velocity data from a gyro sensor (not shown) via the UART communication, and may also obtain acceleration data from an acceleration sensor (not shown) via the I2C communication.

Also, the main processor 1800 may obtain data about a suction force level, an RPM of the suction motor 1110, a state (e.g., normal, abnormal, etc.) of the suction motor 1110, or the like from the first processor 1131 connected to the suction motor 1110, by using the UART communication. A suction force is an electric force consumed to operate the cordless vacuum cleaner 100, and may be expressed as power consumption. The main processor 1800 may obtain, from the first processor 1131, data associated with a load of the brush device 2000 and data associated with a type of the brush device 2000. The main processor 1800 may obtain, from the first processor 1131, data about moisture introduction into the cordless vacuum cleaner 100.

The first processor 1131 may obtain state data (e.g., a drum RPM, a trip level, normal, abnormal, etc.) of the brush device 2000 from the brush device 2000 via signal line communication with a second processor 2410 of the brush device 2000. Here, the first processor 1131 may transfer the state data of the brush device 2000 to the main processor 1800 via the UART communication. According to an embodiment of the disclosure, the first processor 1131 may transfer, in different periods, state data of the suction motor 1110 and the state data of the brush device 2000 to the main processor 1800. For example, the first processor 1131 may transfer the state data of the suction motor 1110 to the main processor 1800 once per 0.02 seconds, and may transfer the state data of the brush device 2000 to the main processor 1800 once per 0.2 seconds, but the disclosure is not limited thereto.

The main processor 1800 may determine whether an error occurs, based on a state of parts in the cordless vacuum cleaner 100, a state of the suction motor 1110, and a state of the brush device 2000, and may periodically transmit data associated with error occurrence to the station device 200 via short-range wireless communication (e.g.: BLE communication).

When the first processor 1131 of the cleaner body 1000 is connected to the second processor 2410 of the brush device 2000 via the UART communication or the I2C communication, damage (e.g.: an excess of a maximum voltage of a Micom AD port) to a circuit device due to high impedance influence due to an inner line of the extension tube 3000, electro static discharge (ESD) and/or over voltage may occur as a problem. Therefore, according to an embodiment of the disclosure, the first processor 1131 of the cleaner body 1000 and the second processor 2410 of the brush device 2000 may perform signal line communication, instead of the UART communication or the I2C communication. Here, a circuit for the signal line communication may include a voltage distribution circuit (hereinafter, also referred to as the voltage distributor) to prevent the circuit device from being damaged due to over voltage, power noise, a surge, electrical overstress (ESD), electrical discharge (EOS), or the like. However, communication between the first processor 1131 of the cleaner body 1000 and the second processor 2410 of the brush device 2000 is not limited to the signal line communication.

According to an embodiment of the disclosure, when a noise reduction circuit is applied to the cleaner body 1000 and the brush device 2000, the first processor 1131 of the cleaner body 1000 and the second processor 2410 of the brush device 2000 may perform communication using the UART communication or the I2C communication. The noise reduction circuit may include at least one of a low pass filter, a high pass filter, a band pass filter, a damping resistor, or a distribution resistor, but the disclosure is not limited thereto. According to an embodiment of the disclosure, a level shifter circuit is applied to the cleaner body 1000 and the brush device 2000, the first processor 1131 of the cleaner body 1000 and the second processor 2410 of the brush device 2000 may perform communication using the UART communication or the I2C communication. Hereinafter, for convenience of descriptions, an example in which the cleaner body 1000 and the brush device 2000 perform the signal line communication will be mainly described.

The main processor 1800 may receive a user input with respect to a setting button (e.g., ON/OFF button, +/− setting button) included in the user interface 1700, and may control output of an LCD. By using the pre-trained AI model (e.g., the SVM algorithm), the main processor 1800 may identify a usage environment state (e.g., a state (hard floor, carpet, mat, corner, etc.) of a cleaning-target surface, a state being lifted from the cleaning-target surface, etc.) of the brush device 2000, and may determine operation information (e.g., power consumption of the suction motor 1110, a drum RPM, a trip level, etc.) of the cordless vacuum cleaner 100 which corresponds to the usage environment state of the brush device 2000. Here, the main processor 1800 may transfer, to the first processor 1131, the operation information of the cordless vacuum cleaner 100 which corresponds to the usage environment state of the brush device 2000. The first processor 1131 may adjust a suction force level (power consumption, RPM) of the suction motor 1110, according to the operation information of the cordless vacuum cleaner 100, and may transfer the operation information of the cordless vacuum cleaner 100 which corresponds to the usage environment state of the brush device 2000, to the second processor 2410 via signal line communication. In this case, the second processor 2410 may adjust a drum RPM, a trip level, a lighting device (e.g., LED display), or the like, according to the operation information of the cordless vacuum cleaner 100.

Hereinafter, with reference to FIGS. 8 to 13, a method by which the cordless vacuum cleaner 100 detects an overvoltage with respect to the station device 200 will now be described.

Figure 8:
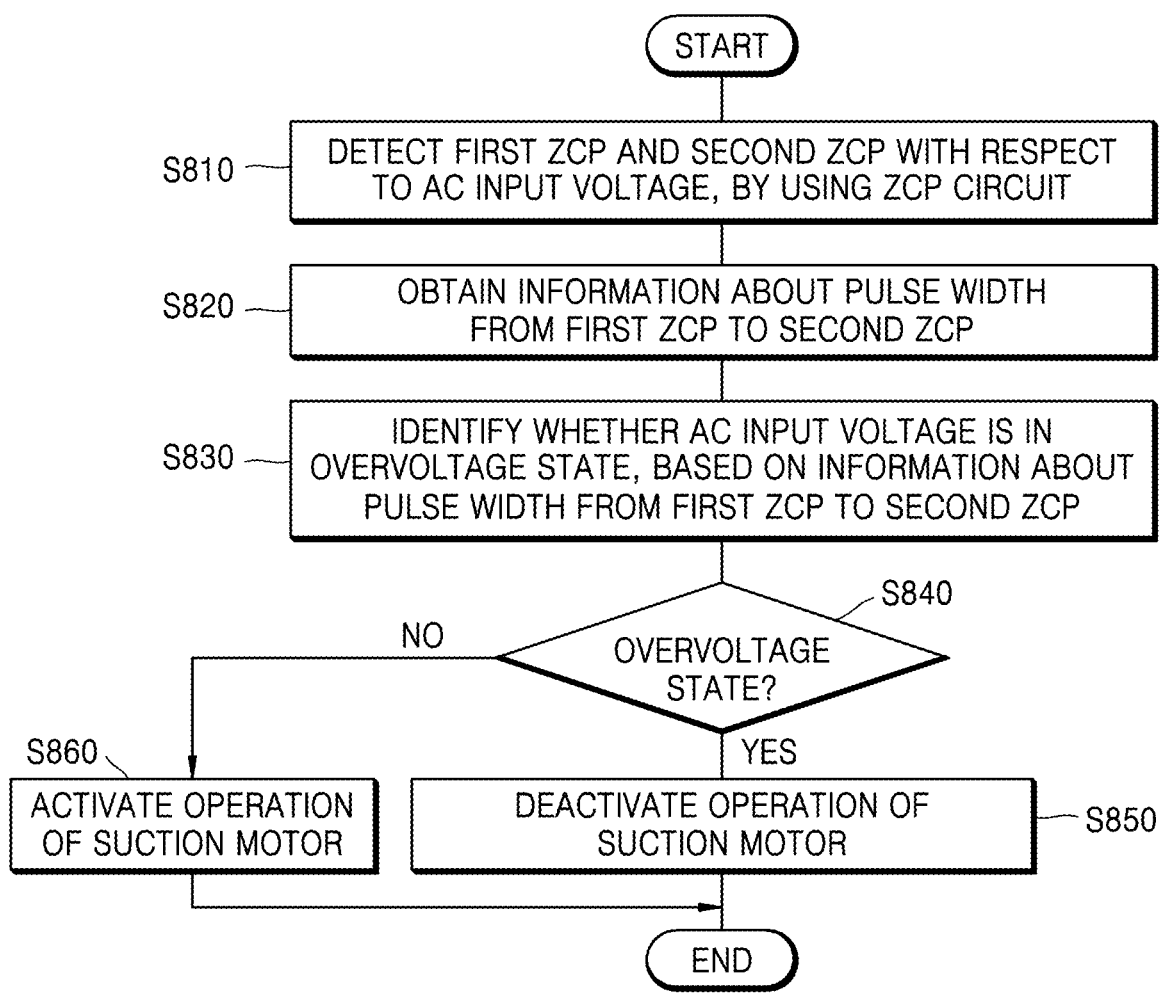
FIG. 8 is a flowchart illustrating a method, performed by a station device, of detecting an overvoltage, according to an embodiment of the disclosure.

FIG. 8 is a flowchart illustrating a method, performed by the station device 200, of detecting an overvoltage, according to an embodiment of the disclosure.

Referring to FIG. 8, the method by which the station device 200 detects an overvoltage according to an embodiment of the disclosure may include operations S810 to S860. In an embodiment of the disclosure, operations S810 to S860 may be performed by the at least one processor 203 included in the station device 200. The method by which the station device 200 detects an overvoltage is not limited to what is shown in FIG. 8, and in one or more embodiments, operations not shown in FIG. 8 may be further included or some operations may be omitted.

In operation S810, the station device 200 according to an embodiment of the disclosure may detect a first ZCP and a second ZCP with respect to an AC input voltage applied to the station device 200, by using the ZCP circuit 212.

According to an embodiment of the disclosure, the first ZCP may be a falling zero crossing point (falling ZCP) at which the AC input voltage (sine wave) falls from a positive value to a negative value, and the second ZCP may be a rising zero crossing point (rising ZCP) at which the AC input voltage (sine wave) rises from a negative value to a positive value, but the disclosure is not limited thereto. For example, the first ZCP may be a rising zero crossing point (a point at which the AC input voltage (sine wave) rises from a first value to a second value), and the second ZCP may be a falling zero crossing point (a point at which the AC input voltage (sine wave) falls from a second value to a first value). Hereinafter, for convenience of descriptions, an example in which the first ZCP is a falling zero crossing point and the second ZCP is a rising zero crossing point will now be described.

According to an embodiment of the disclosure, the at least one processor 203 of the station device 200 may detect the first ZCP and the second ZCP which are points at which a voltage is greater than 0 V by a preset value in an AC input voltage (sine wave). That is, the first ZCP and the second ZCP which are detected by the at least one processor 203 via the ZCP circuit 212 may be somewhat different from an actual ZCP of the AC input voltage. Here, the preset value may vary according to types of the ZCP circuit 212. For example, the at least one processor 203 may detect the first ZCP and the second ZCP as points where the AC input voltage is 31.725V in an isolation half-wave ZCP circuit, and may detect the first ZCP and the second ZCP as points where the AC input voltage is 2.1 V in a non-isolation half-wave ZCP circuit.

Figure 9:
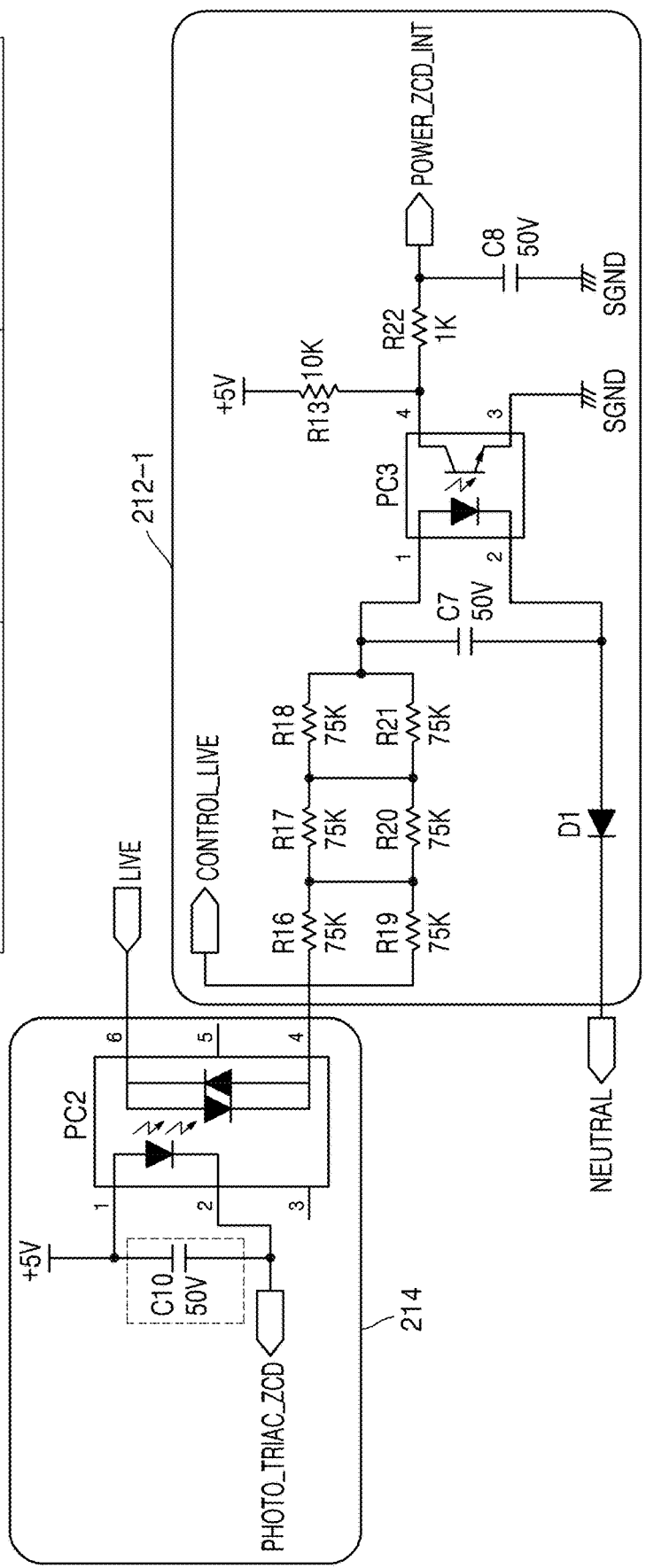
FIG. 9 is a diagram illustrating a ZCP circuit and a standby power block circuit according to an embodiment of the disclosure.

With reference to FIG. 9, an isolation half-wave ZCP circuit 212-1 will be first described. FIG. 9 is a diagram illustrating the ZCP circuit 212 and a standby power block circuit 214 according to an embodiment of the disclosure.

Referring to FIG. 9, the isolation half-wave ZCP circuit 212-1 may include resistors (e.g., R16, R17, R18, R19, R20, and R21), a diode D1, a capacitor C7, a photo coupler PC3, etc. Here, the resistors (e.g., R16, R17, R18, R19, R20, and R21) may be circuits configured to operate the photo coupler PC3. The diode D1 may be provided for a half-wave circuit (prevention of an inverse voltage). The capacitor C7 may be provided to prevent the photo coupler PC3 from malfunctioning due to noise. The photo coupler PC3 is provided to completely separate two circuits that operate with different powers. The photo coupler PC3 is configured to deliver an electric signal as light. The photo coupler PC3 may be a light-emitting device (e.g., a light-emitting diode) that is configured to deliver light, and a light-receiving device (e.g., a photo transistor (photo TR)) to serve as a switch. As an insulating material is arranged between the light-emitting device and the light-receiving device, current may not flow therebetween. The light-emitting device of the photo coupler PC3 transmits a signal to the photo TR via IRED light output, thereby allowing the photo TR to serve as the switch.

In the isolation half-wave ZCP circuit 212-1 of FIG. 9, Live/Neutral are AC input voltage input terminals, and Power_zero crossing detector (ZCD)_INT is connected to an input port (e.g., Micom input port) of the processor 203, such that the processor 203 may detect a ZCP.

For example, referring to Table 900 of FIG. 9, when an AC input voltage rises to reach a reference voltage (e.g., 31.725V), the photo coupler PC3 of the isolation half-wave ZCP circuit 212-1 may operate (e.g., light of an LED at an input side of the photo coupler PC3 is output). When the photo coupler PC3 operates, a voltage input to the at least one processor 203 (e.g., Micom) decreases from 5V (High) to 0.2V (Low). The at least one processor 203 may detect, as a rising ZCP (e.g., the second ZCP), a point at which the input voltage is changed from 5V (High) to 0.2V (Low).

On the other hand, when the AC input voltage falls to be equal to or less than the reference voltage (e.g., 31.725V), the operation of the photo coupler PC3 may be suspended. When the operation of the photo coupler PC3 is suspended, a voltage input to the at least one processor 203 may be changed from 0.2V (Low) to 5V (High). The at least one processor 203 may detect, as a falling ZCP (e.g., the first ZCP), a point at which the input voltage is changed from 0.2V (Low) to 5V (High).

That is, according to an embodiment of the disclosure, as an input state is changed (e.g., from High to Low or from Low to High) with respect to a minimum reference voltage with which the photo coupler PC3 operates, the at least one processor 203 may detect ZCPs. For example, the minimum reference voltage with which the photo coupler PC3 operates in the isolation half-wave ZCP circuit 212-1 of FIG. 9 may be calculated as below.

Current that flows in a secondary-side (output side) of the photo coupler PC3 is $$IC = 5V/10 kohm = 0.5\ mA,$$

current that flows in a primary-side (nos. 1 and 3 of PC3) of the photo coupler PC3 is $$IF = \{AC\ input\ voltage - (PC2\ V_{TH} 1.7\ V + PC3\ V_F\ 1.2\ V + D1\ V_F\ 0.7\ V)\} / \{(R16\|R19) + (R17\|R20) + (R18\|R21)\}$$

$$= AC\{(R16\|R19) + (R17\|R20) + (R18\|R21)\}$$

$$= (AC\ input\ voltage - 3.6\ V)/112.5\ kohm$$

where, as an operation characteristic of the photo coupler PC3 is IF*CTR>IC,
(a current transfer ratio (CRT) indicates that a ratio of collector current (IC) of an output side (photo TR) to current (IF) applied to an input side (IRED) is expressed as percentage (%))

$$IF * CTR > IC$$

$$(AC\ input\ voltage - 3.6\ V)/112.5\ kohm\} * CTR > IC$$

$$\{(AC\ input\ voltage - 3.6\ V)/112.5\ kohm\} > IC/CTR$$

$$(AC\ input\ voltage - 3.6\ V) > (IC/CTR) * 112.5\ kohm$$

$$AC\ input\ voltage > \{(IC/CTR) * 112.5\ kohm\} + 3.6\ V$$

The at least one processor 203 of the station device 200 detects a ZCP, based on a minimum AC input voltage satisfying Equation above.

For example, when calculating CTR = 200%, $$AC\ input\ voltage > \{(0.5\ mA/2.0) * 112.5\ kohm\} + 3.6\ V$$

$$AC\ input\ voltage > 31.725\ V$$

That is, the at least one processor 203 of the station device 200 detects, as a ZCP, a point at which an AC input voltage is 31.725V. The at least one processor 203 of the station device 200 detects a point of a rather high voltage as a ZCP, not a point of 0 V, due to a ZCP detection and protection circuit. Here, the protection circuit may include the standby power block (decrease) circuit 214. That is, referring to FIG. 9, the standby power block circuit 214 may be connected to the isolation half-wave ZCP circuit 212-1. When the at least one processor 203 does not have to detect a ZCP (e.g., when there is no need to perform a dust discharging operation), the at least one processor 203 may adjust PHOTO_TRI-AC_ZCD of the standby power block circuit 214 to High (5V) so as to block power consumption due to the resistors R16 to R21, the photo coupler PC3 (primary-side LED Vf), the diode D1, etc. included in the isolation half-wave ZCP circuit 212-1 When PHOTO_TRIAC_ZCD is set to High (5V), current may not flow to the resistors R16 to R21, the photo coupler PC3 (primary-side LED Vf), the diode D1, etc. included in the isolation half-wave ZCP circuit 212-1.

As a result, according to an embodiment of the disclosure, the at least one processor 203 may detect a ZCP of an AC input voltage, according to a state change in an input port connected to the isolation half-wave ZCP circuit 212-1. For example, the at least one processor 203 may detect a point (rising edge) at which an input value is changed from Low to High, as a first ZCP (falling ZCP), and may detect a point (falling edge) at which an input value is changed from High to Low, as a second ZCP (rising ZCP). Here, the at least one processor 203 may detect a first reference value (e.g., 4 V) of the rising edge as the first ZCP, and may detect a second reference value (e.g., 1 V) of the falling edge as the second ZCP, but the disclosure is not limited thereto.

Referring back to FIG. 8, in operation S820, the station device 200 according to an embodiment of the disclosure may obtain information about a pulse width from the first ZCP to the second ZCP.

According to an embodiment of the disclosure, the pulse width from the first ZCP to the second ZCP may indicate a time from the first ZCP to the second ZCP. When the first ZCP is a falling ZCP at which the AC input voltage (sine wave) falls from a positive value to a negative value, and the second ZCP is a rising ZCP at which the AC input voltage (sine wave) rises from a negative value to a positive value, the pulse width from the first ZCP to the second ZCP may be a pulse width corresponding to a − waveform of the AC input voltage.

According to an embodiment of the disclosure, the at least one processor 203 detects voltage points higher than 0 V by a certain value as the first ZCP and the second ZCP, according to a characteristic of the ZCP circuit 212, and thus, the pulse width between the first ZCP and the second ZCP may vary according to a level (Vp or Vrms) of the AC input voltage.

Figure 10:
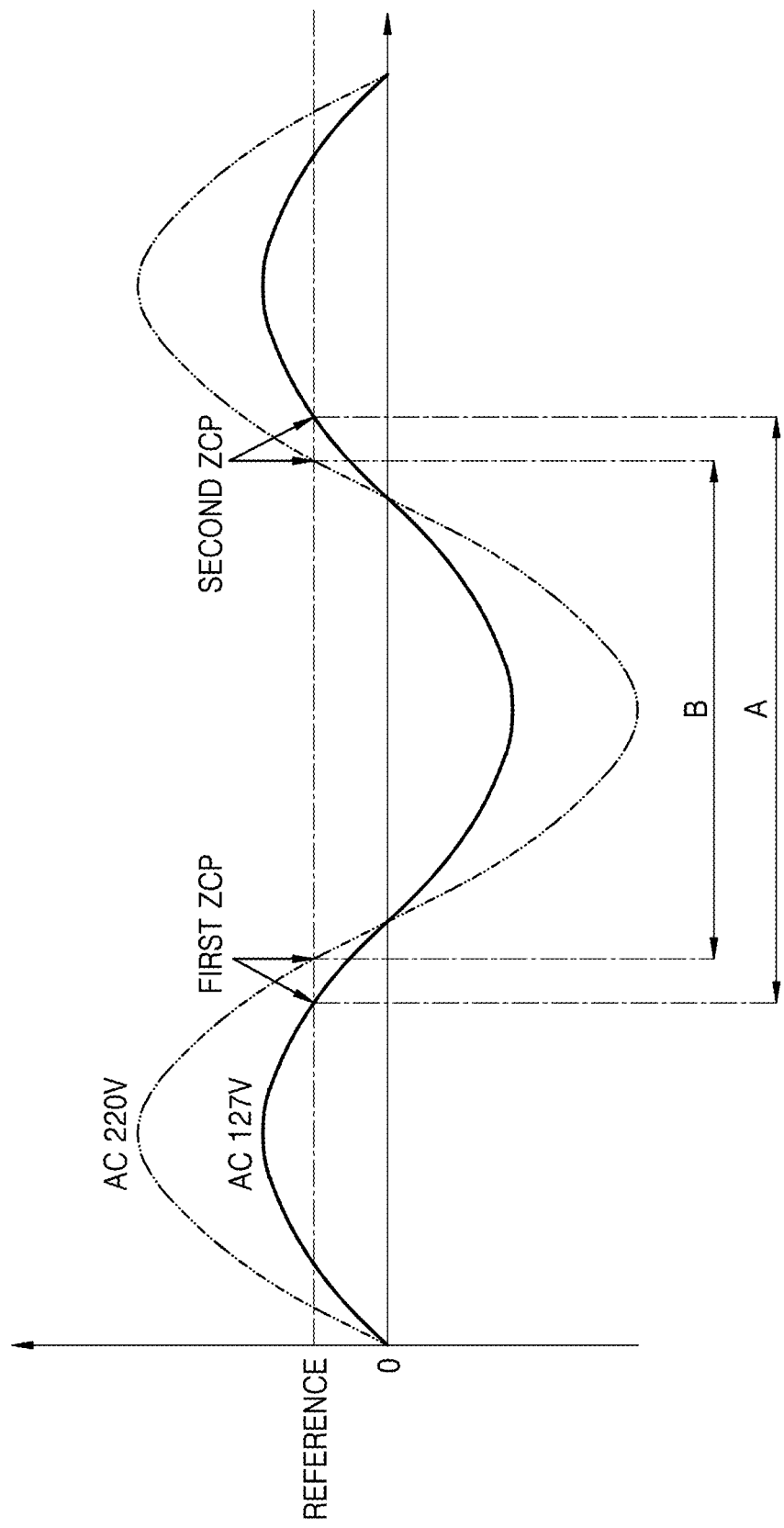
FIG. 10 is a diagram illustrating an operation of detecting a ZCP, according to an embodiment of the disclosure.

Referring to FIG. 10, for example, a pulse width from the first ZCP to the second ZCP of AC 127 V may be 'A', and a pulse width from the first ZCP to the second ZCP of AC 220 V may be 'B'. That is, the higher the level of the AC input voltage is, the smaller the pulse width from the first ZCP to the second ZCP is.

According to an embodiment of the disclosure, the at least one processor 203 may obtain the number of counts, by a timer, of a pulse width from the first ZCP to the second ZCP, as information about the pulse width from the first ZCP to the second ZCP. Here, the at least one processor 203 may count, by using the timer, a pulse width corresponding to a first reference value of a rising edge at which a voltage of the input port connected to the ZCP circuit 212 rises and to a second reference value of a falling edge at which the voltage of the input port connected to the ZCP circuit 212 falls. For example, the at least one processor 203 may count, by using the timer, a pulse width from an 80%-value (e.g., 4 V) of the rising edge to an 80%-value (e.g., 1 V) of the falling edge, but the disclosure is not limited thereto.

The timer is configured to measure a pulse width (time) between the first ZCP and the second ZCP, and may be expressed as a counter. According to an embodiment of the disclosure, a period of the timer may be 100 μs, but the disclosure is not limited thereto.

As the higher the level of the AC input voltage is, the smaller the pulse width from the first ZCP to the second ZCP is, the number of counts of the pulse width from the first ZCP to the second ZCP, by the timer, will be decreased as the level of the AC input voltage is increased. For example, as a peak value Vp of the AC input voltage or an effective value Vrms of the AC input voltage is increased, the number of counts of the pulse width from the first ZCP to the second ZCP, by the timer, will be decreased.

Figure 11:
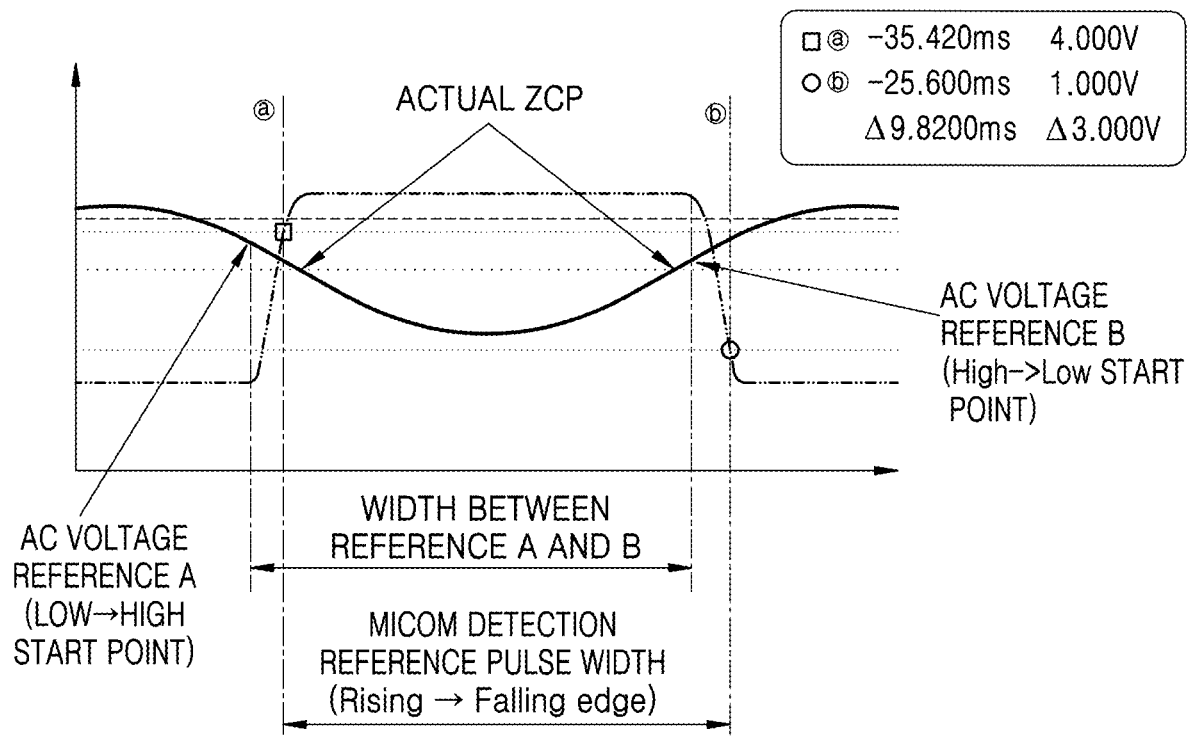
FIG. 11 is a diagram illustrating an operation of measuring a pulse width between ZCPs detected by a processor using a timer, according to an embodiment of the disclosure.

Referring to FIG. 11, the at least one processor 203 may count, by using the timer, a pulse width of AC 110 V (60 Hz) from the first ZCP to the second ZCP. For example, the at least one processor 203 may detect a 4V-point of the rising edge as the first ZCP, and may detect a 1 V-point of the falling edge as the second ZCP. Here, the first ZCP and the second ZCP detected by the at least one processor 203 may be different from an actual ZCP. For example, the first ZCP may be to the left of the actual ZCP, and the second ZCP may be to the right of the actual ZCP. The at least one processor 203 may measure, by using a 100 μs-timer, a pulse width from the first ZCP (the 4V-point of the rising edge) to the second ZCP (the 1 V-point of the falling edge). When the pulse width from the first ZCP to the second ZCP is 9.82 ms, the number of counts of the pulse width between the first ZCP and the second ZCP, by using the 100 μs-timer, may be 98.

Figure 12:
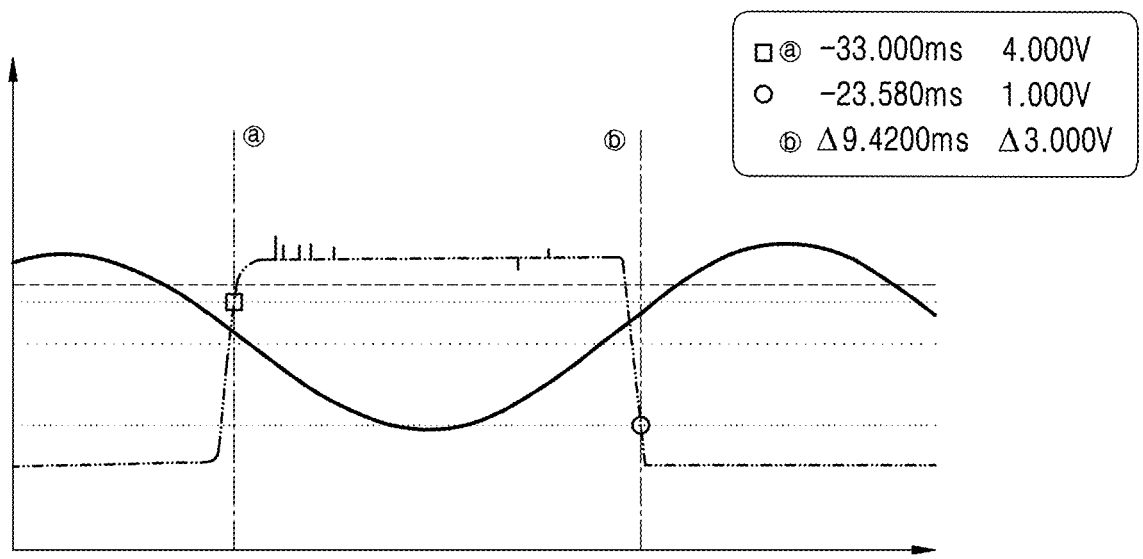
FIG. 12 is a diagram illustrating an operation of measuring a pulse width between ZCPs detected by a processor using a timer, according to an embodiment of the disclosure.

Referring to FIG. 12, the at least one processor 203 may count, by using the timer, a pulse width of AC 150 V (60 Hz) from the first ZCP to the second ZCP. For example, the at least one processor 203 may detect a 4V-point of a rising edge as the first ZCP and may detect a 1 V-point of a falling edge as the second ZCP. Then, the at least one processor 203 may measure, by using a 100 μs-timer, a pulse width from the first ZCP (the 4V-point of the rising edge) to the second ZCP (the 1 V-point of the falling edge). When the pulse width from the first ZCP to the second ZCP is 9.42 ms, the number of counts of the pulse width between the first ZCP and the second ZCP, by using the 100 μs-timer, may be 94.

Figure 13:
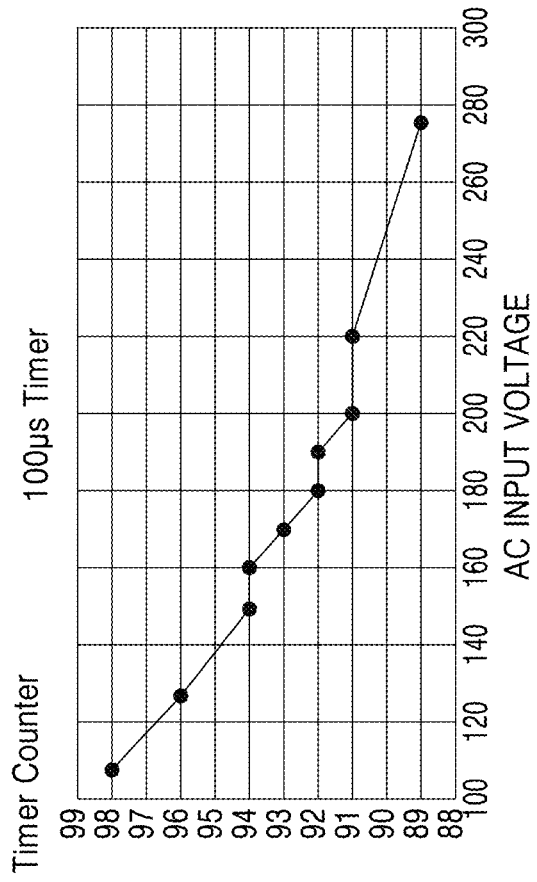
FIG. 13 is a diagram illustrating a relation between a level of an AC input voltage and a pulse width between ZCPs, according to an embodiment of the disclosure.

Referring to FIG. 13, it is possible to check that, as a result of measuring, by using a 100 μs-timer, a pulse width between the first ZCP and the second ZCP while increasing a level of an AC input voltage, the number of counts of the pulse width by a timer is decreased as a level Vrms of the AC input voltage is increased. Also, when the number of counts of the pulse width by using the 100 μs-timer, with respect to a pulse width between the first ZCP and the second ZCP is obtained, a level of the AC input voltage may be estimated. For example, when the number of counts of the pulse width by using the 100 μs-timer, with respect to the pulse width from the first ZCP to the second ZCP is 98, it is possible to estimate that the level of the AC input voltage is about 108 Vrms, and when the number of counts is 92, it is possible to estimate that the level of the AC input voltage is about 180 Vrms.

Referring back to FIG. 8, in operation S830, the station device 200 according to an embodiment of the disclosure may identify whether the AC input voltage applied to the station device 200 is in an overvoltage state, based on information about the pulse width from the first ZCP to the second ZCP.

According to an embodiment of the disclosure, as a pulse width from a first ZCP to a second ZCP varies according to a level of an AC input voltage, the station device 200 may identify whether the AC input voltage is in an overvoltage state, based on information about the pulse width from the first ZCP to the second ZCP. The overvoltage state may indicate a state that exceeds a rated voltage of the station device 200. For example, when the rated voltage of the station device 200 is AC 127 V, a voltage equal to or greater than AC 187 V may be an overvoltage voltage, and when the rated voltage of the station device 200 is AC 220 V, a voltage equal to or greater than AC 275 V may be an overvoltage voltage.

According to an embodiment of the disclosure, when the pulse width from the first ZCP to the second ZCP exceeds a preset reference range, the station device 200 may identify that the AC input voltage is in the overvoltage state. Here, the preset reference range may include a range corresponding to a normal state and a range corresponding to a low voltage state. The preset reference range may vary according to a frequency (e.g., 50 Hz or 60 Hz) of the AC input voltage. As the pulse width from the first ZCP to the second ZCP varies according to the frequency of the AC input voltage, the preset reference range corresponding to the normal state may also vary according to the frequency of the AC input voltage.

According to an embodiment of the disclosure, when the number of counts of the pulse width from the first ZCP to the second ZCP is obtained as the information about the pulse width from the first ZCP to the second ZCP, the preset reference range corresponding to the normal state may be defined as the number of counts, by the timer, of the pulse width between the first ZCP and the second ZCP. For example, referring to FIG. 13, when a rated voltage of the station device 200 is AC 127 V, the preset reference range corresponding to the normal state may be 98 corresponding to AC 108 V to 92 corresponding to AC 190 V. Therefore, the at least one processor 203 may identify that the AC input voltage is in the overvoltage state when the number of counting the pulse width from the first ZCP to the second ZCP is equal to or less than 91, and may identify that the AC input voltage is in a normal state when the number of counting the pulse width from the first ZCP to the second ZCP is between 92 and 98.

In operations S840 and S850, when the AC input voltage applied to the station device 200 is in the overvoltage state (Yes in operation S840), the station device 200 according to an embodiment of the disclosure may deactivate an operation of the suction motor 207.

In the disclosure, deactivating of the operation of the suction motor 207 may include suspending or stopping the operation of the suction motor 207, allowing the suction motor 207 not to operate, or ignoring a driving command with respect to the suction motor 207, but the disclosure is not limited thereto.

According to an embodiment of the disclosure, when the AC input voltage is in the overvoltage state, the station device 200 may not drive the AC suction motor 207. For example, the at least one processor 203 may not transmit a trigger signal to a gate of the photo triac for phase control, thereby deactivating the operation of the suction motor 207.

Therefore, in a case where the AC input voltage is in the overvoltage state, even when the cordless vacuum cleaner 100 is docked on the station device 200 in an automatic discharging mode, the station device 200 may not perform a dust discharging operation. Also, in a case where the AC input voltage is in the overvoltage state, even when a user selects a dust discharging button, the station device 200 may not perform the dust discharging operation.

In operations S840 and S860, when the AC input voltage applied to the station device 200 is not in the overvoltage state (No in operation S840), the station device 200 according to an embodiment of the disclosure may activate the operation of the suction motor 207.

According to an embodiment of the disclosure, in a case where the AC input voltage is not in the overvoltage state, when the cordless vacuum cleaner 100 is docked on the station device 200 in the automatic discharging mode, the station device 200 may perform the dust discharging operation. Also, when the AC input voltage is not in the overvoltage state, as a user selects the dust discharging button in a manual discharging mode, the station device 200 may perform the dust discharging operation. That is, when the AC input voltage is not in the overvoltage state, the station device 200 may drive the suction motor 207 so as to allow dust of the cordless vacuum cleaner 100 to be discharged to the collector 209 of the station device 200.

According to an embodiment of the disclosure, the at least one processor 203 may activate the operation of the suction motor 207 by slowly increasing a power supplied to the suction motor 207 by using the photo triac. An operation in which the station device 200 performs a phase control operation (soft start) on the suction motor 207 will be described in detail with reference to FIG. 21 below.

According to an embodiment of the disclosure, the station device 200 may deactivate an operation of the suction motor 207, in response to detection, by using the ZCP circuit 212, of an AC overvoltage being equal to or greater than the AC rated voltage and being applied to the station device 200, and thus, may prevent a malfunction, damage, etc. of a product.

Figure 14:
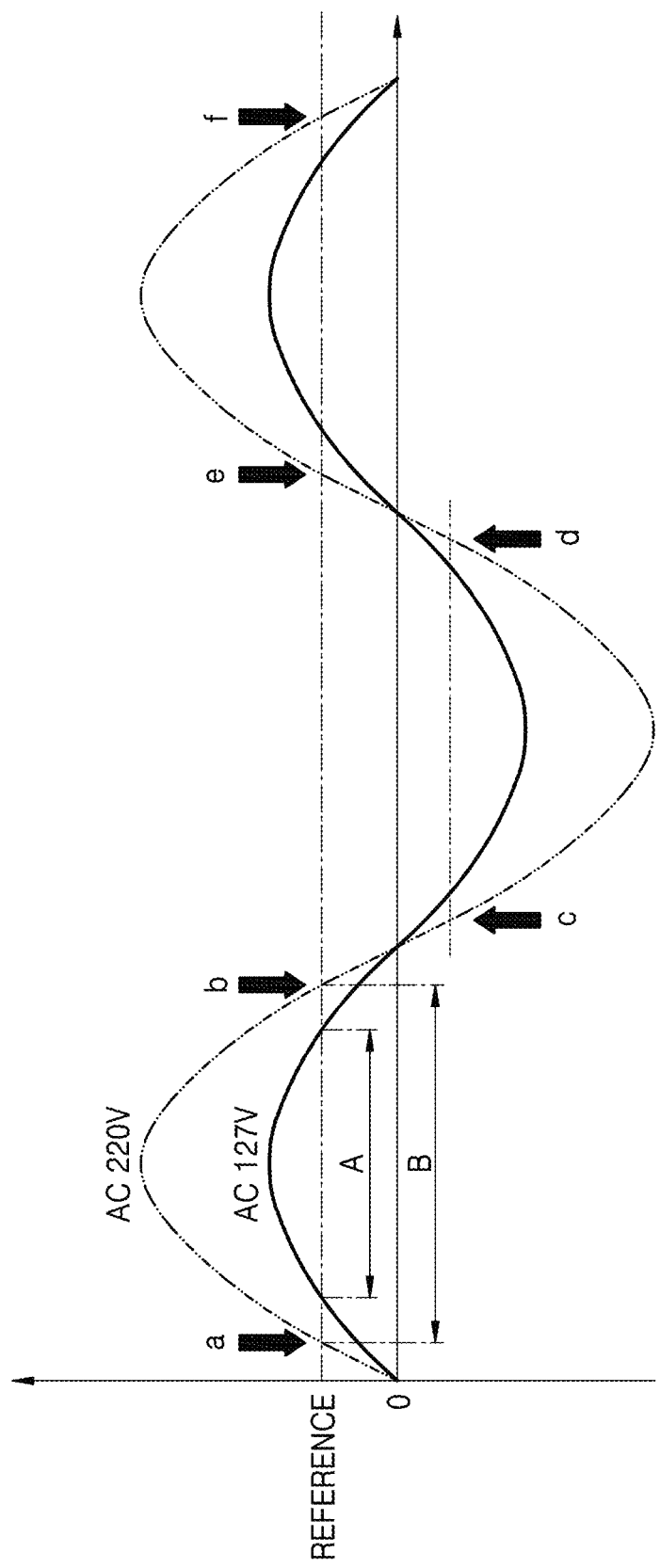
FIG. 14 is a diagram illustrating a pulse width between ZCPs detected by a processor, according to an embodiment of the disclosure.

FIG. 14 is a diagram illustrating a pulse width between ZCPs detected by the processor 203, according to an embodiment of the disclosure.

According to an embodiment of the disclosure, as the ZCP circuit 212 includes a diode for preventing a half-wave, the at least one processor 203 may detect a point at which an AC input voltage is a positive reference voltage level, as a ZCP. For example, the at least one processor 203 may detect a point b that is slightly earlier than a falling ZCP, as a first ZCP, and may detect a point e that is slightly later than a rising ZCP, as a second ZCP. Here, the at least one processor 203 may identify whether the AC input voltage is in an overvoltage state, based on a pulse width from the point b to the point e. That is, the at least one processor 203 may identify whether the AC input voltage is in the overvoltage state, based on the pulse width with a − waveform. The pulse width from the point b to the point e may be decreased as a level of the AC input voltage is increased. However, the disclosure is not limited thereto.

According to an embodiment of the disclosure, the at least one processor 203 may detect a point a that is slightly later than the rising ZCP, as a first ZCP, and may detect the point b that is slightly earlier than the falling ZCP, as a second ZCP. Here, the at least one processor 203 may identify whether the AC input voltage is in an overvoltage state, based on a pulse width from the point a to the point b. That is, the at least one processor 203 may identify whether the AC input voltage is in the overvoltage state, based on the pulse width with a + waveform. The pulse width from the point a to the point b may be in proportion to a level of the AC input voltage.

According to an embodiment of the disclosure, the at least one processor 203 may detect, as a ZCP, a point at which an AC input voltage is a negative reference voltage level. For example, the at least one processor 203 may detect a point c as a first ZCP and may detect a point d as a second ZCP. Here, the at least one processor 203 may identify whether the AC input voltage is in an overvoltage state, based on a pulse width from the point c to the point d. The pulse width from the point c to the point d may be in proportion to a level of the AC input voltage.

According to an embodiment of the disclosure, the at least one processor 203 may identify whether an AC input voltage is in an overvoltage state, based on a pulse width from the point b to the point c. The pulse width from the point b to the point c may be decreased as a level of the AC input voltage is increased. Also, the at least one processor 203 may identify whether an AC input voltage is in an overvoltage state, based on a pulse width from the point d to the point e. The pulse width from the point d to the point e may be decreased as a level of the AC input voltage is increased.

Hereinafter, for convenience of descriptions, an example in which the at least one processor 203 identifies whether an AC input voltage is in an overvoltage state, based on the pulse width from the point b to the point e will now be described.

Figure 15:
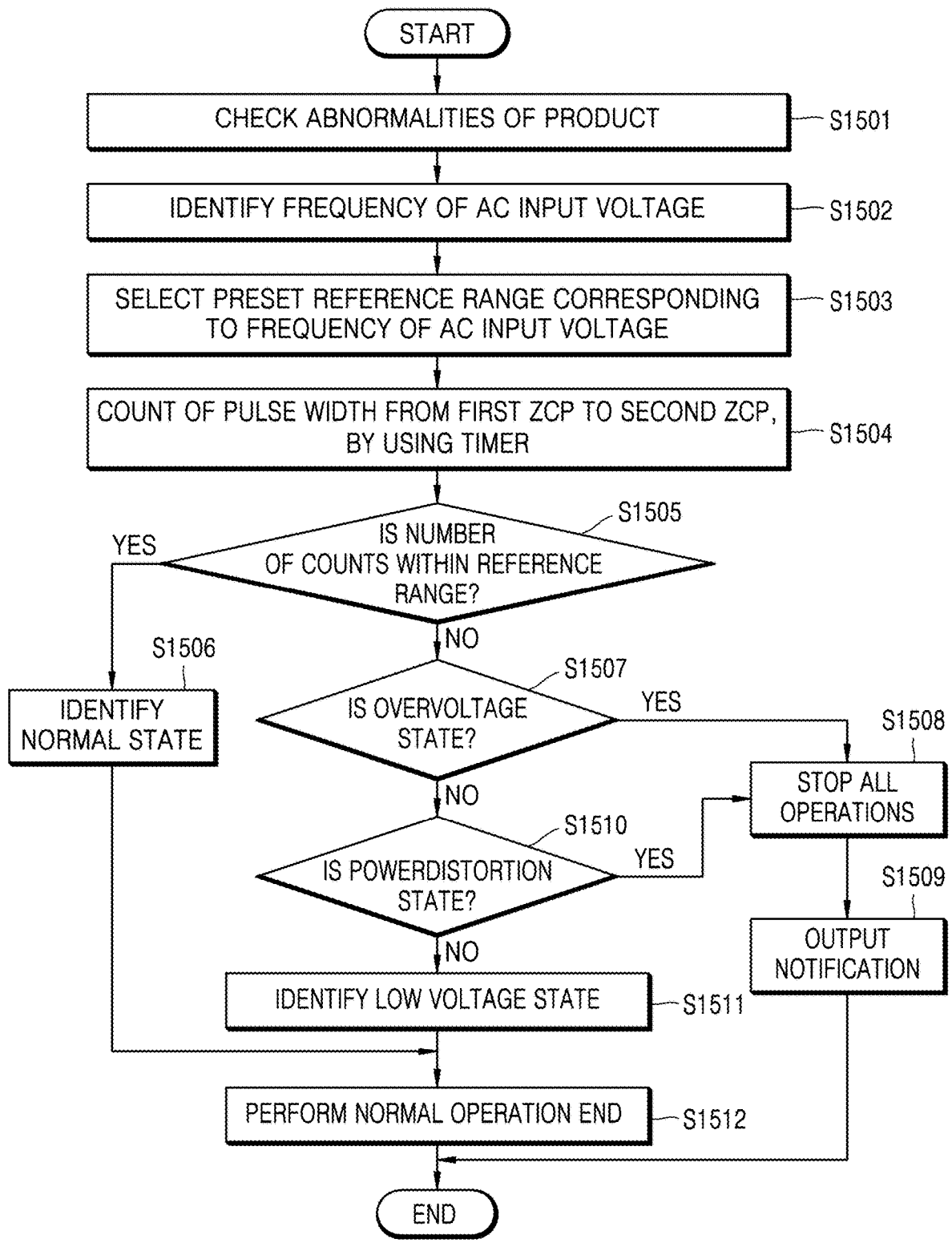
FIG. 15 is a flowchart illustrating an operating method of a station device according to an embodiment of the disclosure.

FIG. 15 is a flowchart illustrating an operating method of the station device 200 according to an embodiment of the disclosure. With reference to FIG. 15, an example in which information about a pulse width from a first ZCP to a second ZCP includes the amount of counts, by using a timer, from the first ZCP to the second ZCP will now be described.

Referring to FIG. 15, the operating method of the station device 200 according to an embodiment of the disclosure may include operations S1501 to S1512. In an embodiment of the disclosure, operations S1501 to S1512 may be executed by the at least one processor 203 included in the station device 200. The operating method of the station device 200 is not limited to what is shown in FIG. 15, and in one or more embodiments, operations not shown in FIG. 15 may be further included or some operations may be omitted.

In operation S1501, when a power is turned on, the station device 200 according to an embodiment of the disclosure may check for abnormalities of a product. For example, the at least one processor 203 may check for abnormalities of parts by communicating with the suction motor 207, etc.

In operation S1502, when the product has no abnormalities, the station device 200 according to an embodiment of the disclosure may identify a frequency of an AC input voltage.

According to an embodiment of the disclosure, the at least one processor 203 of the station device 200 may accumulatively count 10 cycles of an AC input voltage so as to check a frequency of the AC input voltage. When the 10 cycles correspond to 0.2 s(=1/50 sec×10), the station device 200 may identify the frequency of the AC input voltage as 50 Hz, and when the 10 cycles correspond to 0.167 s (=1/60 sec×10), the station device 200 may identify the frequency of the AC input voltage as 60 Hz.

In operation S1503, the station device 200 according to an embodiment of the disclosure may select a preset reference range corresponding to the frequency of the AC input voltage.

The preset reference range may be a range corresponding to a normal state. The preset reference range may be defined based on the number of pulse widths counted by using a timer of the at least one processor 203. For example, when a rated voltage of the station device 200 is AC 127 V (60 Hz), the preset reference range corresponding to the normal state may range between 98 as a timer-count number corresponding to AC 108 V and 92 as a timer-count number corresponding to AC 187 V.

According to an embodiment of the disclosure, the reference range corresponding to the normal state may vary according to the frequency of the AC input voltage. For example, as a pulse width between ZCPs in a case where the frequency of the AC input voltage is 50 Hz is different from a pulse width between ZCPs in a case where the frequency of the AC input voltage is 60 Hz, the reference range may be differently set, according to frequencies. Therefore, the station device 200 may select the preset reference range corresponding to the frequency of the AC input voltage.

In operation S1504, the station device 200 according to an embodiment of the disclosure may count of a pulse width from the first ZCP to the second ZCP, by using a timer.

According to an embodiment of the disclosure, the at least one processor 203 may count, by using the timer, the pulse width corresponding to a first reference value of a rising edge at which a voltage of the input port connected to the ZCP circuit 212 rises to a second reference value of a falling edge at which the voltage of the input port connected to the ZCP circuit 212 falls. For example, the at least one processor 203 may count, by using the timer, a pulse width from an 80%-value (e.g., 4 V) of the rising edge to an 80%-value (e.g., 1 V) of the falling edge, but the disclosure is not limited thereto. Also, a period of the timer may be 100 μs, but the disclosure is not limited thereto.

The number of counts of the pulse width from the first ZCP to the second ZCP may vary, according to a level of the AC input voltage. For example, as the higher the level of the AC input voltage is, the smaller the pulse width from the first ZCP to the second ZCP is, the number of counts of the pulse width from the first ZCP to the second ZCP, by the timer, may be decreased as the level of the AC input voltage is increased.

In operation S1505, the station device 200 according to an embodiment of the disclosure may determine whether the number of counts of the pulse width from the first ZCP to the second ZCP is within a reference range corresponding to a normal state.

For example, the reference range corresponding to the normal state is between 98 corresponding to AC 108 V and 92 corresponding to AC 187 V, the station device 200 may determine whether the number of counts of the pulse width from the first ZCP to the second ZCP is between 92 and 98.

In operation S1506, when the number of counts of the pulse width from the first ZCP to the second ZCP is within the reference range (Yes in operation S1505), the station device 200 according to an embodiment of the disclosure may identify the AC input voltage as the normal state. The normal state may indicate a state in which the AC input voltage does not significantly exceed a rated voltage of the station device 200.

According to an embodiment of the disclosure, when the AC input voltage is in the normal state, the station device 200 may perform a normal operation (operation S1511). For example, the station device 200 may normally drive the suction motor 207 so as to perform a dust discharging operation or support battery charging of the cleaner body 1000.

In operation S1507, when the number of counts of the pulse width from the first ZCP to the second ZCP exceeds the reference range (No in operation S1505), the station device 200 according to an embodiment of the disclosure may determine whether the AC input voltage is in an overvoltage state.

As the level of the AC input voltage is increased, the number of counts, by the timer, of the pulse width from the first ZCP to the second ZCP is decreased, and thus, when the number of counts of the pulse width from the first ZCP to the second ZCP exceeds the reference range, the station device 200 may determine whether the number of counts of the pulse width from the first ZCP to the second ZCP is less than a minimum value of the reference value.

According to an embodiment of the disclosure, when the number of counts of the pulse width from the first ZCP to the second ZCP is less than the minimum value of the reference value, the station device 200 may determine that the AC input voltage is in the overvoltage state. On the other hand, when the number of counts of the pulse width from the first ZCP to the second ZCP is not less than the minimum value of the reference value, the station device 200 may determine that the AC input voltage is not in the overvoltage state. For example, when the reference range corresponding to the normal state is between 92 and 98, and the number of counts of the pulse width from the first ZCP to the second ZCP is 88, the station device 200 may determine that the AC input voltage is in the overvoltage state.

According to an embodiment of the disclosure, even when the number of counts of the pulse width from the first ZCP to the second ZCP is smaller than the minimum value of the reference range, in a case where the number significantly exceeds the reference range (e.g., a case where the number of counts of the pulse width from the first ZCP to the second ZCP is significantly smaller than the minimum value), the station device 200 may determine that the AC input voltage is in a power distortion state, not the overvoltage state.

In operation S1508, when the AC input voltage is in the overvoltage state, the station device 200 according to an embodiment of the disclosure may stop all operations.

For example, when the AC input voltage is in the overvoltage state, the station device 200 may deactivate driving of the suction motor 207 for a dust discharging operation. Therefore, when the AC input voltage is in the overvoltage state, the station device 200 may not perform the dust discharging operation even when a user selects a dust discharging button.

In operation S1509, the station device 200 according to an embodiment of the disclosure may output a notification when the AC input voltage is in the overvoltage state.

According to an embodiment of the disclosure, the station device 200 may visually display, via an output interface, the notification indicating that the AC input voltage is in the overvoltage state. For example, the at least one processor 203 may control a status light to indicate that the AC input voltage is in the overvoltage state (e.g., flickering of a red color on the LED display). The at least one processor 203 may output a message indicating that the AC input voltage is in the overvoltage state, to an LCD of the station device 200 or an LCD of the cordless vacuum cleaner 100. The at least one processor 203 may control a user terminal (e.g., a smartphone) connected to the server device to output the message indicating that the AC input voltage is in the overvoltage state.

According to an embodiment of the disclosure, the station device 200 may audibly indicate that the AC input voltage is in the overvoltage state, via an output interface. For example, the station device 200 may output a notification message indicating that the AC input voltage is in the overvoltage state, as voice via a speaker.

Therefore, a user may identify the notification, and may correctly re-connect the power line 213 that was connected to an incorrect outlet.

In operation S1510, when the number of counts of the pulse width from the first ZCP to the second ZCP exceeds the reference range (No in operation S1505), and the AC input voltage is not in the overvoltage state (No in operation S1507), the station device 200 according to an embodiment of the disclosure may determine whether the AC input voltage is in the power distortion state.

According to an embodiment of the disclosure, when the number of counts of the pulse width from the first ZCP to the second ZCP is smaller than the minimum value of the reference range, and the number significantly exceeds the reference range (e.g., a case where the number of counts of the pulse width from the first ZCP to the second ZCP is significantly smaller than the minimum value), the station device 200 may determine that the AC input voltage is in the power distortion state.

Figure 16:
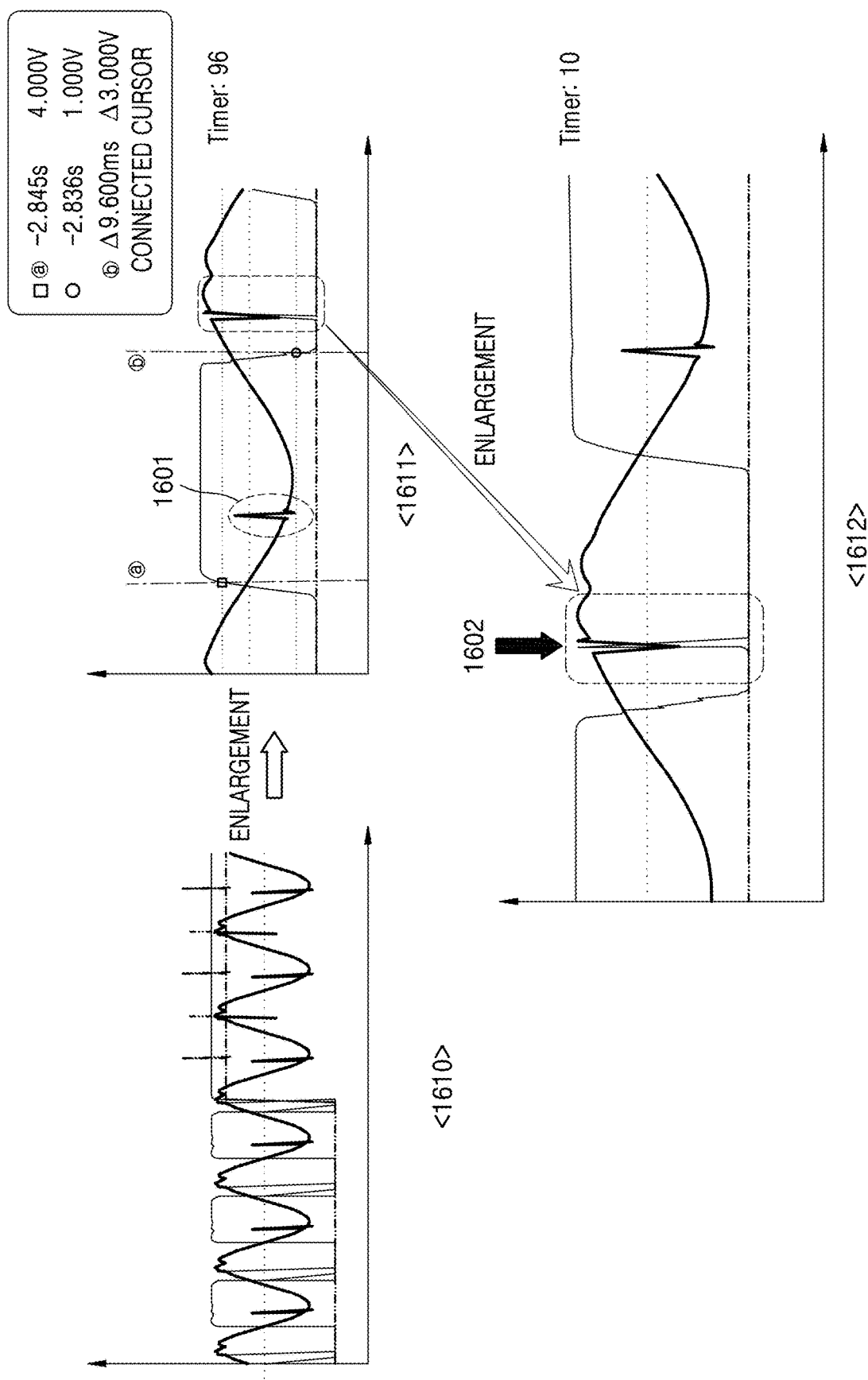
FIG. 16 is a diagram illustrating an operation of identifying a power distortion state, according to an embodiment of the disclosure.

Referring to FIG. 16, when a power distortion waveform 1610 in which an instant voltage dip occurs is input, the at least one processor 203 may identify power distortion by using a timer. For example, referring to 1611 of FIG. 16, a first point 1601 may not be detected as a ZCP level as a voltage dip is not great. Therefore, the at least one processor 203 may ignore a voltage dip at the first point 1601, and may count, by using a timer, a pulse width from a first ZCP before the first point 1601 to a second ZCP after the first point 1601. Here, the number of counts of the pulse width from the first ZCP to the second ZCP may be 96. As the number of counts (e.g., 96) of the pulse width from the first ZCP to the second ZCP is within a preset reference range (e.g., between 92 and 98), the at least one processor 203 may determine that an AC input voltage is in a normal state. On the other hand, referring to 1612 of FIG. 16, a second point 1602 may be detected as a ZCP as a voltage dip level is great. Here, the number of counting, by the at least one processor 203 using a timer, a pulse width from a first ZCP to a second ZCP may be 10. As the number of counts (e.g., 10) of the pulse width from the first ZCP to the second ZCP significantly exceeds the preset reference range (e.g., between 92 and 98), the at least one processor 203 may assume the second point 1602 as a power distortion state in which instant voltage dip occurred.

According to an embodiment of the disclosure, when the AC input voltage is in the power distortion state (Yes in operation S1510), the station device 200 may stop all operations (S1508), and may output a notification (S1509). For example, when the AC input voltage is in the power distortion state, the station device 200 may deactivate driving of the suction motor 207. Also, the station device 200 may visually or audibly provide a user with a notification indicating the power distortion state or a notification indicating deactivation of driving of the suction motor 207. For example, the station device 200 may flicker the LED display with a red color. When the LED display is flickering with a red color, the user may check an outlet to which the power line 213 is connected.

In operation S1511, when the AC input voltage is not in the overvoltage state (No in operation S1507) and is not in the power distortion state (No in operation S1510), the station device 200 according to an embodiment of the disclosure may identify the AC input voltage as a low voltage state.

For example, when the number of counts of the pulse width from the first ZCP to the second ZCP is greater than a maximum value of the reference range, the station device 200 may identify the AC input voltage as the low voltage state. For example, when the reference range corresponding to the normal state is between 92 and 98, and the number of counts of the pulse width from the first ZCP to the second ZCP is 100, the station device 200 may identify the AC input voltage as the low voltage state.

In operation S1512, when the AC input voltage is in the low voltage state, the station device 200 according to an embodiment of the disclosure may perform a normal operation.

According to an embodiment of the disclosure, when the AC input voltage is in the low voltage state, performance of the suction motor 207 may deteriorate but a problem such as fire, damage to parts, or the like does not occur, such that the station device 200 may perform the normal operation. For example, the station device 200 may normally drive the suction motor 207 so as to perform a dust discharging operation or support battery charging of the cleaner body 1000.

Figure 17:
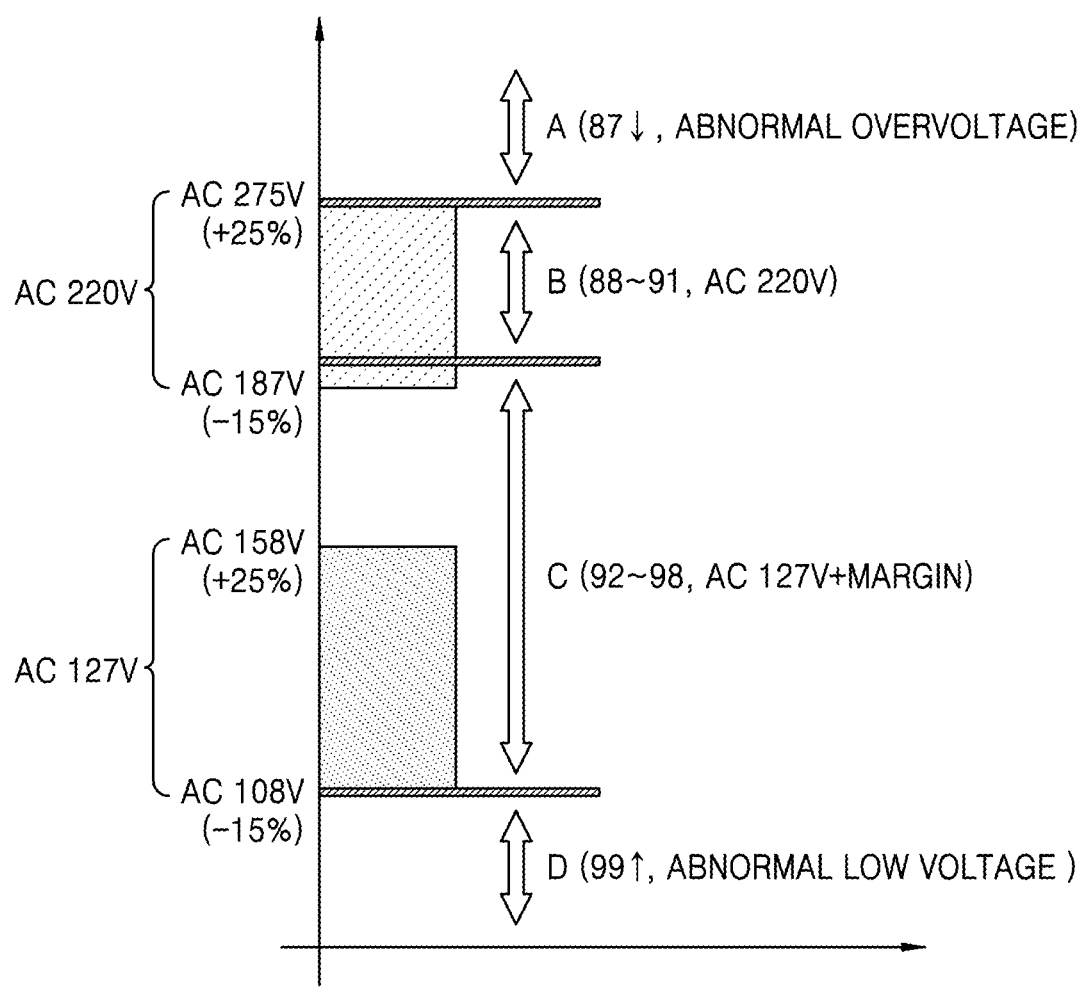
FIG. 17 is a diagram illustrating a state of an AC input voltage, according to an embodiment of the disclosure.

With reference to FIG. 17, a relation between a pulse width between a first ZCP and a second ZCP and a state of an AC input voltage will now be further described.

FIG. 17 is a diagram illustrating a state of an AC input voltage according to an embodiment of the disclosure.

Referring to FIG. 17, the at least one processor 203 may determine a state of the AC input voltage, based on a result of measuring, by using a 100 μs-timer, the pulse width between the first ZCP and the second ZCP.

For example, when the number of counts of the pulse width from the first ZCP to the second ZCP is equal to or less than 87, the at least one processor 203 may determine that the AC input voltage is in an overvoltage state (or a power distortion state). When the number of counts of the pulse width from the first ZCP to the second ZCP is between 88 and 91, the at least one processor 203 may determine that a state of the AC input voltage corresponds to AC 220 V. When the number of counts of the pulse width from the first ZCP to the second ZCP is between 92 and 98, the at least one processor 203 may determine that a state of the AC input voltage corresponds to AC 127 V. When the number of counts of the pulse width from the first ZCP to the second ZCP is equal to or greater than 99, the at least one processor 203 may determine that the AC input voltage is in an abnormal low voltage state.

According to an embodiment of the disclosure, when a rated voltage of the station device 200 is AC 127 V, and the number of counts of the pulse width from the first ZCP to the second ZCP is between 88 and 91, the at least one processor 203 may determine that a user incorrectly connected the power line 213 to an outlet of AC 220 V. That is, the at least one processor 203 may determine that the AC input voltage applied to the station device 200 is in an overvoltage state, and thus, may deactivate an operation of the suction motor 207.

According to an embodiment of the disclosure, when a rated voltage of the station device 200 is AC 220 V, and the number of counts of the pulse width from the first ZCP to the second ZCP is between 92 and 98, the at least one processor 203 may determine that a user incorrectly connected the power line 213 to an outlet of AC 127 V. That is, the at least one processor 203 may determine that the AC input voltage applied to the station device 200 is in a low voltage state. However, when the AC input voltage is in the low voltage state, performance of the suction motor 207 may deteriorate but a problem such as fire, damage to parts, or the like does not occur, such that the station device 200 may normally operate.

Figure 18:
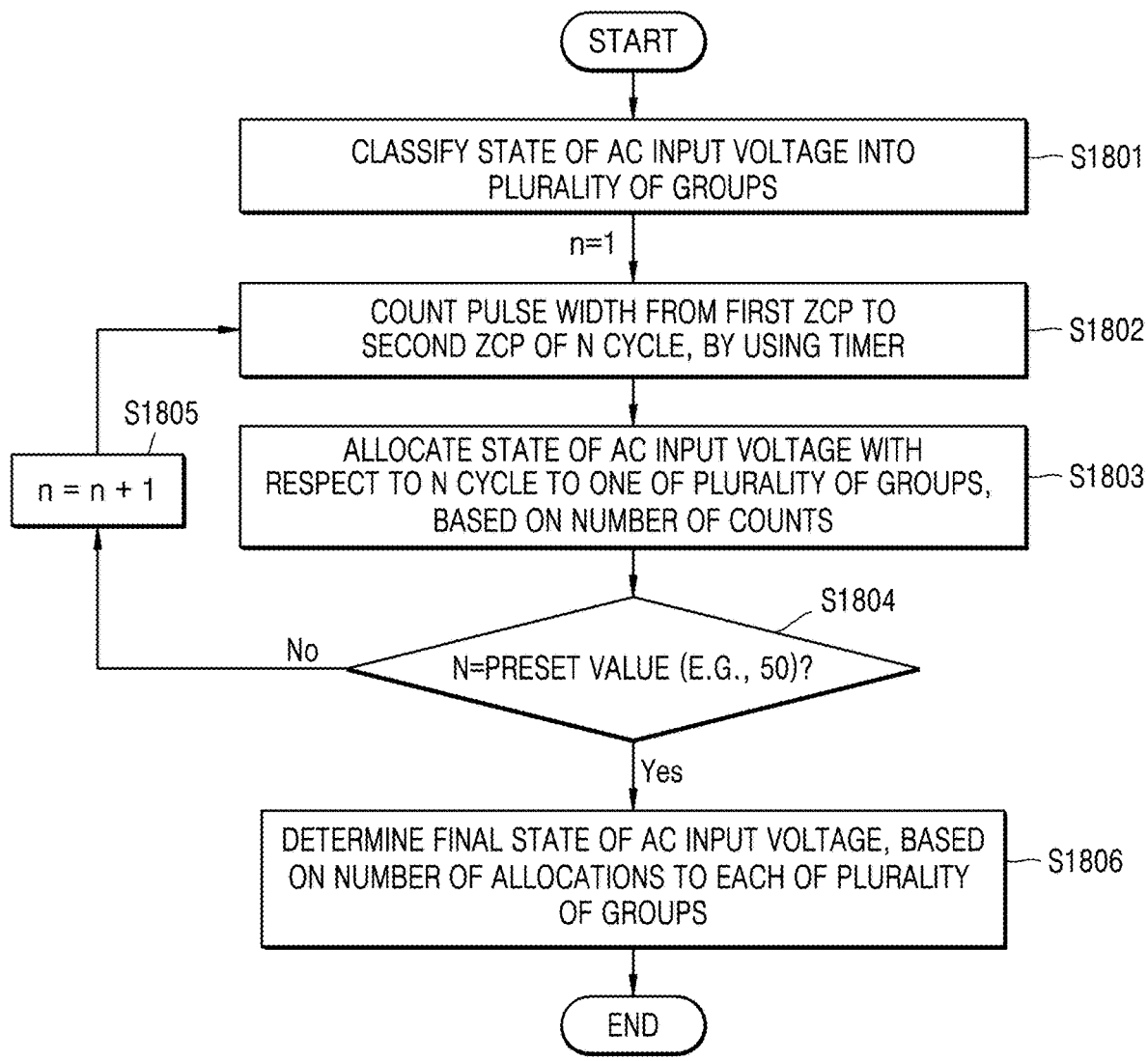
FIG. 18 is a flowchart illustrating a method of identifying a final state of an AC input voltage, based on a result of classifying a state of the AC input voltage during preset cycles, according to an embodiment of the disclosure.

According to an embodiment of the disclosure, the station device 200 may repeatedly measure the pulse width from the first ZCP to the second ZCP multiple times, thereby increasing an overvoltage detection accuracy. For example, the at least one processor 203 may first classify a state (e.g., low voltage/normal/overvoltage/power distortion, etc.) of the AC input voltage by measuring the pulse width from the first ZCP to the second ZCP during preset cycles of the AC input voltage, and may accumulate results of first classification with respect to the state of the AC input voltage during the preset cycle, thereby identifying a final state of the AC input voltage. With reference to FIG. 18, a method of identifying, by the station device 200, a final state of an AC input voltage, based on accumulated results with respect to a state of the AC input voltage during preset cycles will now be described in detail.

FIG. 18 is a flowchart illustrating a method of identifying a final state of an AC input voltage, based on a result of classifying a state of the AC input voltage during preset cycles, according to an embodiment of the disclosure.

Referring to FIG. 18, the method by which the station device 200 according to an embodiment of the disclosure identifies the final state of the AC input voltage may include operations S1801 to S1806. In an embodiment of the disclosure, operations S1801 to S1806 may be performed by the at least one processor 203 included in the station device 200. The method by which the station device 200 identifies the final state of the AC input voltage is not limited to what is shown in FIG. 18, and in one or more embodiments, operations not shown in FIG. 18 may be further included or some operations may be omitted.

In operation S1801, the station device 200 according to an embodiment of the disclosure may classify a state of an AC input voltage into a plurality of groups.

Referring to FIG. 19A, the station device 200 may classify the state of the AC input voltage into A group corresponding to an overvoltage state, B group corresponding to a state of AC 220 V, C group corresponding to a state of AC 127 V (+ margin), and D group corresponding to a low voltage state. Here, the number of counts, by a timer, of a pulse width from a first ZCP to a second ZCP may be equal to or less than 87 in A group, may be between 88 and 91 in B group, may be between 92 and 98 in C group, and may be equal to or greater than 99 in D group.

While FIG. 19A illustrates an example in which the state of the AC input voltage is classified into four groups, the disclosure is not limited thereto. For example, the station device 200 may classify the state of the AC input voltage into three groups, or five or more groups.

In operation S1802, the station device 200 according to an embodiment of the disclosure may count a pulse width from a first ZCP to a second ZCP of an n cycle, by using a timer. Here, n may be an integer equal to or greater than 1. For example, the station device 200 may count a pulse width from a first ZCP of a first cycle to a second ZCP of the first cycle, by using the timer.

In operation S1803, the station device 200 according to an embodiment of the disclosure may allocate a state of an AC input voltage with respect to the n cycle to one of a plurality of groups, based on the number of counts of the pulse width from the first ZCP to the second ZCP of the n cycle.

Hereinafter, referring to FIG. 19A, when the number of counts of the pulse width from the first ZCP to the second ZCP of the first cycle (hereinafter, also referred to as the number of timer counts of the first cycle) is equal to or less than 87, the at least one processor 203 may determine the state of the AC input voltage of the first cycle to A group (abnormal overvoltage group). When the number of timer counts of the first cycle is between 88 and 91, the at least one processor 203 may determine the state of the AC input voltage of the first cycle to B group (AC 220 V group). When the number of timer counts of the first cycle is between 92 and 98, the at least one processor 203 may allocate the state of the AC input voltage of the first cycle to C group (AC 127 V+ margin group). When the number of timer counts of the first cycle is equal to or greater than 99, the at least one processor 203 may determine the state of the AC input voltage of the first cycle to D group (abnormal low voltage group).

In operation S1804, the station device 200 may determine whether n reaches a preset value.

For example, when it is configured that the station device 200 determines a final state of the AC input voltage by accumulating classification results in 50 cycles, the station device 200 may determine whether n reaches 50. Here, the 50 cycles are merely an example, and the disclosure is not limited thereto.

In operation S1805, according to an embodiment of the disclosure, when a cycle of the AC input voltage has not yet reached the preset cycle (e.g., 50 cycles) (No in operation S1804), the station device 200 may repeat operations S1802 and S1803. That is, the station device 200 may count, by using a timer, the pulse width between the first ZCP and the second ZCP during the 50 cycles, and may determine a state of the AC input voltage to one of the plurality of groups, the state corresponding to each cycle.

In operation S1806, when the cycle of the AC input voltage reaches the preset cycle (e.g., 50 cycles) (Yes in operation S1804), the station device 200 according to an embodiment of the disclosure may determine the final state of the AC input voltage, based on the number of allocations to each of the plurality of groups.

According to an embodiment of the disclosure, the final state of the AC input voltage may include the normal state, the overvoltage state, the power distortion state, and the low voltage sate, but the disclosure is not limited thereto. With reference to FIG. 19B, an operation in which the station device 200 determines the final state of the AC input voltage, based on the number of allocations to each of the plurality of groups, will now be further described.

FIG. 19B is a diagram illustrating an operation of identifying a final state of an AC input voltage, based on classification results with respect to a state of the AC input voltage during preset cycles, according to an embodiment of the disclosure.

Referring to FIG. 19B, when a rated voltage of the station device 200 is AC 127 V, and an allocation count of C group (AC 127 V+ margin group) is equal to or greater than a sum of an allocation count of A group (abnormal overvoltage group), an allocation count of B group (AC 220 V group), and an allocation count of D group (abnormal low voltage group) (C≥(A+B+D)), the station device 200 may determine that the final state of the AC input voltage is in a normal state. For example, when states of the AC input voltage are all classified into C group during 50 cycles, the station device 200 may determine that the final state of the AC input voltage is in the normal state. At this time, the station device 200 may normally operate.

When a rated voltage of the station device 200 is AC 127 V, and an allocation count of B group is equal or greater than a sum of an allocation count of A group, an allocation count of C group, and an allocation count of D group (B≥(A+C+D)), the station device 200 may determine that the final state of the AC input voltage is in an overvoltage stage. For example, when the allocation count of A group is 5, the allocation count of B group is 40, and the allocation count of C group is 5, the station device 200 may determine that the final state of the AC input voltage is in the overvoltage stage. In particular, the station device 200 may identify that a user incorrectly connected the power line 213 of the station device 200 with a rated voltage of AC 127 V to an outlet of AC 220 V. Here, the station device 200 may flicker the LED display with a red color, and may stop an operation of the station device 200.

When a sum of an allocation count of A group and an allocation count of D group is equal to or greater than a sum of an allocation count of B group and an allocation count of C group, and the allocation count of D group is less than a sum of the allocation count of A group, the allocation count of B group and the allocation count of D group (A+D≥(B+C)&D<(A+B+C)), the station device 200 may determine that the final state of the AC input voltage is in a power distortion state. For example, when the allocation count of A group is 20, the allocation count of B group is 5, the allocation count of C group is 5, and the allocation count of D group is 20, the station device 200 may determine that the final state of the AC input voltage is in the power distortion state. Here, the station device 200 may flicker the LED display with a red color, and may stop an operation of the station device 200.

When a sum of an allocation count of A group and an allocation count of D group is equal to or greater than a sum of an allocation count of B group and an allocation count of C group, and the allocation count of D group is equal to or greater than a sum of the allocation count of A group, the allocation count of B group and the allocation count of C group (A+D≥(B+C)&D≥(A+B+C)), the station device 200 may determine that the final state of the AC input voltage is in a low voltage state. For example, when the allocation count of A group is 0, the allocation count of B group is 0, the allocation count of C group is 10, and the allocation count of D group is 40, the station device 200 may determine that the final state of the AC input voltage is in the low voltage state. In this regard, as the station device 200 does not have a problem such as fire, damage to parts, or the like, the station device 200 may normally operate.

Until now, a case in which the ZCP circuit 212 is the isolation half-wave ZCP circuit 212-1 is described, but the disclosure is not limited thereto. Hereinafter, with reference to FIG. 20, an isolation half-wave ZCP circuit will now be described.

Figure 20:
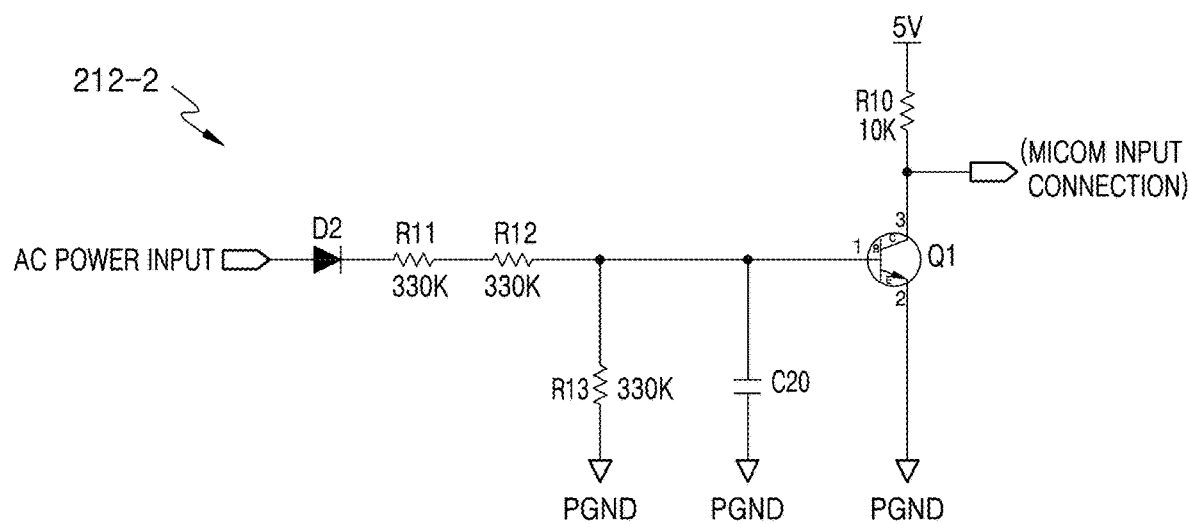
FIG. 20 is a diagram illustrating a non-isolation half-wave ZCP circuit according to an embodiment of the disclosure.

FIG. 20 is a diagram illustrating a non-isolation half-wave ZCP circuit 212-2 according to an embodiment of the disclosure.

Referring to FIG. 20, the non-isolation half-wave ZCP circuit 212-2 may include resistors (e.g., R11, R12, and R13), a diode D2, a capacitor C20, a transistor Q1, etc., but the disclosure is not limited thereto. Here, the resistors (e.g., R11, R12, and R13) may be circuits configured to operate the transistor Q1. The diode D2 may be provided for a half-wave circuit (prevention of an inverse voltage). The capacitor C20 may be provided to prevent the transistor Q1 from malfunctioning due to noise.

The at least one processor 203 may detect a ZCP via the non-isolation half-wave ZCP circuit 212-2. For example, referring to Table 2001 of FIG. 20, when an AC input voltage rises and reaches a reference voltage (e.g., 2.1 V), a voltage between base-emitter both ends of the transistor Q1 is equal to or greater than 0.7 V, and thus, the transistor Q1 may be turned on (or saturation). When the transistor Q1 is turned on, a voltage input to the at least one processor 203 (e.g., Micom) may be switched from 5V (High) to 0.2V (Low). The at least one processor 203 may detect a point at which the input voltage is switched from 5V (High) to 0.2 v (Low), as a rising ZCP (e.g., second ZCP).

On the other hand, when the AC input voltage falls below a reference voltage (e.g., 2.1 V), the transistor Q1 may be turned off. When the transistor Q1 is turned off, a voltage input to the at least one processor 203 is switched from 0.2V (Low) to 5V (High). The at least one processor 203 may detect a point at which the input voltage is switched from 0.2V (Low) to 5V (High), as a falling ZCP (e.g., first ZCP).

According to an embodiment of the disclosure, the at least one processor 203 may detect ZCP, according to an input state of the at least one processor 203 being changed (e.g., from High to Low or from Low to High), based on a minimum reference voltage for operating the transistor Q1. The minimum reference voltage for turning on the transistor Q1 in the non-isolation half-wave ZCP circuit 212-2 of FIG. 20 is calculated as below.

$$\text{AC input voltage} * R13/(R11 + R12 + R13) > 0.7 \text{ V}$$

$$\text{AC input voltage} * 330/(330 + 330 + 330) > 0.7 \text{ V}$$

$$\text{AC input voltage} > 2.1 \text{ V}$$

That is, the AC input voltage may have to be around 2.1 Vac or more so as to turn on the transistor Q1.

However, as the non-isolation half-wave ZCP circuit 212-2 of FIG. 20 includes the diode D2 for rectifying half-wave, and thus, a voltage (Vf 0.7 V) of the diode D2 has to be considered, the AC input voltage may have to be around 2.8 Vac or more so as to turn on the transistor Q1.

$$[\text{AC input voltage} - D2\ Vf(0.7\ \text{V})]^* R13/(R11 + R12 + R13) > 0.7 \text{ V}$$

$$[\text{AC input voltage}[0.7\ \text{V}] * 330/(330 + 330 + 330) > 0.7 \text{ V}$$

$$\text{AC input voltage} - 0.7 \text{ V} > 2.1 \text{ V}$$

$$\text{AC input voltage} > 2.8 \text{ V}$$

Figure 21:
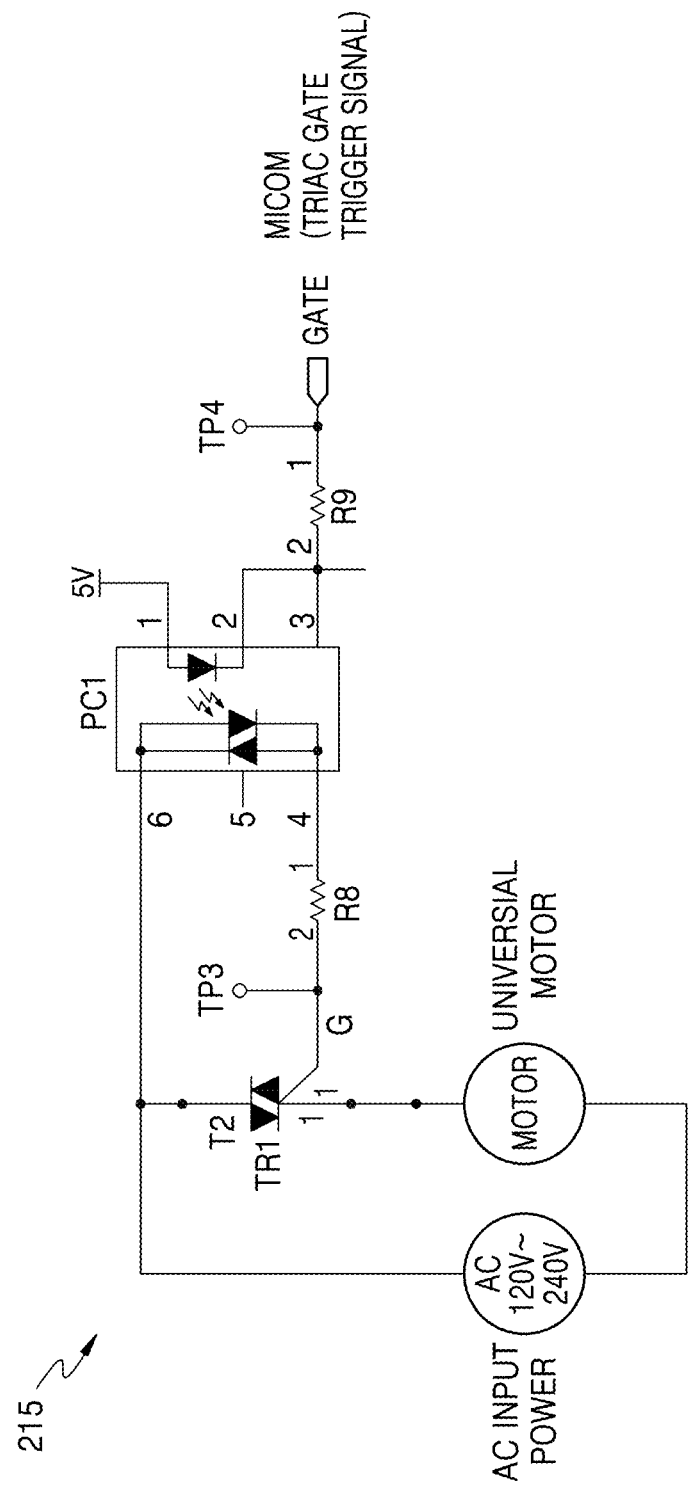
FIG. 21 is a diagram illustrating a phase control circuit for soft start according to an embodiment of the disclosure.

FIG. 21 is a diagram illustrating a phase control circuit for soft start 215 according to an embodiment of the disclosure.

Referring to FIG. 21, the phase control circuit for soft start 215 may include a photo triac PC1.

A photo triac is a 3-pin semiconductor and may be a switching device for AC. The photo triac has a structure through which electricity flows in response to small current. Here, the current providing to a gate may be referred to as trigger current or a trigger signal. The photo triac PC1, while an AC power is applied thereto, may be turned on only when current of about 70 mA is provided to a control pin. That is, when an AC input power becomes + or − after 0 V, the at least one processor 203 may deliver a trigger signal, thereby turning on the photo triac PC1. The photo triac PC1 may be turned on by receiving a signal at every half cycle. For example, when the AC input voltage is 60 Hz, the at least one processor 203 may deliver a trigger signal 120 times during 1 second to the photo triac PC1. When sine waves of the AC input voltage cross 0 V, the photo triac PC1 may be turned off.

Figure 22:
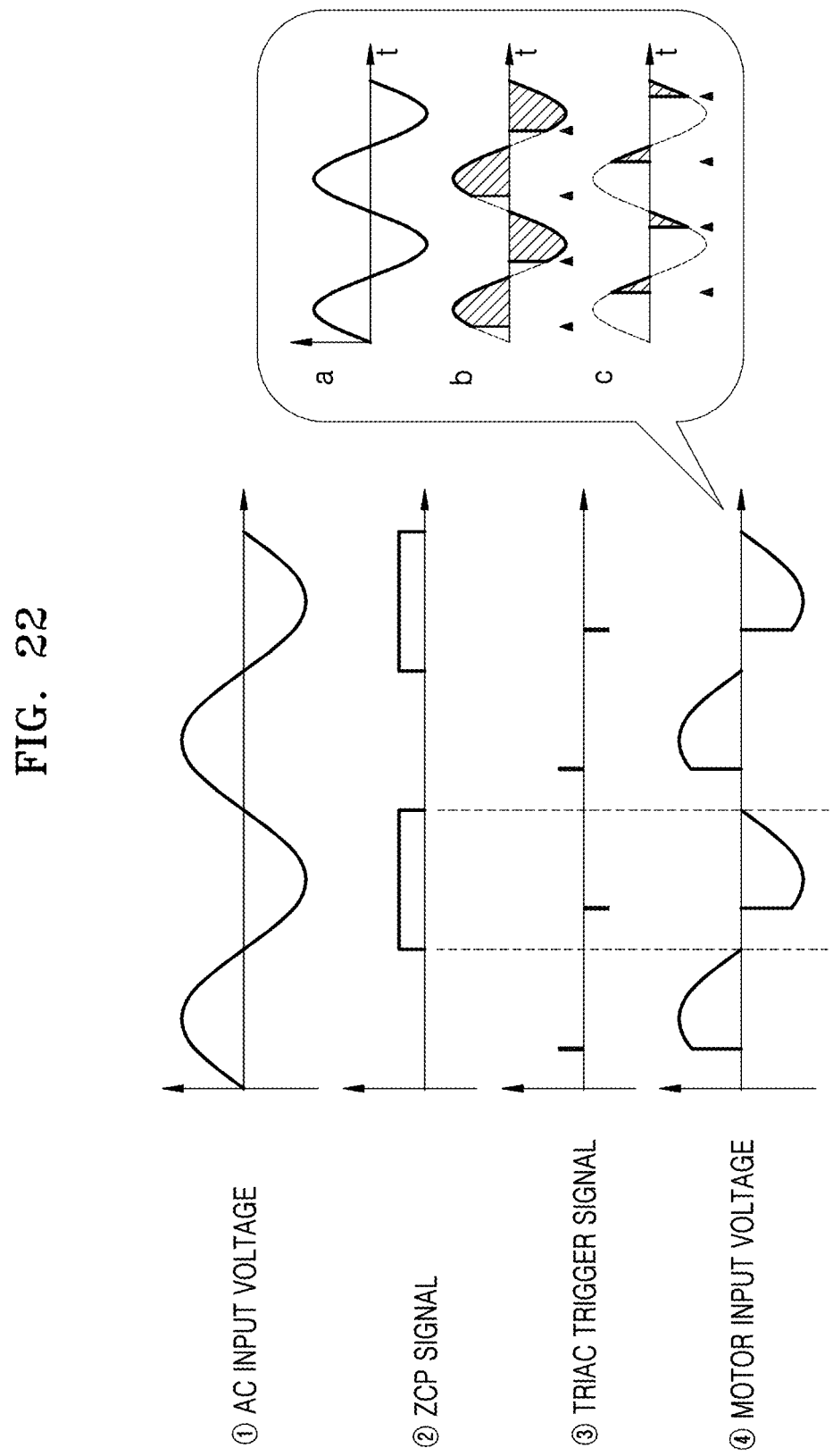
FIG. 22 is a diagram illustrating a phase control operation using a photo triac, according to an embodiment of the disclosure.

Referring to FIG. 22, a phase control operation using the photo triac PC1 will now be further described.

FIG. 22 is a diagram illustrating a phase control operation using a photo triac, according to an embodiment of the disclosure.

According to an embodiment of the disclosure, when an AC input voltage is in a normal state or a low voltage state, the at least one processor 203 may drive the suction motor 207. Here, the at least one processor 203 may slowly turn on the suction motor 207 so as not to give a big load to the suction motor 207. When AC power of 100% (e.g., 220 V) is supplied to the suction motor 207 from the beginning, inrush current, mechanical reaction, abnormal noise, etc. may occur, and thus, the at least one processor 203 may slowly increase power supplied to the suction motor 207. For example, the at least one processor 203 may adjust a time point of delivering a trigger signal to the photo triac PC1.

According to an embodiment of the disclosure, the at least one processor 203 may deliver the trigger signal at a time point far from a ZCP and then gradually at a time point close to the ZCP. That is, the at least one processor 203 may increase a duty value. Here, power supplied to the suction motor 207 may slowly increase from Zero (0 V) to 100% (e.g., 220 V) as in (c) to (b).

Figure 23:
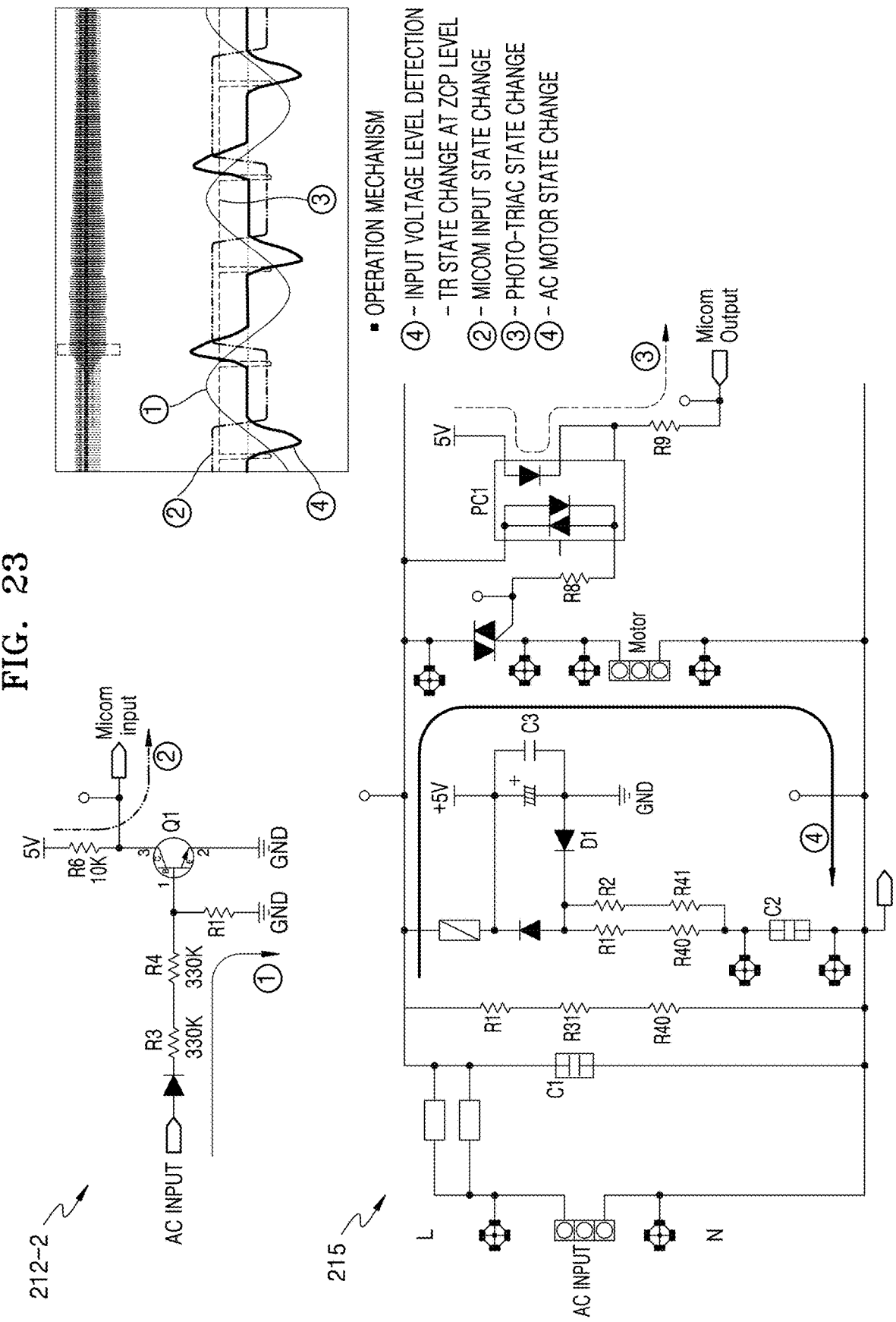
FIG. 23 is a diagram illustrating an operation in which station device drives a suction motor, according to an embodiment of the disclosure.

With reference to FIG. 23, an operation in which the station device 200 drives the suction motor 207 will be further described.

FIG. 23 is a diagram illustrating the operation in which the station device 200 drives the suction motor 207, according to an embodiment of the disclosure. With reference to FIG. 23, an example of the non-isolation half-wave ZCP circuit 212-2 is described, but the disclosure is not limited thereto. FIG. 23 may be applied to the isolation half-wave ZCP circuit 212-1.

According to an embodiment of the disclosure, the at least one processor 203 may detect a point close to 0 V as a ZCP level via the ZCP circuit 212, and may deliver a trigger signal for phase control to a photo triac, based on the point at which the ZCP level is detected.

For example, when an AC input voltage crosses 0 V and then becomes equal to or greater than 2.1 V, a voltage (TR_VBE) between base-emitter both ends of a transistor TR is equal to or greater than 0.7 V, and thus, the transistor TR may be turned on (or saturation). Here, an input voltage of the at least one processor 203 may be switched from 5 V (High) to 0.2 V (Low). The at least one processor 203 may determine a point at which the input voltage is switched from 5 V (High) to 0.2 V (Low), as a ZCP level, and may deliver a trigger signal to a gate of a photo triac.

On the other hand, when the AC input voltage falls and then becomes less than 2.1 V, the voltage (TR_VBE) between base-emitter both ends of the transistor TR is less than 0.7 V, and thus, the transistor TR may be turned off. Here, an input voltage of the at least one processor 203 may be switched from 2 V (Low) to 5 V (High). The at least one processor 203 may determine a point at which the input voltage is switched from 2 V (Low) to 5 V (High), as a ZCP level, and may deliver a trigger signal to the gate of the photo triac.

According to an embodiment of the disclosure, the at least one processor 203 may adjust a time point of delivering a trigger signal to a photo triac, so as to control a phase of an AC load. When the at least one processor 203 delivers the trigger signal to the gate of the photo triac, a state of the photo triac may be switched from off to on. Then, when the AC input voltage becomes 0 V, the photo triac may be turned off.

As the state of the photo triac is changed, according to control by the at least one processor 203, AC power supplied to the suction motor 207 may slowly increase from 0% (0 V) to 100% (e.g., 220 V). When a maximum power is sharply supplied to the suction motor 207, a load may be damaged or a power device may be damaged. However, when a load voltage slowly increases during a set time (soft start), damage to the load may be prevented.

Figure 24A:
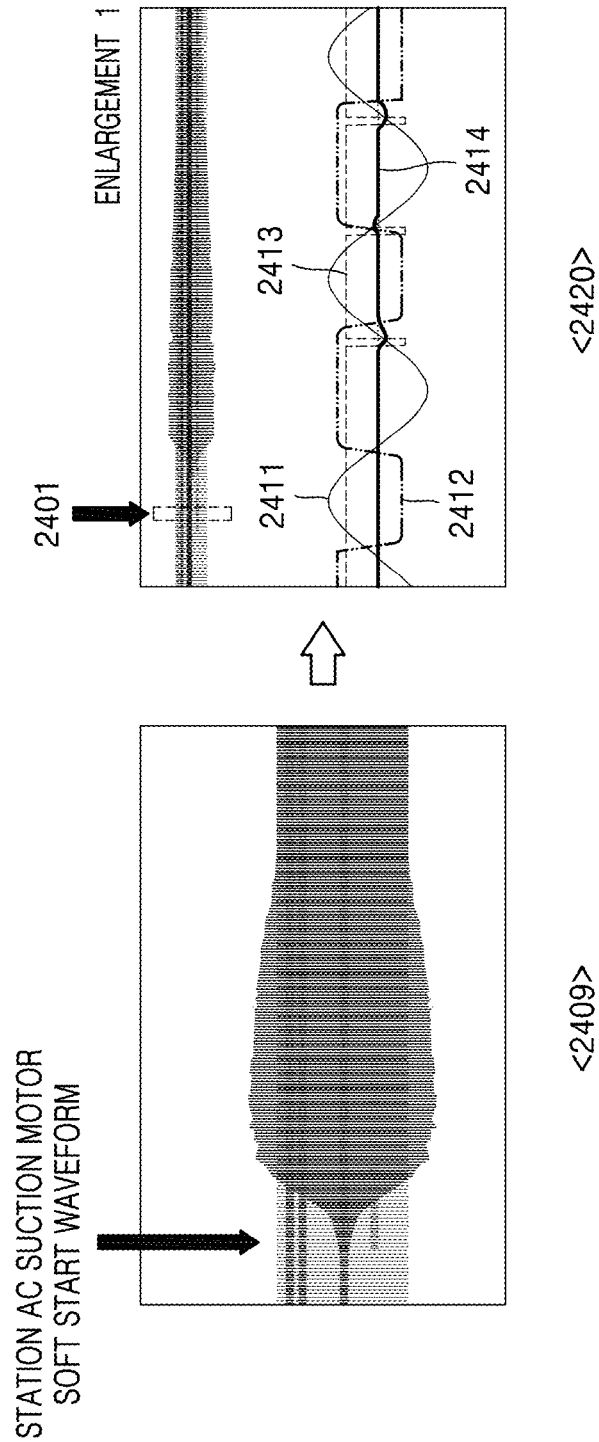
FIG. 24A is a diagram illustrating operating current of an AC suction motor according to an embodiment of the disclosure.
Figure 24B:
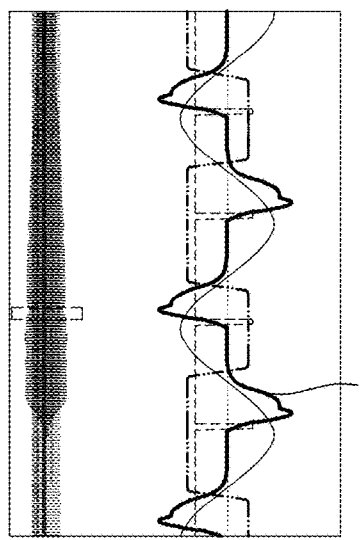
FIG. 24B is a diagram illustrating operating current of an AC suction motor according to phase control.
Figure 24B:
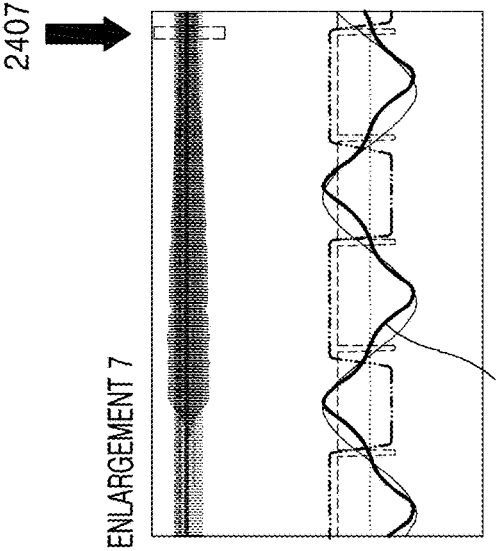
Figure 24B:
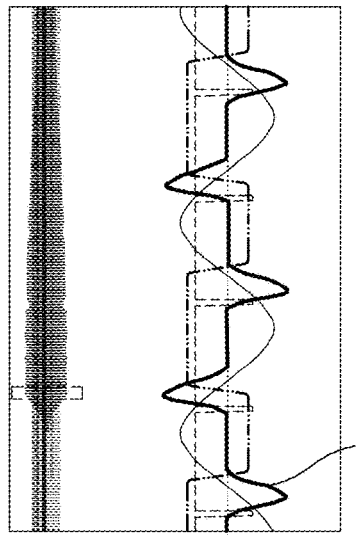
Figure 24B:
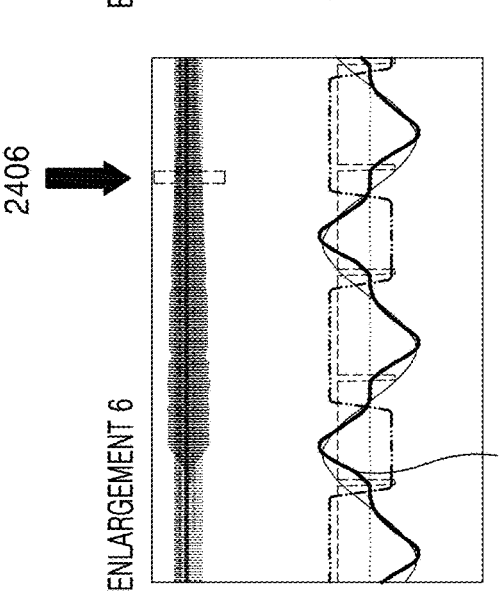
Figure 24B:
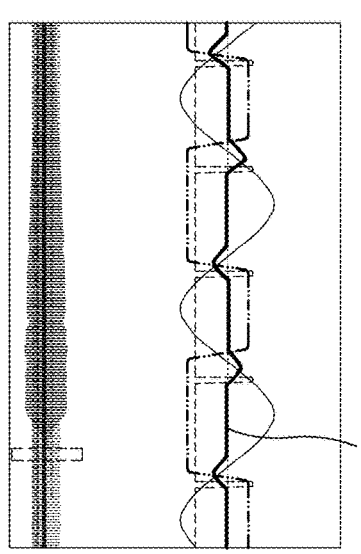
Figure 24B:
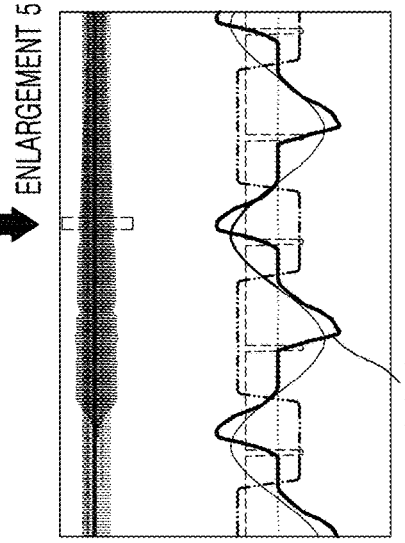

With reference to FIGS. 24A and 24B, a soft start waveform of the AC suction motor 207 will now be described.

FIG. 24A is a diagram illustrating operating current of the AC suction motor 207 according to an embodiment of the disclosure. FIG. 24B is a diagram illustrating operating current of the AC suction motor 207 according to phase control.

A first screen 2409 of FIG. 24A shows a soft start waveform of the AC suction motor 207 over time. A graph corresponding to enlargement of a first point 2401 of the soft start waveform is shown on a second screen 2420. The second screen 2420 may show a waveform 2411 of an AC input voltage, an input voltage waveform 2412 of the at least one processor 203 which includes a falling edge and a rising edge, a gate signal waveform 2413 of a photo triac, and an operating current waveform 2414 of the AC suction motor 207. Referring to the operating current waveform 2414 of the AC suction motor 207, as the first point 2401 indicates a point not long after a start of a soft start function, it is possible to see that operation current of the AC suction motor 207 is not great.

FIG. 24B shows a third screen 2430 corresponding to enlargement of a second point 2402 of the soft start waveform, a fourth screen 2440 corresponding to enlargement of a third point 2403 of the soft start waveform, a fifth screen 2450 corresponding to enlargement of a fourth point 2404 of the soft start waveform, a sixth screen 2460 corresponding to enlargement of a fifth point 2405 of the soft start waveform, a seventh screen 2470 corresponding to enlargement of a sixth point 2406 of the soft start waveform, and an eighth screen 2480 corresponding to enlargement of a seventh point 2407 of the soft start waveform. When observing the operating current waveform 2414 of the AC suction motor 207 in each of the third screen 2430, the fourth screen 2440, the fifth screen 2450, the sixth screen 2460, the seventh screen 2470, and the eighth screen 2480, it is possible to see that operating current of the AC suction motor 207 gradually increases over time. That is, it is possible to see that power supplied to the AC suction motor 207 slowly increases.

Figure 25:
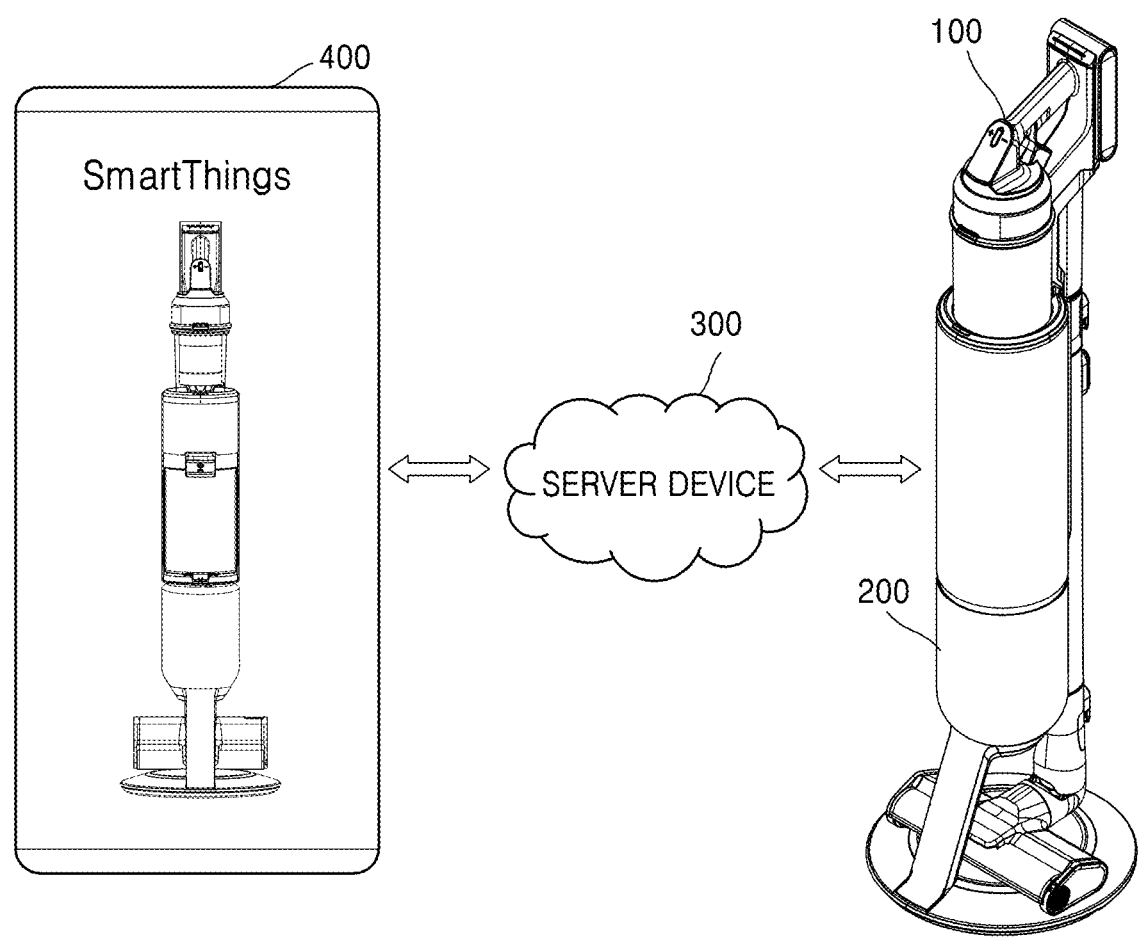
FIG. 25 is a diagram illustrating a vacuum cleaner system according to an embodiment of the disclosure.

FIG. 25 is a diagram illustrating a vacuum cleaner system according to an embodiment of the disclosure.

Referring to FIG. 25, the vacuum cleaner system according to an embodiment of the disclosure may further include a server device 300 and a user terminal 400 as well as the cordless vacuum cleaner 100 and the station device 200. As the vacuum cleaner system including the cordless vacuum cleaner 100 and the station device 200 is described with reference to FIG. 1A, hereinafter, the server device 300 and the user terminal 400 will now be described.

The server device 300 according to an embodiment of the disclosure may be a device to manage the station device 200 and the cordless vacuum cleaner 100. For example, the server device 300 may be a home appliance management server. The server device 300 may manage user count information and information of home appliances connected to a user account. For example, a user may create the user account by accessing the server device 300 via the user terminal 400. The user account may be identified by an identification (ID) and password which are set by the user. The server device 300 may register, in the user account, the station device 200 and the cordless vacuum cleaner 100 according to a preset procedure. For example, the server device 300 may connect identification information (e.g.: a serial number or a medium access control (MAC) address) of the station device 200 and identification information of the cordless vacuum cleaner 100 to the user account, thereby registering the station device 200 and the cordless vacuum cleaner 100. When the station device 200 and the cordless vacuum cleaner 100 are registered in the server device 300, the server device 300 may periodically receive state information of the station device 200 or state information of the cordless vacuum cleaner 100 from the station device 200, thereby managing a state of the station device 200 or a state of the cordless vacuum cleaner 100.

The user terminal 400 may be a device registered in the server device 300 via the same account as the station device 200 or the cordless vacuum cleaner 100. The user terminal 400 may be a smart phone, a notebook computer (laptop computer), a tablet PC, a digital camera, an electronic-book (e-book) terminal, a terminal for digital broadcasting, a personal digital assistant (PDA), a portable multimedia player (PMP), a wearable device, a device including a display, etc., but the disclosure is not limited thereto. Hereinafter, for convenience of descriptions, an example in which the user terminal 400 is a smartphone will now be described.

According to an embodiment of the disclosure, the user terminal 400 may communicate with at least one of the server device 300, the station device 200, or the cordless vacuum cleaner 100. The user terminal 400 may directly communicate with the station device 200 or the cordless vacuum cleaner 100 via short-range wireless communication, or may indirectly communicate with the station device 200 or the cordless vacuum cleaner 100 via the server device 300.

According to an embodiment of the disclosure, the user terminal 400 may execute, in response to a user input, a particular application (e.g., a home appliance management application) provided by the server device 300. In this case, a user may check a state of the cordless vacuum cleaner 100 or a state of the station device 200 via an execution window of the application.

For example, the user terminal 400 may provide, via the execution window of the application, information (e.g.: UV LED operating) associated with an operation of an UV emitter, information (e.g.: When dustbin is emptied—1 minute ago) associated with dust discharging of the station device 200, an icon (e.g.: To empty dustbin) associated with dust discharging, an icon (e.g.: To automatically empty dustbin) for setting an operation mode associated with dust discharging, but the disclosure is not limited thereto.

Figure 26:
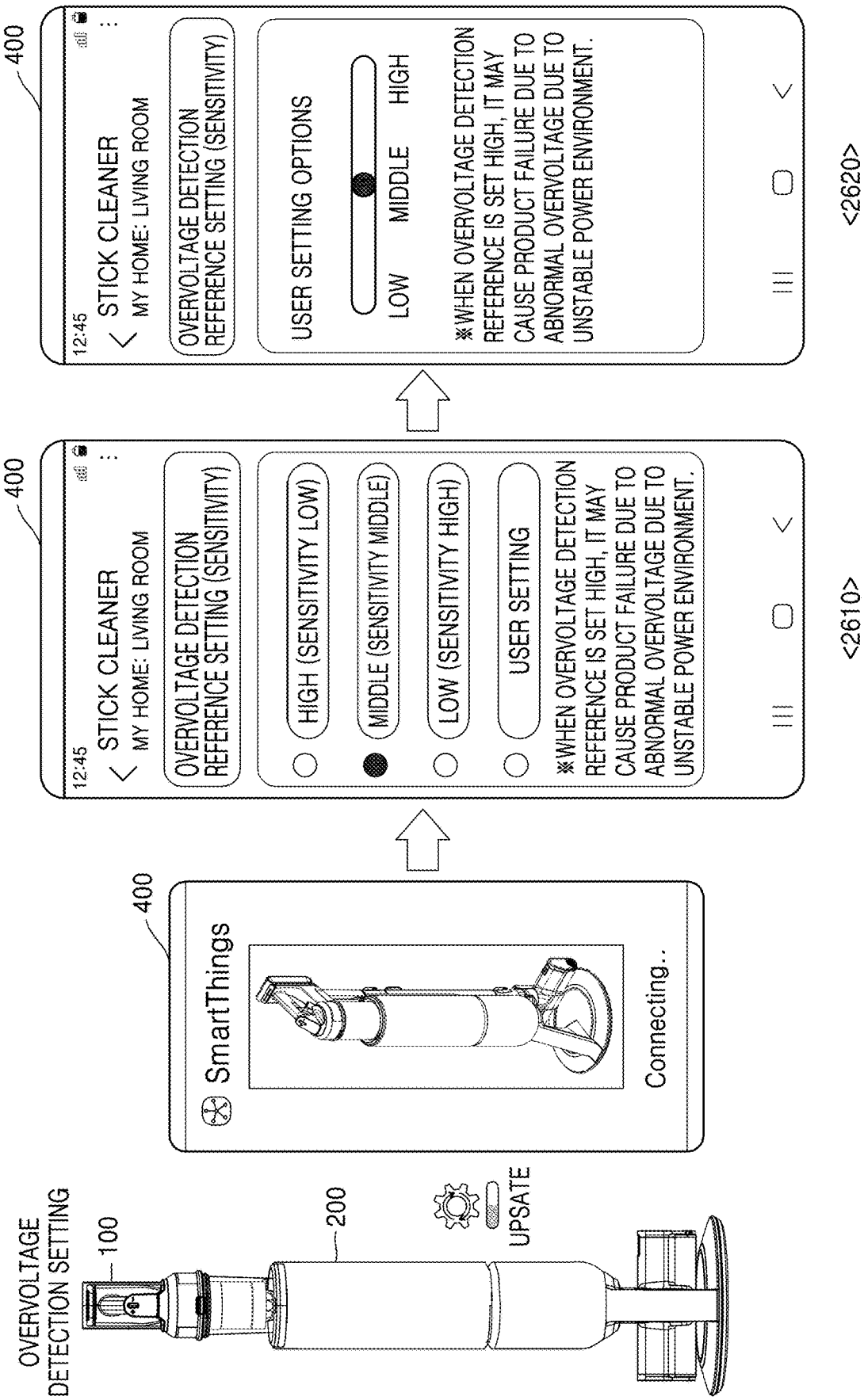
FIG. 26 is a diagram illustrating an operation of adjusting an overvoltage detection level, according to an embodiment of the disclosure.

According to an embodiment of the disclosure, the user terminal 400 may provide a graphical user interface (GUI) for adjusting an overvoltage detection level (or an overvoltage detection sensitivity). With reference to FIG. 26, an operation in which the user terminal 400 provides a GUI for adjusting a preset overvoltage detection level will now be described.

FIG. 26 is a diagram illustrating an operation of adjusting an overvoltage detection level, according to an embodiment of the disclosure.

Referring to 2610 of FIG. 26, the user terminal 400 according to an embodiment of the disclosure may display, on an application execution screen, a GUI for setting an overvoltage detection level (or an overvoltage detection sensitivity). Here, when the overvoltage detection level is set to be high (the overvoltage detection sensitivity is set to be low), a reference range corresponding to a normal state may become wide. On the other hand, when the overvoltage detection level is set to be low (the overvoltage detection sensitivity is set to be high), the reference range corresponding to the normal state may become narrow.

According to an embodiment of the disclosure, when the overvoltage detection level is set to be too high in an area in which a power environment is unstable, there may be a high possibility that the suction motor 207 is damaged due to an excessive overvoltage. When the overvoltage detection level is set to be too low in an area in which a power environment is unstable, the suction motor 207 does not operate frequently, such that usability may deteriorate. Therefore, there is a need to appropriately adjust the overvoltage detection level (or the overvoltage detection sensitivity), in consideration of the power environment.

Referring to 2620 of FIG. 26, the user terminal 400 may display, on an application execution screen, a GUI for minutely setting an overvoltage detection level (or an overvoltage detection sensitivity).

When the overvoltage detection level (or the overvoltage detection sensitivity) is adjusted via the user terminal 400, the user terminal 400 may transmit information about the adjusted overvoltage detection level (or the adjusted overvoltage detection sensitivity) to the station device 200 via the server device 300.

With reference to FIG. 26, an example is described, in which a user adjusts the overvoltage detection level (or the overvoltage detection sensitivity) via the user terminal 400, but the disclosure is not limited thereto. According to an embodiment of the disclosure, the user may adjust the overvoltage detection level (or the overvoltage detection sensitivity) via an input interface of the station device 200. Also, the user may adjust the overvoltage detection level (or the overvoltage detection sensitivity) via an external device connected to a wire connector of the station device 200.

According to an embodiment of the disclosure, provided is the station device 200 configured to detect an AC overvoltage that is exceeding an AC rated voltage and is applied to the station device 200, by using the ZCP circuit 212. According to an embodiment of the disclosure, provided is the station device 200 configured to deactivate an operation of the suction motor 207 by detecting an AC overvoltage and provide a user with a notification.

According to an embodiment of the disclosure, the station device 200 on which a cleaner is docked may include the suction motor 207 configured to generate a suction force to suck up dusts from the dustbin 1200 included in the cleaner, the ZCP circuit 212 configured to detect a ZCP of an AC input voltage applied to the station device 200, and the at least one processor 203 configured to control supply of the AC input voltage to the suction motor 207. The at least one processor 203 may be configured to detect a first ZCP and a second ZCP with respect to the AC input voltage, by using the ZCP circuit 212. The at least one processor 203 may be configured to obtain information about a pulse width from the first ZCP to the second ZCP. The at least one processor 203 may be configured to identify whether the AC input voltage is in an overvoltage state, based on the information about the pulse width from the first ZCP to the second ZCP. The at least one processor 203 may be configured to deactivate an operation of the suction motor 207, when the AC input voltage is in the overvoltage state. According to an embodiment of the disclosure, the station device 200 does not configure a separate overvoltage detection circuit and may detect an overvoltage by using the existing ZCP circuit 212. Also, when the station device 200 detects an overvoltage, the station device 200 deactivates an operation of the suction motor 207, thereby preventing damage or occurrence of fire in the suction motor 207. The first ZCP and the second ZCP correspond to voltage points which are offset from 0 V by a preset value in the AC input voltage.

According to an embodiment of the disclosure, the at least one processor 203 may be configured to, when the pulse width from the first ZCP to the second ZCP exceeds a preset reference range, identify that the AC input voltage is in the overvoltage state. According to an embodiment of the disclosure, the station device 200 may compare a pulse width between ZCPs with a preset reference range, thereby simply detecting an overvoltage.

The at least one processor 203 may be configured to identify a frequency of the AC input voltage. The at least one processor 203 may be configured to select the preset reference range corresponding to the identified frequency. As a frequency of the AC input voltage has an effect on the pulse width between the ZCPs, the station device 200 may select the preset reference range corresponding to the frequency of the AC input voltage, thereby increasing overvoltage detection accuracy.

The at least one processor 203 may be configured to control a status light to indicate that the AC input voltage is in the overvoltage state. For example, the at least one processor 203 may be configured to flicker the LED display with a red color, thereby informing a user that a power line of the station device 200 is connected to an incorrect outlet.

According to an embodiment of the disclosure, the ZCP circuit 212 may include the isolation half-wave ZCP circuit 212-1 including a photo coupler and a diode. According to an embodiment of the disclosure, two circuits having different operating powers may be completely separated by using the photo coupler PC3.

The at least one processor 203 may be configured to detect, as the first ZCP and the second ZCP, voltage points which are higher than 0 V by a preset value in the AC input voltage. According to an embodiment of the disclosure, as the first ZCP and the second ZCP detected by the at least one processor 203 are different from an actual ZCP, the at least one processor 203 may be configured to detect an overvoltage by using the pulse width between the first ZCP and the second ZCP.

According to an embodiment of the disclosure, the preset value may vary according to a type of the ZCP circuit 212.

According to an embodiment of the disclosure, the at least one processor 203 may be configured to obtain the number of counts, by using a timer, of the pulse width from the first ZCP to the second ZCP, as information about the pulse width from the first ZCP to the second ZCP. According to an embodiment of the disclosure, the at least one processor 203 may be configured to detect an overvoltage, based on the number of counts, by using the timer, of the pulse width from the first ZCP to the second ZCP.

The at least one processor 203 may be configured to obtain the number of counts, by using the timer, the pulse width corresponding to a first reference value of a rising edge at which a voltage of an input port connected to the ZCP circuit 212 rises and to a second reference value of a falling edge at which the voltage of the input port connected to the ZCP circuit 212 falls, as the information about the pulse width from the first ZCP to the second ZCP.

According to an embodiment of the disclosure, the number of counts, by using the timer, of the pulse width from the first ZCP to the second ZCP may be decreased as a level of the AC input voltage is increased.

The at least one processor 203 may be configured to identify that the AC input voltage is in the overvoltage state, when the number of counts is less than a first threshold. The at least one processor 203 may be configured to identify that the AC input voltage is in a low voltage state, when the number of counts is greater than a second threshold being greater than the first threshold. The at least one processor 203 may be configured to identify that the AC input voltage is in a normal state, when the number of counts is the first threshold to the second threshold. According to an embodiment of the disclosure, the station device 200 may identify a low voltage state, an overvoltage state, and a normal state, based on a result of counting, by using the timer, the pulse width between ZCPs.

The at least one processor 203 may be configured to identify the AC input voltage as a power distortion state, when the number of counts is equal to or less than a third threshold being less than the first threshold, and deactivate an operation of the suction motor 207.

The at least one processor 203 may be configured to activate an operation of the suction motor 207, when the AC input voltage is in the low voltage state or the normal state.

The at least one processor 203 may be configured to activate the operation of the suction motor 207 by slowly increasing power supplied to the suction motor 207, by using a photo triac. According to an embodiment of the disclosure, when AC power of 100% (e.g., 220 V) is supplied to the suction motor 207 from the beginning, inrush current, mechanical reaction, abnormal noise, etc. may occur, and thus, the at least one processor 203 may be configured to slowly increase power supplied to the suction motor 207.

The at least one processor 203 may be configured to classify a state of the AC input voltage, based on the number of counts, by using the timer, of the pulse width from the first ZCP to the second ZCP, during a preset cycle of the AC input voltage. The at least one processor 203 may be configured to identify a final state of the AC input voltage, based on results of classifications with respect to states of the AC input voltage during the preset cycle. According to an embodiment of the disclosure, the station device 200 may repeatedly measure the pulse width from the first ZCP to the second ZCP multiple times, thereby increasing an overvoltage detection accuracy.

According to an embodiment of the disclosure, the ZCP circuit 212 may be connected to the standby power block circuit 214 including a photo triac. According to an embodiment of the disclosure, when there is no need to detect a ZCP, power consumption due to resistors, a photo coupler, a diode, etc. included in the ZCP circuit 212 may be blocked by the standby power block circuit 214.

According to an embodiment of the disclosure, the station device 200 may include an input interface. The at least one processor 203 may be configured to receive a user input of adjusting the preset reference range via the input interface. The at least one processor 203 may be configured to adjust the preset reference range, based on the user input. According to an embodiment of the disclosure, a user may appropriately adjust a reference range (a reference range classified as a normal state) for overvoltage detection, in consideration of a power environment.

According to an embodiment of the disclosure, the station device 200 may include the communication interface 201 configured to communicate with the external server device 300. The at least one processor 203 may be configured to receive a signal to adjust the preset reference range, from the external server device 300 via the communication interface 201. According to an embodiment of the disclosure, the station device 200 may vary (control) an AC overvoltage detection condition (e.g., a level, a time, etc.) by using a network.

According to an embodiment of the disclosure, the station device 200 may include the wire connector 205 configured to make connection to an external device. The at least one processor 203 may be configured to receive a signal to adjust the preset reference range, from the externa device via the wire connector 205.

According to an embodiment of the disclosure, an operating method of the station device 200 may include detecting a ZCP and a second ZCP with respect to an AC input voltage, by using the ZCP circuit 212 configured to detect a ZCP of the AC input voltage applied to the station device 200, obtaining information about a pulse width from the first ZCP to the second ZCP, identifying whether the AC input voltage is in an overvoltage state, based on the information about the pulse width from the first ZCP to the second ZCP, and deactivating an operation of the suction motor 207, when the AC input voltage is in the overvoltage state, where detecting the first ZCP and the second ZCP includes detecting voltage points which are offset from 0 V by a preset value in the AC input voltage.

Although the disclosure has primarily referred to the overvoltage protection in the context of a station device for a cleaner, the disclosure is not limited thereto. Rather, the overvoltage protection methods and systems disclosed may be embodied in any electronic device to prevent damage to the electronic device that may occur due to the electronic device being inadvertently connected to an improper power supply. For example, the overvoltage protection methods and systems disclosed may be applied to a corded vacuum, kitchen appliances, and the like.

According to an embodiment of the disclosure, a method for protecting an electronic device is provided. The method includes detecting a first zero crossing point (ZCP) and a second ZCP with respect to an alternating current (AC) input voltage, by using a ZCP circuit configured to detect a ZCP of the AC input voltage applied to the electronic device and obtaining information about a pulse width from the first ZCP to the second ZCP. The method also includes identifying whether the AC input voltage is in an overvoltage state, based on the information about the pulse width from the first ZCP to the second ZCP and deactivating an operation of at least a portion of the electronic device, when the AC input voltage is in the overvoltage state, where detecting the first ZCP and the second ZCP includes detecting voltage points which are offset from 0 V by a preset value in the AC input voltage.

A machine-readable storage medium may be provided in the form of a non-transitory storage medium. In this regard, the term "non-transitory storage medium" merely means that the storage medium is a tangible device, and does not include a signal (e.g., an electromagnetic wave), and this term does not differentiate between a case where data is semi-permanently stored in the storage medium and a case where the data is temporarily stored in the storage medium. For example, the non-transitory storage medium may include a buffer in which data is temporarily stored.

According to an embodiment of the disclosure, the method according to various embodiments disclosed in the present specification may be included and provided in a computer program product. The computer program product may be traded as a product between a seller and a buyer. The computer program product may be distributed in the form of a machine-readable storage medium (e.g., a compact disc read only memory (CD-ROM) or a universal serial bus (USB) flash drive), or be distributed (e.g., downloaded or uploaded) online via an application store, or between two user devices (e.g., smart phones) directly. For electronic distribution, at least a part of the computer program product (e.g., a downloadable app) may be temporarily generated or be at least temporarily stored in a machine-readable storage medium, e.g., a server of a manufacturer, a server of an application store, or a memory of a relay server.

What is claimed is:

1. A station device on which a cleaner is docked, the station device comprising:
   a suction motor configured to generate a suction force to suck up dust from a dustbin disposed in the cleaner;
   a zero crossing point (ZCP) circuit configured to detect a ZCP of an alternating current (AC) input voltage applied to the station device; and
   at least one processor configured to control supply of the AC input voltage to the suction motor,
   wherein the at least one processor is further configured to detect a first ZCP and a second ZCP with respect to the AC input voltage, by using the ZCP circuit,
   obtain information about a pulse width from the first ZCP to the second ZCP,
   identify whether the AC input voltage is in an overvoltage state, based on the information about the pulse width from the first ZCP to the second ZCP, and
   based on the AC input voltage being in the overvoltage state, deactivate an operation of the suction motor.

2. The station device of claim 1, wherein the at least one processor is further configured to, based on the pulse width from the first ZCP to the second ZCP exceeding a preset reference range, identify that the AC input voltage is in the overvoltage state.

3. The station device of claim 2, wherein the at least one processor is further configured to
   identify a frequency of the AC input voltage, and
   select the preset reference range corresponding to the identified frequency.

4. The station device of claim 1, wherein the at least one processor is further configured to control a status light to indicate that the AC input voltage is in the overvoltage state.

5. The station device of claim 1, wherein the ZCP circuit comprises an isolation half-wave ZCP circuit comprising a photo coupler and a diode.

6. The station device of claim 1, wherein the first ZCP and the second ZCP correspond to voltage points which are offset from 0 V by a preset value in the AC input voltage, and
wherein the at least one processor is further configured to detect, as the first ZCP and the second ZCP, voltage points which are higher than 0 V by the preset value in the AC input voltage.

7. The station device of claim 6, wherein the preset value varies according to a type of the ZCP circuit.

8. The station device of claim 1, wherein the at least one processor is further configured to obtain a number of counts, by using a timer, of the pulse width from the first ZCP to the second ZCP, as information about the pulse width from the first ZCP to the second ZCP.

9. The station device of claim 8, wherein the at least one processor is further configured to obtain the number of counts, by using the timer, the pulse width corresponding to a first reference value of a rising edge at which a voltage of an input port connected to the ZCP circuit rises and to a second reference value of a falling edge at which the voltage of the input port connected to the ZCP circuit falls, as the information about the pulse width from the first ZCP to the second ZCP.

10. The station device of claim 9, wherein the number of counts is decreased as a level of the AC input voltage is increased.

11. The station device of claim 10, wherein the at least one processor is further configured to
identify that the AC input voltage is in the overvoltage state, based on the number of counts being less than a first threshold,
identify that the AC input voltage is in a low voltage state, based on the number of counts being greater than a second threshold, the second threshold being greater than the first threshold, and
identify that the AC input voltage is in a normal state, based on the number of counts being the first threshold to the second threshold.

12. The station device of claim 11, wherein the at least one processor is further configured to identify the AC input voltage as a power distortion state, based on the number of counts being equal to or less than a third threshold, the third threshold being less than the first threshold, and deactivate an operation of the suction motor.

13. The station device of claim 11, wherein the at least one processor is further configured to activate an operation of the suction motor, based on the AC input voltage being in the low voltage state or the normal state.

14. The station device of claim 13, wherein the at least one processor is further configured to activate the operation of the suction motor by slowly increasing power supplied to the suction motor, by using a photo triac.

15. The station device of claim 11, wherein the at least one processor is further configured to
classify a state of the AC input voltage, based on the number of counts, by using the timer, of the pulse width from the first ZCP to the second ZCP, during a preset cycle of the AC input voltage, and
identify a final state of the AC input voltage, based on results of classifications with respect to states of the AC input voltage during the preset cycle.

16. The station device of claim 1, wherein the ZCP circuit is connected to a standby power block circuit comprising a photo triac.

17. The station device of claim 2, further comprising an input interface,
wherein the at least one processor is further configured to
receive a user input of adjusting the preset reference range via the input interface, and
adjust the preset reference range, based on the user input.

18. The station device of claim 2, further comprising a communication interface configured to communicate with an external server device,
wherein the at least one processor is further configured to receive a signal to adjust the preset reference range, from the external server device via the communication interface.

19. The station device of claim 2, further comprising a wire connector configured to make connection to an external device,
wherein the at least one processor is further configured to receive a signal to adjust the preset reference range, from the external device via the wire connector.

20. An operating method of a station device comprising a suction motor configured to generate a suction force to suck up dust from a dustbin disposed in a cleaner, the operating method comprising:
detecting a first zero crossing point (ZCP) and a second ZCP with respect to an alternating current (AC) input voltage, by using a ZCP circuit configured to detect a ZCP of the AC input voltage applied to the station device;
obtaining information about a pulse width from the first ZCP to the second ZCP;
identifying whether the AC input voltage is in an overvoltage state, based on the information about the pulse width from the first ZCP to the second ZCP; and
deactivating an operation of the suction motor, when the AC input voltage is in the overvoltage state.

* * * * *